United States Patent
Bauco et al.

(10) Patent No.: US 10,222,560 B2
(45) Date of Patent: Mar. 5, 2019

(54) TRACEABLE FIBER OPTIC CABLE ASSEMBLY WITH FIBER GUIDE AND TRACING OPTICAL FIBERS FOR CARRYING LIGHT RECEIVED FROM A LIGHT LAUNCH DEVICE

(71) Applicant: Corning Research & Development Corporation, Corning, NY (US)

(72) Inventors: Anthony Sebastian Bauco, Horseheads, NY (US); Douglas Llewellyn Butler, Painted Post, NY (US); Ashley Wesley Jones, Denton, TX (US); Jason Clay Lail, Conover, NC (US); Eric Stephan ten Have, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/411,157

(22) Filed: Jan. 20, 2017

(65) Prior Publication Data
US 2018/0172942 A1  Jun. 21, 2018

Related U.S. Application Data

(60) Provisional application No. 62/437,080, filed on Dec. 21, 2016.

(51) Int. Cl.
*G02B 6/36* (2006.01)
*G02B 6/38* (2006.01)
(Continued)

(52) U.S. Cl.
CPC ......... *G02B 6/3895* (2013.01); *G02B 6/0006* (2013.01); *G02B 6/245* (2013.01);
(Continued)

(58) Field of Classification Search
CPC .. G02B 6/4292; G02B 6/4246; G02B 6/4284; G02B 6/4214; G02B 6/36
See application file for complete search history.

(56) References Cited

U.S. PATENT DOCUMENTS

| 3,942,859 A | 3/1976 | Korodi |
| 4,412,936 A | 11/1983 | Khmelkov et al. |

(Continued)

FOREIGN PATENT DOCUMENTS

| CN | 200941319 Y | 8/2007 |
| CN | 201419706 Y | 3/2010 |

(Continued)

OTHER PUBLICATIONS http://www.dexim.net/list.php?id=7, Dexim product reference, downloaded from the web Feb. 24, 2016. 2 pages.

(Continued)

*Primary Examiner* — Jennifer Doan
(74) *Attorney, Agent, or Firm* — Robert L. Branham

(57) ABSTRACT

A cable tracing system includes a fiber optic connector with a connector fiber guide. The connector fiber guide includes a planar surface, a launch opening defined in the planar surface, and at least one alignment surface proximate the planar surface. The connector also includes a tracing optical fiber with a first launch end positioned within the launch opening of the fiber guide. The tracing optical fiber is accessible from an exterior of the housing for receiving an optical tracing signal from a launch optical fiber. The alignment surface is configured to axially align the launch optical fiber with the first tracing optical fiber.

38 Claims, 40 Drawing Sheets

(51) Int. Cl.

| | | |
|---|---|---|
| G02B 6/44 | (2006.01) | |
| G02B 6/245 | (2006.01) | |
| G02B 6/26 | (2006.01) | |
| G02B 6/43 | (2006.01) | |
| F21V 8/00 | (2006.01) | |
| G02B 6/42 | (2006.01) | |
| H04Q 1/02 | (2006.01) | |

(52) U.S. Cl.
CPC .......... *G02B 6/262* (2013.01); *G02B 6/3855* (2013.01); *G02B 6/3873* (2013.01); *G02B 6/3878* (2013.01); *G02B 6/3887* (2013.01); *G02B 6/3893* (2013.01); *G02B 6/4292* (2013.01); *G02B 6/43* (2013.01); *G02B 6/447* (2013.01); *G02B 6/4459* (2013.01); *G02B 6/4482* (2013.01); *H04Q 1/136* (2013.01); *G02B 6/0008* (2013.01); *G02B 6/4416* (2013.01)

(56) References Cited

U.S. PATENT DOCUMENTS

| | | | |
|---|---|---|---|
| 4,466,697 A | 8/1984 | Daniel | |
| 4,557,552 A | 12/1985 | Newton et al. | |
| 4,637,686 A | 1/1987 | Iwamoto et al. | |
| 4,712,858 A | 12/1987 | Presby | |
| 4,755,018 A | 7/1988 | Heng et al. | |
| 4,763,984 A | 8/1988 | Awai et al. | |
| 4,923,274 A | 5/1990 | Dean | |
| 4,995,691 A | 2/1991 | Purcell, Jr. | |
| 5,006,806 A | 4/1991 | Rippingale et al. | |
| 5,017,873 A | 5/1991 | Rippingale et al. | |
| 5,040,867 A | 8/1991 | de Jong et al. | |
| 5,122,750 A | 6/1992 | Rippingale et al. | |
| 5,179,611 A | 1/1993 | Umeda et al. | |
| 5,206,065 A | 4/1993 | Rippingale et al. | |
| 5,305,405 A | 4/1994 | Emmons et al. | |
| 5,329,348 A | 7/1994 | Nimura et al. | |
| 5,333,228 A | 7/1994 | Kingstone | |
| 5,377,292 A | 12/1994 | Baiting et al. | |
| 5,394,496 A | 2/1995 | Caldwell et al. | |
| 5,395,362 A | 3/1995 | Sacharoff et al. | |
| 5,432,876 A | 7/1995 | Appeldorn et al. | |
| 5,463,706 A | 10/1995 | Dumont et al. | |
| 5,500,913 A | 3/1996 | Allen et al. | |
| 5,591,160 A | 1/1997 | Reynard | |
| 5,666,453 A | 9/1997 | Dannenmann | |
| 5,741,152 A | 4/1998 | Boutros | |
| 5,764,043 A | 6/1998 | Czosnowski et al. | |
| 5,835,654 A | 11/1998 | Bergmann | |
| 5,979,188 A | 11/1999 | Ojha | |
| 5,982,967 A | 11/1999 | Mathis et al. | |
| 6,126,325 A | 10/2000 | Yamane et al. | |
| 6,137,928 A | 10/2000 | Albrecht | |
| 6,137,935 A | 10/2000 | Bohme et al. | |
| 6,173,097 B1 | 1/2001 | Throckmorton et al. | |
| 6,257,750 B1 | 7/2001 | Strasser et al. | |
| 6,293,081 B1 | 9/2001 | Grulick et al. | |
| 6,301,418 B1 | 10/2001 | Freier et al. | |
| 6,311,000 B1 | 10/2001 | Schneider | |
| 6,314,713 B1 | 11/2001 | Fitz et al. | |
| 6,317,553 B1 | 11/2001 | Harper, Jr. et al. | |
| 6,347,172 B1 | 2/2002 | Keller et al. | |
| 6,356,690 B1 | 3/2002 | McAlpine et al. | |
| 6,379,054 B2 | 4/2002 | Throckmorton et al. | |
| 6,388,194 B1 | 5/2002 | Ryeczek | |
| 6,403,947 B1 | 6/2002 | Hoyt et al. | |
| 6,425,694 B1 | 7/2002 | Szilagyi et al. | |
| 6,439,780 B1 | 8/2002 | Mudd et al. | |
| 6,456,768 B1 | 9/2002 | Boncek et al. | |
| 6,456,785 B1 | 9/2002 | Evans | |
| 6,471,412 B1 | 10/2002 | Belenkiy et al. | |
| 6,519,396 B2 | 2/2003 | Schneider et al. | |
| 6,526,200 B1 | 2/2003 | Davie | |
| 6,532,328 B1 | 3/2003 | Kline | |
| 6,554,485 B1 | 4/2003 | Beatty et al. | |
| 6,560,390 B2 | 5/2003 | Grulick et al. | |
| 6,577,243 B1 | 6/2003 | Dannenmann et al. | |
| 6,596,943 B1 | 7/2003 | Ward | |
| 6,606,431 B2 | 8/2003 | Unsworth | |
| 6,678,449 B2 | 1/2004 | Thompson et al. | |
| 6,695,491 B1 | 2/2004 | Leeman et al. | |
| 6,704,479 B2 | 3/2004 | Koplow | |
| 6,710,254 B2 | 3/2004 | Yueh | |
| 6,712,524 B2 | 3/2004 | Beatty et al. | |
| 6,728,453 B2 | 4/2004 | Petryszak | |
| 6,798,956 B2 | 9/2004 | Morrison | |
| 6,816,661 B1 | 11/2004 | Barnes et al. | |
| 6,823,120 B2 | 11/2004 | Hurley et al. | |
| 6,906,505 B2 | 6/2005 | Brunet et al. | |
| 6,933,438 B1 | 8/2005 | Watts et al. | |
| 6,969,273 B2 | 11/2005 | Chen | |
| 6,979,223 B2 | 12/2005 | Chen | |
| 7,020,369 B2 | 3/2006 | Lodge, Jr. et al. | |
| 7,029,137 B2 | 4/2006 | Lionetti et al. | |
| 7,038,135 B1 | 5/2006 | Chan et al. | |
| 7,049,937 B1 | 5/2006 | Zweig et al. | |
| 7,090,411 B2 | 8/2006 | Brown | |
| 7,121,707 B2 | 10/2006 | Currie et al. | |
| 7,164,819 B2 | 1/2007 | Jenson et al. | |
| 7,217,152 B1 | 5/2007 | Xin et al. | |
| 7,221,284 B2 | 5/2007 | Scherer et al. | |
| 7,242,831 B2 | 7/2007 | Fee | |
| 7,313,304 B2 | 12/2007 | Andrews et al. | |
| 7,401,961 B2 | 7/2008 | Longatti et al. | |
| 7,406,231 B1 | 7/2008 | Beck et al. | |
| 7,433,565 B2 | 10/2008 | Joseph et al. | |
| 7,524,082 B2 | 4/2009 | North | |
| 7,544,909 B2 | 6/2009 | Dhir | |
| 7,572,066 B2 | 8/2009 | De Jong et al. | |
| 7,596,293 B2 | 9/2009 | Isenhour et al. | |
| 7,603,020 B1 | 10/2009 | Wakileh et al. | |
| 7,618,175 B1 | 11/2009 | Hulse | |
| 7,620,279 B2 | 11/2009 | Joseph | |
| 7,653,277 B2 | 1/2010 | Andrews et al. | |
| 7,671,279 B2 | 3/2010 | Yin | |
| 7,748,860 B2 | 7/2010 | Brunet | |
| 7,817,884 B2 | 10/2010 | Demeritt et al. | |
| 7,920,764 B2 | 4/2011 | Kewitsch | |
| 7,932,805 B2 | 4/2011 | Darr et al. | |
| 7,948,226 B2 | 5/2011 | Rathbun, II et al. | |
| 8,000,576 B2 | 8/2011 | Chen et al. | |
| 8,102,169 B2 | 1/2012 | Law et al. | |
| 8,150,227 B2 | 4/2012 | Kewitsch | |
| 8,167,471 B1 | 5/2012 | Moritz | |
| 8,152,385 B2 | 10/2012 | De Jong et al. | |
| 8,314,603 B2 | 11/2012 | Russell | |
| 8,322,871 B1 | 12/2012 | Knaggs et al. | |
| 8,331,752 B2 | 12/2012 | Biribuze et al. | |
| 8,408,029 B2 | 4/2013 | De Angelis et al. | |
| 8,414,319 B2 | 4/2013 | Patel et al. | |
| 8,428,405 B2 | 4/2013 | Kewitsch | |
| 8,492,448 B2 | 7/2013 | Dewa et al. | |
| 8,509,579 B2 * | 8/2013 | Martin-Lopez | F24J 2/067 385/31 |
| 8,545,076 B2 | 10/2013 | Bickham et al. | |
| 8,548,293 B2 | 10/2013 | Kachmar | |
| 8,582,939 B2 | 11/2013 | Gimblet et al. | |
| 8,582,940 B2 | 11/2013 | Abernathy et al. | |
| 8,591,087 B2 | 11/2013 | Bickham et al. | |
| 8,620,123 B2 | 12/2013 | Dean, Jr. et al. | |
| 8,620,125 B2 | 12/2013 | Button et al. | |
| 8,683,827 B2 | 4/2014 | De Angelis et al. | |
| 8,708,724 B2 | 4/2014 | Patel et al. | |
| 8,724,942 B2 | 5/2014 | Logunov et al. | |
| 8,770,525 B2 * | 7/2014 | Donaldson | F16L 3/24 174/68.1 |
| 8,787,717 B2 | 7/2014 | Logunov | |
| 8,791,829 B2 | 7/2014 | Gustafsson et al. | |
| 8,798,419 B2 | 8/2014 | Wessels, Jr. et al. | |
| 8,805,141 B2 | 8/2014 | Fewkes et al. | |
| 8,896,286 B2 | 11/2014 | Abuelsaad et al. | |
| 8,896,287 B2 | 11/2014 | Abuelsaad et al. | |

(56) References Cited

U.S. PATENT DOCUMENTS

| | | |
|---|---|---|
| 8,897,612 B2 | 11/2014 | Logunov |
| 8,903,212 B2 | 12/2014 | Kachmar |
| 8,909,013 B1 | 12/2014 | Jiang et al. |
| 8,929,703 B2 | 1/2015 | Logunov et al. |
| 9,025,923 B2 | 5/2015 | Logunov et al. |
| 9,073,243 B2 | 7/2015 | Gimblet et al. |
| 9,146,347 B2 | 9/2015 | Logunov et al. |
| 9,182,561 B2 | 11/2015 | Bauco et al. |
| 9,196,975 B2 | 11/2015 | Scherer et al. |
| 9,271,709 B2 | 3/2016 | Grey et al. |
| 9,304,278 B1 | 4/2016 | Bauco et al. |
| 9,388,975 B2 | 7/2016 | Wenger |
| 9,429,731 B2 | 8/2016 | Bookbinder et al. |
| 9,435,713 B2 | 9/2016 | Collier et al. |
| 9,448,380 B2 * | 9/2016 | Mogensen ........... G02B 6/4459 |
| 9,507,096 B2 | 11/2016 | Isenhour et al. |
| 9,529,167 B2 | 12/2016 | Wu |
| 9,541,694 B2 | 1/2017 | Tissot |
| 9,709,750 B1 | 7/2017 | Kuang et al. |
| 2001/0002220 A1 | 5/2001 | Throckmorton et al. |
| 2001/0048797 A1 | 12/2001 | Van Dijk et al. |
| 2002/0009282 A1 | 1/2002 | Grulick et al. |
| 2002/0036775 A1 | 3/2002 | Wolleschensky et al. |
| 2002/0037133 A1 | 3/2002 | Unsworth |
| 2002/0136497 A1 | 9/2002 | McGarry et al. |
| 2002/0159735 A1 | 10/2002 | Edvold et al. |
| 2002/0185299 A1 | 12/2002 | Giebel |
| 2003/0002830 A1 | 1/2003 | Petryszak |
| 2003/0016924 A1 | 1/2003 | Thompson et al. |
| 2003/0108270 A1 | 6/2003 | Brimacombe et al. |
| 2003/0206519 A1 | 11/2003 | Sanders et al. |
| 2003/0222786 A1 | 12/2003 | Dannenmann et al. |
| 2004/0022504 A1 | 2/2004 | Hurley et al. |
| 2004/0052473 A1 | 3/2004 | Seo et al. |
| 2004/0146254 A1 | 7/2004 | Morrison |
| 2004/0160774 A1 | 8/2004 | Lionetti et al. |
| 2004/0179777 A1 | 9/2004 | Buelow, II et al. |
| 2004/0196648 A1 | 10/2004 | Franklin et al. |
| 2005/0052174 A1 | 3/2005 | Angelo et al. |
| 2005/0089284 A1 | 4/2005 | Ma |
| 2005/0212503 A1 * | 9/2005 | Deibele .............. G01R 19/0061 324/71.3 |
| 2006/0104578 A1 | 5/2006 | Herbst |
| 2006/0133750 A1 | 6/2006 | Lee |
| 2006/0140562 A1 | 6/2006 | Joseph et al. |
| 2006/0193575 A1 | 8/2006 | Greenwood et al. |
| 2006/0232385 A1 | 10/2006 | Scherer et al. |
| 2006/0285350 A1 | 12/2006 | Wang |
| 2007/0116402 A1 | 5/2007 | Slade et al. |
| 2007/0153508 A1 | 7/2007 | Nall et al. |
| 2007/0217749 A1 | 9/2007 | Jong et al. |
| 2008/0080820 A1 | 4/2008 | Andrews et al. |
| 2008/0087082 A1 | 4/2008 | Andrews et al. |
| 2008/0121171 A1 | 5/2008 | Hulsey |
| 2008/0198618 A1 | 8/2008 | North |
| 2008/0204235 A1 | 8/2008 | Cook |
| 2008/0273844 A1 | 11/2008 | Kewitsch |
| 2009/0027873 A1 | 1/2009 | Tarlton |
| 2009/0297104 A1 | 12/2009 | Kachmar |
| 2009/0299440 A9 | 12/2009 | Slatkine |
| 2010/0021114 A1 | 1/2010 | Chen et al. |
| 2010/0066254 A1 | 3/2010 | Ott et al. |
| 2010/0148747 A1 | 6/2010 | Rathbun, II et al. |
| 2010/0166374 A1 | 7/2010 | Lapp |
| 2010/0274235 A1 | 10/2010 | Mihajlovic et al. |
| 2011/0034068 A1 | 2/2011 | Russell |
| 2011/0085776 A1 | 4/2011 | Biribuze et al. |
| 2011/0103747 A1 | 5/2011 | Chang et al. |
| 2011/0103757 A1 | 5/2011 | Alkemper et al. |
| 2011/0122646 A1 | 5/2011 | Bickham et al. |
| 2011/0150488 A1 | 6/2011 | Kewitsch |
| 2011/0305035 A1 | 12/2011 | Bickham et al. |
| 2012/0019900 A1 | 1/2012 | Kitson et al. |
| 2012/0219259 A1 | 8/2012 | Kewitsch |
| 2012/0275178 A1 | 11/2012 | Logunov |
| 2012/0275180 A1 | 11/2012 | Button et al. |
| 2012/0275745 A1 | 11/2012 | Logunov |
| 2013/0021597 A1 | 1/2013 | Carlson, Jr. et al. |
| 2013/0088888 A1 | 4/2013 | Fewkes et al. |
| 2013/0107565 A1 | 5/2013 | Genier |
| 2013/0201001 A1 | 8/2013 | Ratnakar |
| 2013/0209045 A1 | 8/2013 | Dean, Jr. et al. |
| 2013/0272014 A1 | 10/2013 | Logunov et al. |
| 2013/0341922 A1 | 12/2013 | Jimenez Buendia |
| 2014/0016904 A1 | 1/2014 | Kachmar |
| 2014/0070639 A1 | 3/2014 | Tamura |
| 2014/0221763 A1 | 8/2014 | Vayser et al. |
| 2014/0227438 A1 | 8/2014 | Dean, Jr. et al. |
| 2014/0270639 A1 | 9/2014 | James, III et al. |
| 2014/0355295 A1 | 12/2014 | Kuchinsky et al. |
| 2014/0363134 A1 | 12/2014 | Bookbinder et al. |
| 2015/0043875 A1 | 2/2015 | Bookbinder et al. |
| 2015/0049992 A1 | 2/2015 | Bauco |
| 2015/0369986 A1 | 12/2015 | Logunov et al. |
| 2016/0139353 A1 | 5/2016 | Bauco et al. |
| 2016/0202418 A1 | 7/2016 | Fortin et al. |
| 2016/0231521 A1 | 8/2016 | Smith et al. |
| 2016/0313483 A1 | 10/2016 | Chomycz |
| 2016/0313513 A1 | 10/2016 | Wijbrans et al. |
| 2016/0377818 A1 | 12/2016 | Tong et al. |
| 2017/0207585 A1 | 7/2017 | Butler et al. |
| 2017/0293102 A1 | 10/2017 | Bauco et al. |
| 2018/0128996 A1 * | 5/2018 | Sawicki |

FOREIGN PATENT DOCUMENTS

| | | |
|---|---|---|
| CN | 102589728 A | 7/2012 |
| CN | 201305952 U | 7/2012 |
| CN | 203241575 U | 10/2013 |
| DE | 4413597 A1 | 10/1995 |
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 0874191 A2 | 10/1998 |
| EP | 0952589 A2 | 10/1999 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 59182404 A | 4/1983 |
| JP | 61139221 A | 6/1986 |
| JP | 61161827 U | 10/1986 |
| JP | 1990055506 A | 2/1990 |
| JP | 2108007 A | 4/1990 |
| JP | 2108008 A | 4/1990 |
| JP | 6017157 U | 3/1994 |
| JP | 06130253 A | 5/1994 |
| JP | 9178956 A | 7/1997 |
| JP | 9237524 A | 9/1997 |
| JP | 2008153030 A | 7/2008 |
| JP | 2009244288 A | 10/2009 |
| JP | 2010237233 A | 10/2010 |
| JP | 2013196960 A | 9/2013 |
| KR | 875507 B1 | 12/2008 |
| WO | 1998034144 A1 | 8/1998 |
| WO | 1999024856 A1 | 6/1999 |
| WO | 2000011484 A1 | 3/2000 |
| WO | 2005106899 A1 | 11/2005 |
| WO | 2006044177 A2 | 4/2006 |
| WO | 2006113114 A2 | 10/2006 |
| WO | 2007053371 A1 | 5/2007 |
| WO | 2008048955 A2 | 4/2008 |
| WO | 2010011299 A2 | 1/2010 |
| WO | 2010021896 A1 | 2/2010 |
| WO | 2011063214 A | 5/2011 |
| WO | 2013055842 A1 | 4/2013 |
| WO | 2013059811 A1 | 4/2013 |
| WO | 2013122825 A1 | 8/2013 |

(56) References Cited

FOREIGN PATENT DOCUMENTS

WO 2014026300 A1 2/2014
WO 2015000194 A1 1/2015

OTHER PUBLICATIONS

Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.
Fiber Optic Products, Inc., "Specifications of our Fiber and Cable," n.d. Retrieved on Aug. 9, 2013, 2 pages.
M. Rajesh, "Polymer Photonics: An Overview," Fabrication and Characterisation, 2011, 38 pages.
Schott, "SpectraStream Glass Harnesses," Rev. Nov. 2006, 2 pages.
Spigulis, J., "Side-Emitting Fibers Brighten Our World in New Ways," Oct. 2005, Retrieved from www.osa-opn.org, 6 pages.
Patent Cooperation Treaty, International Search Report, Application No. PCT/US2013/025262, dated Jul. 16, 2013, 7 pages.
U.S. Appl. No. 62/193,638, U.S. Appl. No. 62/221,769—Listed in ID as 26113.
"Super Vision Fiber Optics Side Glow Cables, " TriN01ihLighting.com, Tri North Lighting, Inc., n.d., Web. Aug. 1, 2013.
U.S. Appl. No. 13/431,565, filed Mar. 27, 2012, David L. Dean, Jr., 32 pages.
European Search Report, Application No. 15168466.9-1553, Dec. 17, 2015, 9 pages.
Optical fiber with nanostructured cladding ofTi02 nahoparticles self-assembled onto a side polished fiber and its temperature sensing, Lu et al., Optics Express, vol. 22, No. 26, Dec. 29, 2014, 7 pages, downloaded from Internet on Jan. 5, 2015.
Patent Cooperation Treaty, International Search Report for PCT/US2015/060558, dated Feb. 9, 2016, 5 pages.
Patent Cooperation Treaty International Search Report, Application No. PCT/US2014/049524, dated Jan. 20, 2015, 5 pages.
"Diode Lasers, Fiber Optics, IR, Red, Green, Blue Diode Lasers, Laser Diode, Fiber Illuminators, Fiber Optics, Coupler, Galvonarneters, Laser Show Acessories," Jan. 1, 2013, httn://www.meshtel.com/, 1 oage.
Patent Cooperation Treaty, International Search Report, PCT/US2014/049525, dated Jan. 23, 2015, 18 pages.
U.S. Appl. No. 14/295,844, Bookbinder filed on Jun. 4, 2014, 25 pages.
Patent Cooperation Treaty, International Search Report and Written Opinion for International Application No. PCT/US2014/041510, dated Sep. 18, 2014, 10 pages.
U.S. Appl. No. 14/791,924, filed May 20, 2015.
U.S. Appl. No. 15/000,128, filed Jan. 19, 2016.
U.S. Appl. No. 15/054,380, filed Mar. 31, 2015.
U.S. Appl. No. 15/142,853, filed Apr. 29, 2016.
U.S. Appl. No. 62/193,638, filed Jul. 17, 2015.
U.S. Appl. No. 62/193,643, filed Jul. 17, 2015.
U.S. Appl. No. 62/221,769, filed Sep. 22, 2015.
U.S. Appl. No. 62/221,774, filed Sep. 22, 2015.
U.S. Appl. No. 62/248,490, filed Oct. 30, 2015.
International Search Report and Written Opinion PCT/US2016/020542 dated Jun. 7, 2016.
"Side Emitting Super Glowing Fiber." MeshTel.corn. MeshTel-Intelite, Inc., 1996-2012. Web. Aug. 1, 2013.
European Search Report EP15168466 dated Dec. 17, 2015.
International Search Report and Written Opinion PCT/US2016/031624 dated Aug. 31, 2016.
International Search Report and Written Opinion PCT/US2016/042414 dated Oct. 5, 2016.
International Searching Authority Invitation to Pay Additional Search Fees PCT/US2016/042416 dated Oct. 7, 2016.
International Searching Authority Invitation to Pay Additional Fees PCT/US2016/055497 dated Dec. 19, 2016.
Endruweit et al. "Spectroscopic experiments regarding the efficiency of side emission optical fibres in the UV-A and visible blue spectrum", Optics and Lasers Engineering 46 (2008) pp. 97-105,.
U.S. Appl. No. 62/193,638, A. Bauco et al., "Systems and Methods for Traceable Cables," filed Jul. 17, 2015.
U.S. Appl. No. 62/221,769, A. Bauco et al., "Systems and Methods for Traceable Cables," filed Sep. 22, 2015.
International Search Report and Written Opinion PCT/US2017/012899 dated Mar. 9, 2017.

* cited by examiner

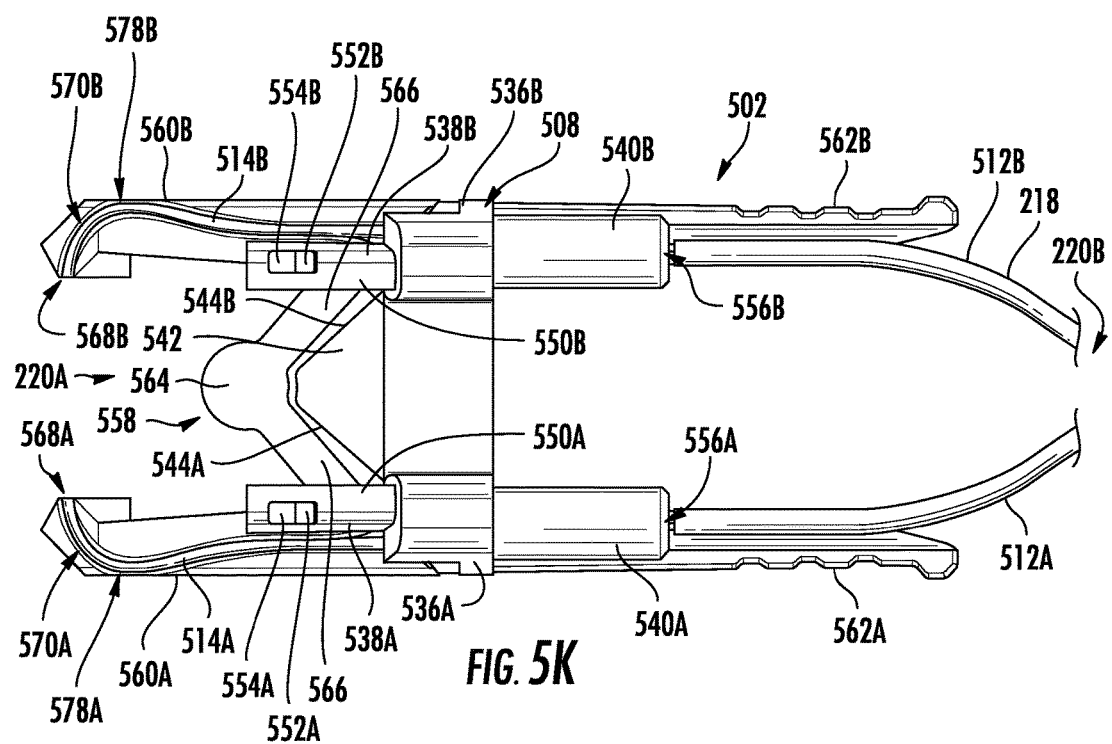

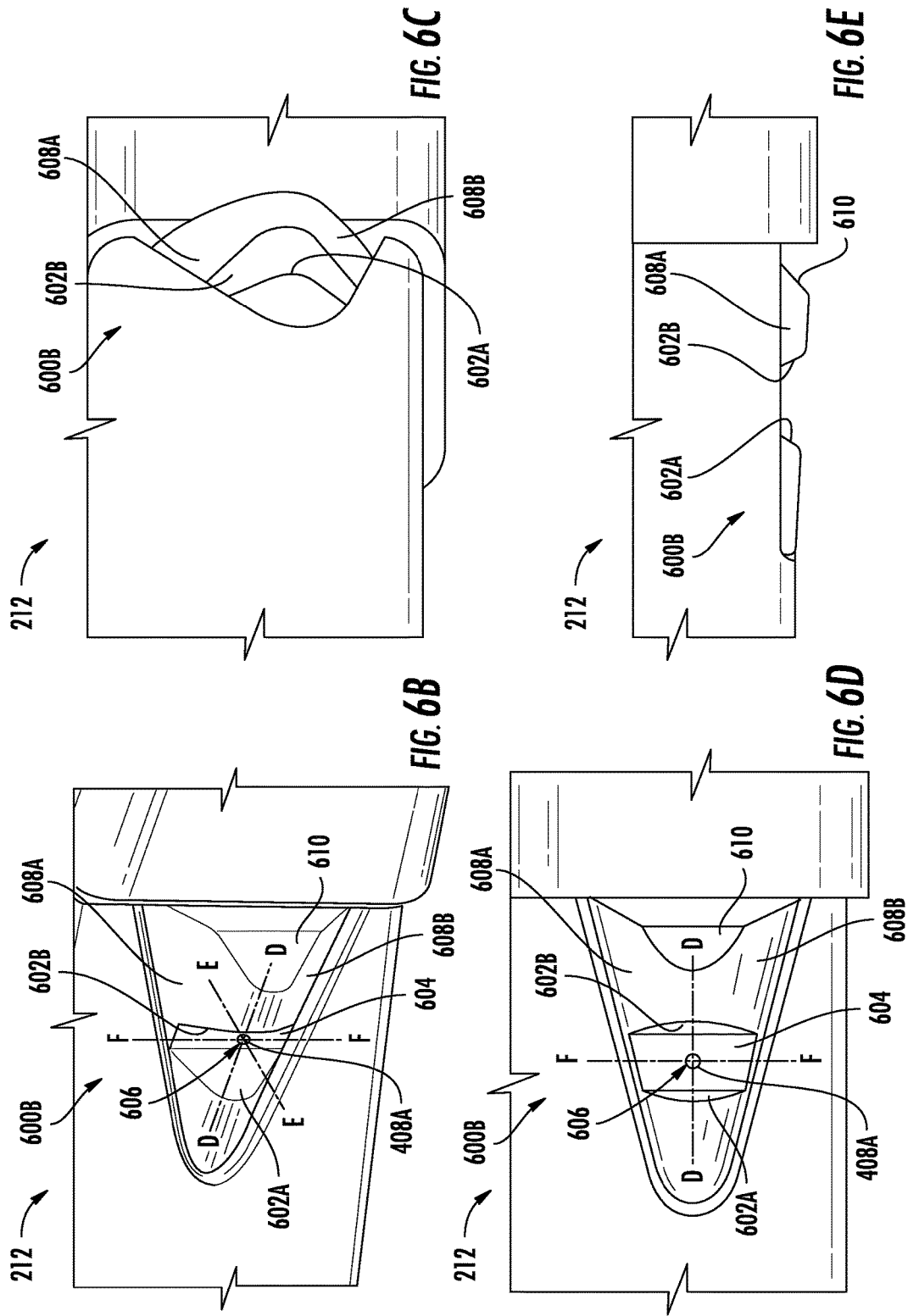

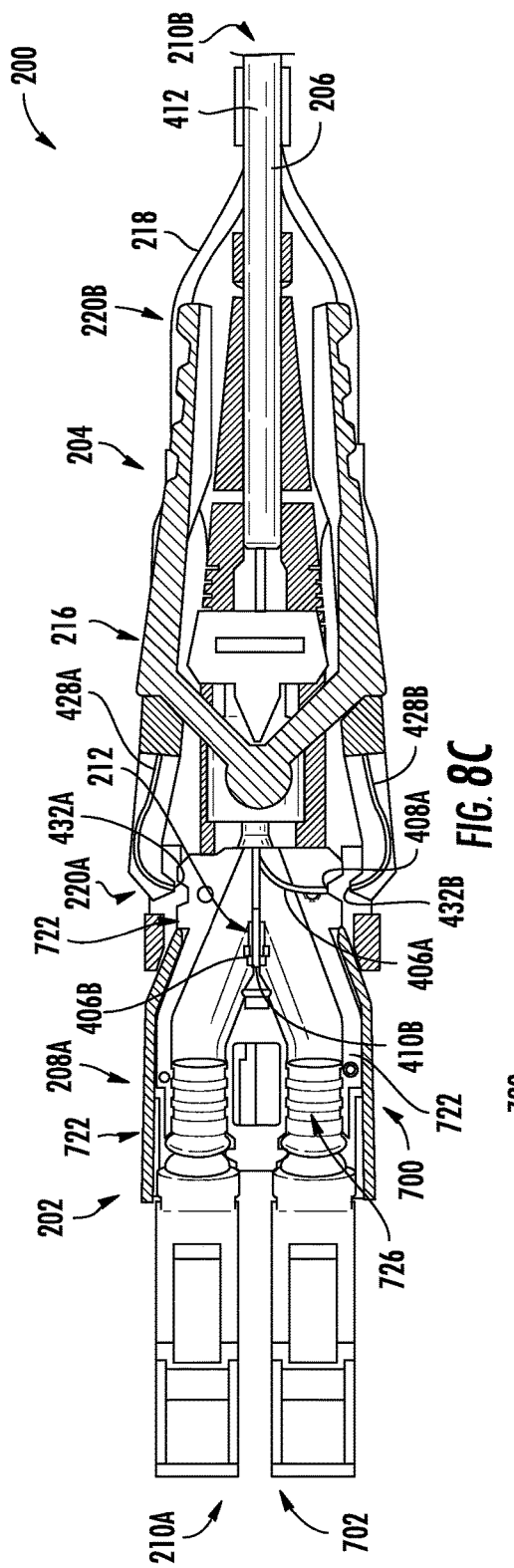
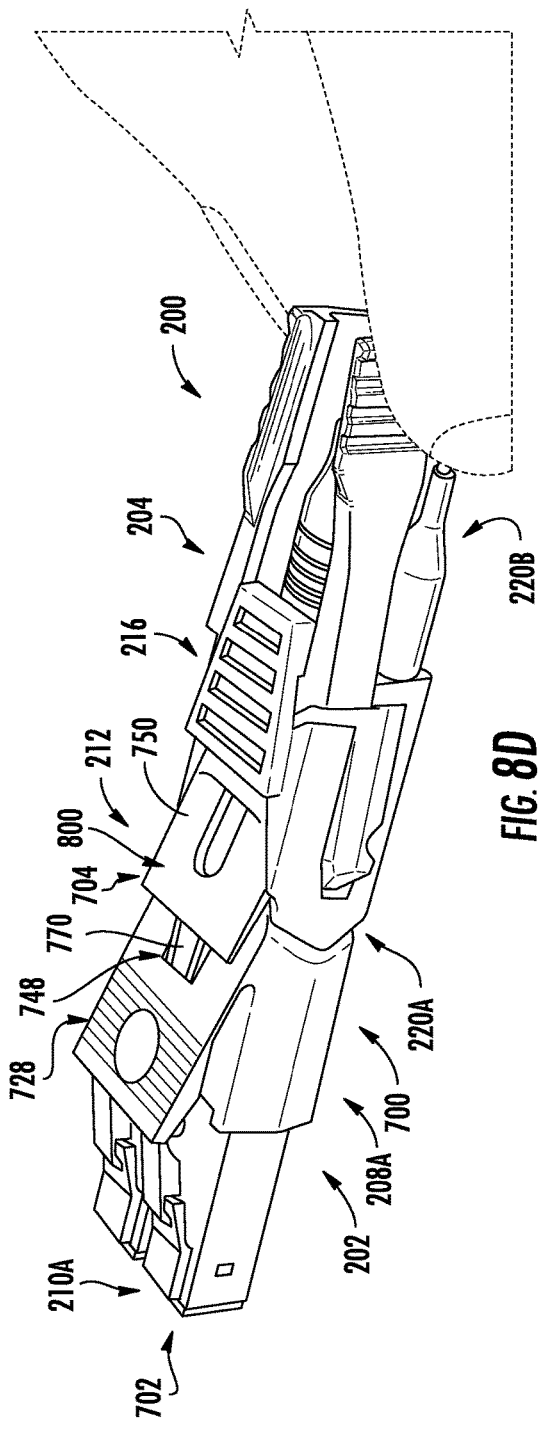
FIG. 8C
FIG. 8D

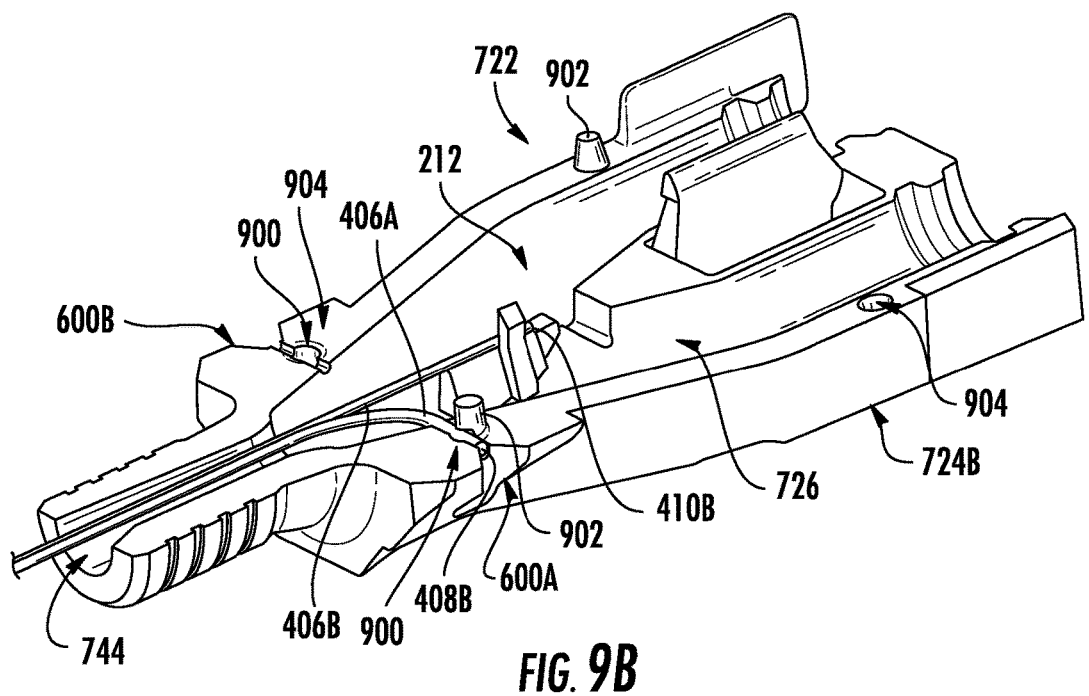

TRACEABLE FIBER OPTIC CABLE ASSEMBLY WITH FIBER GUIDE AND TRACING OPTICAL FIBERS FOR CARRYING LIGHT RECEIVED FROM A LIGHT LAUNCH DEVICE

CROSS-REFERENCE TO RELATED APPLICATIONS

This application claims the benefit of priority to U.S. Provisional Patent Application Ser. No. 62/437,080 filed on Dec. 21, 2016, the content of which is relied upon and incorporated herein by reference in its entirety.

This application is also related to U.S. patent application Ser. No. 15/411,198, filed concurrently on Jan. 20, 2017 and entitled "Traceable Fiber Optic Cable Assembly With Illumination Structure And Tracing Optical Fibers For Carrying Light Received From A Light Launch Device," which is incorporated by reference herein in its entirety.

This application is also related to U.S. patent application Ser. No. 15/411,235, filed concurrently on Jan. 20, 2017 and entitled "Light Launch Device For Transmitting Light Into A Traceable Fiber Optic Cable Assembly With Tracing Optical Fibers," which is incorporated by reference herein in its entirety.

BACKGROUND

This disclosure relates generally to fiber optic cable assemblies having tracing waveguides configured to receive light from a light launch device to facilitate location of portions (e.g., end points) of a fiber optic cable assembly.

Computer networks continue to increase in size and complexity. Businesses and individuals rely on these networks to store, transmit, and receive critical data at high speeds. Even with the expansion of wireless technology, wired connections remain critical to the operation of computer networks, including enterprise data centers. Portions of these wired computer networks are regularly subject to removal, replacement, upgrade, or other moves and changes. To ensure the continued proper operation of each network, the maze of cables connecting the individual components must be precisely understood and properly connected between specific ports.

In many cases, a network's cables, often called patch cords, can be required to bridge several meters across a data center, among other uses (e.g., within high performance computers). These cables are used between racks of servers, storage, switches, and patch panels. The cables may begin in one equipment rack, run through the floor or other conduit, and terminate at a component in a second equipment rack. Data center operators may need to reconfigure patch panel endpoints to adapt to changes in use patterns or to turnover in equipment, which requires knowing the attachment location of both ends of the cable. To change the configuration of a patch cord, an operator needs to know where both ends of the cord are attached. However, in practice, it is not unusual for the operators to only know where one end of the patch cord is connected. To determine where the other end is can be time consuming and fraught with risk.

FIGS. 1A-1B are views of network cables (e.g., patch cords 100) used in fiber optic equipment. More specifically, FIG. 1A is a perspective view of an equipment rack 102 supporting patch cords 100, and FIG. 1B is a perspective view of an under-floor cable tray 104 supporting patch cords 100. FIGS. 1A-1B illustrate a problem that occurs in data centers or similar network locations, which is congestion and clutter caused by large quantities of patch cords 100. Network operators frequently need to change connections to accommodate moves, additions, and changes in the network. However, operators find it difficult to trace a particular patch cord 100 from the source to the receiver (e.g., ends of the patch cords 100) when the network location is congested, as illustrated in FIGS. 1A and 1B.

However, even when cable ends are illuminated, they may not be easily visible to the operator, such as if the cable ends are using low intensity lighting, have small or obscured lighting portions, etc. Further, in some cases, the operator must remove a first cable end to use a tracing tool to find the second cable end. In addition to being cumbersome and time consuming, removal of cable ends increases the risk of network routing accidents and mistakes (e.g., reinserting a removed cable end into the wrong port). Even still, some cables may use electrical components for tracing endpoints of the cable, but for fiber optic cables this may be undesirable, for example, due to the desire to have an "all optical" system.

As a result, there is a need for a traceable cable and/or light launch device that allows a network operator to quickly identify the terminal end of a given cable (e.g., such as those that are being replaced, relocated, or tested) with the lowest possible risk of error.

No admission is made that any reference cited herein constitutes prior art. Applicant expressly reserves the right to challenge the accuracy and pertinency of any cited documents.

SUMMARY

Embodiments of the disclosure are directed to a traceable fiber optic cable assembly with a fiber guide and tracing optical fibers for carrying light received from a light launch device. In an exemplary embodiment, the traceable fiber optic cable assembly comprises a traceable fiber optic cable connectorized by a first fiber optic connector and a second fiber optic connector each disposed at end portions of the fiber optic cable. The traceable fiber optic cable comprises at least one data transmission fiber (e.g., transmit and receive optical data fibers) for data communication of an optical data signal therethrough. The traceable fiber optic cable also includes a tracing optical fiber comprising a launch end and a first emission end. The tracing optical fiber is configured to receive an optical tracing signal (e.g., light) from a launch light source and carry the received optical tracing signal from the first launch end to the first emission end for tracing the traceable fiber optic cable. For example, if the first launch end of the tracing optical fiber is located at the first fiber optic connector and the first emission end of the tracing optical fiber is located at the second fiber optic connector, optical tracing signal launched into the first launch end and emitted to the first emission end of the tracing optical fiber may illuminate a portion of the second fiber optic connector to be human perceptible to allow a person to trace the second fiber optic connector of the traceable fiber optic cable. To facilitate the launching of an optical tracing signal into the tracing optical fiber, in certain examples disclosed herein, the first fiber optic connector contains a registration feature (e.g., connector fiber guide) that is configured to interface (in some cases toollessly) with a removable launch connector when it is desired to launch an optical tracing signal from the launch light source to the launch end of the tracing optical fiber. The launch connector is configured to toollessly engage to the first fiber optic connector to direct the optical tracing signal emitted by the launch light source through the launch connector and to the launch end of the tracing optical fiber at the first fiber optic connector when tracing is desired. The launch connector can be removed from the first fiber optic connector after tracing is completed. In other examples, the traceable fiber optic cable may also include a second tracing optical fiber comprising a second launch end at the second fiber optic connector and a second emission end at the first fiber optic connector to allow interfacing of a launch connector for tracing the first fiber optic connector of the traceable fiber optic connector.

To facilitate the ability to launch an optical tracing signal in the tracing optical fibers disposed at the first and/or second fiber optic connectors of the traceable fiber optic cable assembly, the first and/or second fiber optic connector comprise a housing defining an interior comprising a connector fiber guide. The connector fiber guide comprises a planar surface, a launch opening defined in the planar surface, and at least one alignment surface proximate the first planar surface. The launch end of the first and/or second tracing optical fibers are positioned in the housing of the first and/or second fiber optic connectors, respectively. The emission end of the first and second tracing optical fibers are positioned in the housings of the second and/or first fiber optic connectors, respectively. The planar surface provides cleaving access to the launch end of the first and/or second tracing optical fibers. The at least one alignment surface is configured to axially align the launch optical fiber of the launch connector with the launch end of the first and/or second tracing optical fibers when the launch connector is engaged to a first or second fiber optic connector. The first and/or second fiber optic connector further comprises a translucent internal illumination structure positioned within the interior of the housing and a translucent external illumination structure positioned at the exterior of the housing. The translucent internal and external illumination structures are configured to redirect and/or disperse at least a portion of an optical tracing signal when emitted from the launch end of the tracing fiber (e.g., by total internal reflection).

Accordingly, the traceable fiber optic cable assembly facilitates the easy tracing of the traceable fiber optic cable assembly using fiber optic tracing signals (in some cases without the need for additional electrical components). Further, the launch connector is easily engaged to and removed from the fiber optic connector with repeatable and reliable alignment of optical fibers, even when the fiber optic connector is mechanically and/or electronically engaged with a fiber optic component. The traceable fiber optic cable assembly connectors are configured to efficiently illuminate at least a portion of the fiber optic connector for effective visibility for a user to quickly locate the traceable fiber optic cable assembly connector.

One embodiment of the disclosure relates to a cable tracing system, comprising a fiber optic connector. The fiber optic connector comprises a housing, at least one data transmission element, a first launch end of a first tracing optical fiber, and a second emission end of a second tracing optical fiber. The housing defines an interior and comprises a connector fiber guide. The connector fiber guide comprises a planar surface, a launch opening defined in the planar surface, and at least one alignment surface proximate the planar surface. At least a portion of the at least one data transmission element is positioned within the interior of the housing for direction of an optical data signal. The first launch end is positioned within the launch opening of the housing and accessible from an exterior of the housing for receiving a first optical tracing signal from a launch optical fiber to direct the first optical tracing signal to a first emission end of the first tracing optical fiber. The second emission end is positioned within the housing. The at least one alignment surface is configured to axially align the launch optical fiber with the first launch end of the first tracing optical fiber.

An additional embodiment of the disclosure relates to a cable tracing system comprising a traceable fiber optic cable assembly. The traceable fiber optic cable assembly comprises a traceable fiber optic cable, a first fiber optic connector and a second fiber optic connector. The traceable fiber optic cable comprises at least one data transmission element for communication of an optical data signal, a first tracing optical fiber comprising a first launch end and a first emission end, and a second tracing optical fiber comprising a second launch end and a second emission end. The first fiber optic connector is provided at a first end of the traceable fiber optic cable. The first fiber optic connector comprises a first housing defining a first interior and comprises a first connector fiber guide. The first connector fiber guide comprises a first planar surface, a first launch opening defined in the first planar surface, and at least one first alignment surface proximate the first planar surface. The second fiber optic connector is provided at a second end of the traceable fiber optic cable. The second fiber optic connector comprises a second housing defining a second interior and comprises a second connector fiber guide. The second connector fiber guide comprises a second planar surface, a second launch opening defined in the second planar surface, and at least one second alignment surface proximate the first planar surface. The first launch end of the first tracing optical fiber is positioned within the first launch opening of the first housing of the first fiber optic connector and the first emission end of the first tracing optical fiber is positioned within the second housing of the second fiber optic connector. The second launch end of the second tracing optical fiber is positioned within the second launch opening of the second housing of the second fiber optic connector and the second emission end of the second tracing optical fiber is positioned within the first housing of the first fiber optic connector. The first launch end is accessible from an exterior of the second housing for receiving a first optical tracing signal from a launch optical fiber for direction of the first optical tracing signal to the first emission end of the first tracing optical fiber. The second launch end is accessible from an exterior of the first housing for receiving a second optical tracing signal from the launch optical fiber for direction of the second optical tracing signal to the second emission end of the second tracing optical fiber. At least a portion of a peripheral edge of the first planar surface is not enclosed by the at least one first alignment surface to provide cleaving access to the first launch end of the first tracing optical fiber. At least a portion of a peripheral edge of the second planar surface is not enclosed by the at least one second alignment surface to provide cleaving access to the second launch end of the second tracing optical fiber. The at least one first alignment surface is configured to axially align the launch optical fiber with the first launch end of the first tracing optical fiber. The at least one second alignment surface is configured to axially align the launch optical fiber with the second launch end of the second tracing optical fiber.

An additional embodiment of the disclosure relates to a cable tracing system comprising a fiber optic connector. The fiber optic connector comprises a housing, at least one data transmission element, and a first end of a tracing optical fiber. The housing defines an interior and comprises a connector fiber guide. The connector fiber guide comprises an opening, and at least one alignment surface proximate the opening. At least a portion of the at least one data transmission element is positioned within the interior of the housing for direction of an optical data signal. A first end of a tracing optical fiber is positioned within the opening of the housing and accessible from an exterior of the housing for receiving a first optical tracing signal from a launch optical fiber to direct the first optical tracing signal to a second end of the tracing optical fiber. The at least one alignment surface is configured to axially align the launch optical fiber with the first end of the tracing optical fiber.

An additional embodiment of the disclosure relates to a cable tracing system comprising a fiber optic connector. The fiber optic connector comprises a housing, a translucent internal illumination structure, at least one data transmission element, a first launch end of a first tracing optical fiber, and a second emission end of a second tracing optical fiber. The housing defines an interior and comprising a launch opening. The translucent internal illumination structure is positioned within the interior of the housing. At least a portion of the at least one data transmission element is positioned within the interior of the housing for communication of an optical data signal. The first launch end is positioned within the launch opening of the housing and accessible from an exterior of the housing for receiving a first optical tracing signal from a launch optical fiber to direct the first optical tracing signal to a first emission end of the first tracing optical fiber. The second emission end of the second tracing optical fiber is positioned within the housing. The translucent internal illumination structure is configured to redirect at least a primary portion of the second optical tracing signal when emitted from the second launch end.

An additional embodiment of the disclosure relates to a cable tracing system comprising a traceable fiber optic cable assembly, a fiber optic connector, a translucent first internal illumination structure, a second fiber optic connector, and a translucent second internal illumination structure. The traceable fiber optic cable comprises at least one data transmission element for communication of an optical data signal, a first tracing optical fiber comprising a first launch end and a first emission end, and a second tracing optical fiber comprising a second launch end and a second emission end. The first fiber optic connector is provided at a first end of the traceable fiber optic cable, the first fiber optic connector comprising a first housing defining a first interior and comprising a first launch opening. The translucent first internal illumination structure positioned within the first interior of the first housing. The second fiber optic connector is provided at a second end of the traceable fiber optic cable. The second fiber optic connector comprises a second housing defining a second interior and comprising a second launch opening. The translucent second internal illumination structure is positioned within the second interior of the second housing. The first launch end of the first tracing optical fiber is positioned within the first launch opening of the first housing of the first fiber optic connector and the first emission end of the first tracing optical fiber is positioned within the second housing of the second fiber optic connector. The second launch end of the second tracing optical fiber is positioned within the second launch opening of the second housing of the second fiber optic connector and the second emission end of the second tracing optical fiber is positioned within the first housing of the first fiber optic connector. The first launch end is accessible from an exterior of the first housing for receiving a first optical tracing signal from a launch optical fiber for direction of the first optical tracing signal to the first emission end of the first tracing optical fiber. The second launch end is accessible from an exterior of the second housing for receiving a second optical tracing signal from the launch optical fiber for direction of the second optical tracing signal to the second emission end of the second tracing optical fiber. The translucent first internal illumination structure is configured to redirect at least a primary portion of the first optical tracing signal when emitted from the second launch end. The translucent second internal illumination structure is configured to redirect at least a primary portion of the second optical tracing signal when emitted from the first launch end.

An additional embodiment of the disclosure relates to a cable tracing system comprising a fiber optic connector. The fiber optic connector comprises a housing, a translucent internal illumination structure, at least one data transition element, and a first end of a tracing optical fiber. The housing defines an interior. The translucent internal illumination structure is positioned within the interior of the housing. At least a portion of the at least one data transmission element is positioned within the interior of the housing for communication of an optical data signal. The first end of the tracing optical fiber is positioned within the housing and accessible from an exterior of the housing for receiving an optical tracing signal from a launch optical fiber to direct the optical tracing signal to a second end of the tracing optical fiber. The translucent internal illumination structure is configured to redirect at least a primary portion of the second optical tracing signal when emitted from the first end.

An additional embodiment of the disclosure relates to a light launch device for a traceable fiber optic cable assembly. The light launch device comprising a light source, a launch connector, and a first launch optical fiber. The light source generates a first optical tracing signal. The launch connector comprises a housing and a first arm. The housing comprises a central channel with an open bottom configured to receive at least a portion of a fiber optic connector of the traceable fiber optic cable assembly. The first arm is movably connected to the housing and comprises a first launch fiber guide. The first launch fiber guide comprises a first emission opening and at least one first alignment surface proximate the first emission opening. The first arm is moveable from an engaged orientation to a disengaged orientation for engaging and disengaging the fiber optic connector of the traceable fiber optic cable assembly. The first launch optical fiber comprises a first launch end and a first emission end. The first emission end is positioned in the first emission opening of the first arm, and the first launch end is in communication with the light source to receive an optical tracing signal therefrom. The at least one first alignment surface is configured to axially align the first emission end of the first launch optical fiber with the first launch end of a first tracing optical fiber of the traceable fiber optic cable assembly for direction of the first optical tracing signal to the first tracing optical fiber.

An additional embodiment of the disclosure relates to a method of tracing a fiber optic cable. The method comprises positioning at least a portion of a first fiber optic connector of a traceable fiber optic cable assembly within a central channel with an open bottom of the housing of the launch connector of the light launch device. The traceable fiber optic cable assembly comprises the first fiber optic connector, a second fiber optic connector, and a traceable fiber optic cable therebetween. The method further comprises moving a first arm movably connected to the housing of the launch connector from a disengaged position to an engaged position to mechanically engage the launch connector to the first fiber optic connector. A first launch fiber guide of the first arm of the light launch device mechanically interacts with a connector fiber guide during engagement to axially align a emission end of a launch optical fiber with a launch end of a tracing optical fiber of the first fiber optic connector. The method further comprises transmitting a first tracing signal from a light source of the light launch device, through the launch optical fiber, through the launch end of the tracing optical fiber positioned in the first fiber optic connector, through an emission end of the tracing optical fiber positioned in the second fiber optic connector.

An additional embodiment of the disclosure relates a method of manufacturing a light launch device for a traceable fiber optic cable assembly. The method comprises forming a launch connector. The launch connector comprises a housing and an arm. The housing comprises a central channel with an open bottom configured to receive at least a portion of a fiber optic connector of the traceable fiber optic cable assembly. The arm is movably connected to the housing and comprises a launch fiber guide. The launch fiber guide comprises an emission opening and at least one alignment surface proximate the emission opening. The arm is moveable from an engaged orientation to a disengaged orientation for engaging and disengaging the fiber optic connector of the traceable fiber optic cable assembly. The method further comprises forming a launch optical fiber comprising a launch end and a emission end. The method further comprises positioning the emission end in the emission opening of the arm. The method further comprises coupling the launch end with the light source to receive the first optical tracing signal therefrom. The at least one alignment surface is configured to axially align the emission end of the launch optical fiber with a launch end of a first tracing optical fiber of the traceable fiber optic cable assembly for direction of the first optical tracing signal to the first tracing optical fiber.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 5I is a top perspective view of the clip of the launch connector of FIG. 5A including an enlarged perspective view of a launch fiber guide;

FIG. 5K is a bottom view of the rear body, clip, and first and second launch optical fibers of the launch connector of FIG. 5A;

FIG. 6B is a front perspective view of a connector fiber guide of the traceable fiber optic cable assembly of FIG. 6A;

FIG. 6C is a rear perspective view of a connector fiber guide of the traceable fiber optic cable assembly of FIG. 6A;

FIG. 6D is a side view of the connector fiber guide of the traceable fiber optic cable assembly of FIG. 6A;

FIG. 6E is a top view of the connector fiber guide of the traceable fiber optic cable assembly of FIG. 6A;

FIG. 8C is a cross-sectional top view of the first fiber optic connector and launch connector of FIG. 8A as the launch connector engages the first fiber optic connector;

FIG. 8D is a top perspective view of the first fiber optic connector and launch connector of FIG. 8C;

FIG. 9B is a perspective view of the first fiber optic connector housing bottom clamshell of FIG. 9A with a launch end of the first tracing optical fiber and an emission end of the second tracing optical fiber positioned therein;

FIG. 10I is a flowchart illustrating an exemplary process of using the light launch device of FIGS. 2A-2C, 4-5L, and 8A-8F to trace a fiber optic connector of a traceable fiber optic cable assembly;

DETAILED DESCRIPTION

Figure 1A:
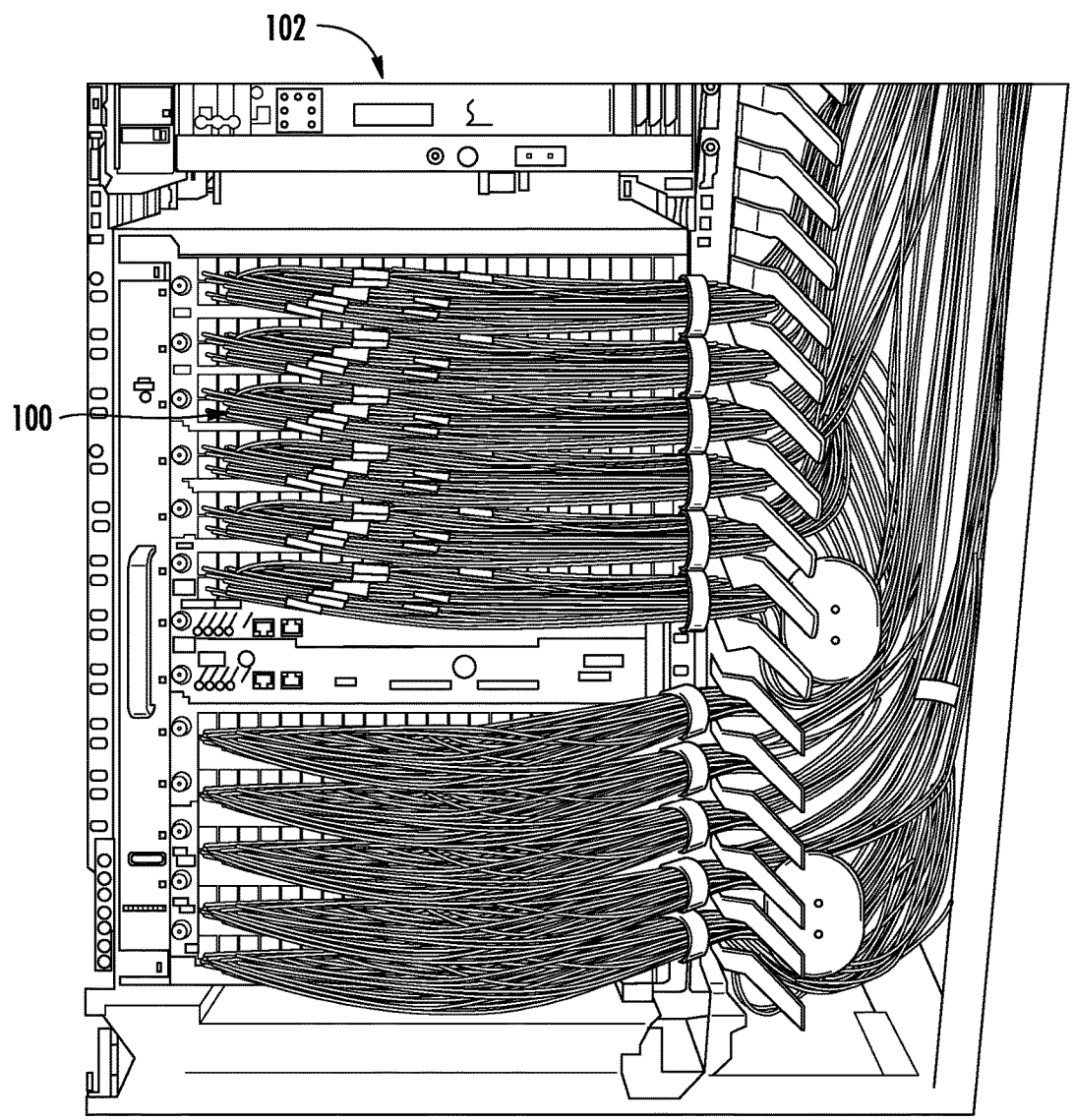
FIG. 1A is a perspective view of an equipment rack supporting patch cords.

Embodiments of the disclosure are directed to a traceable fiber optic cable assembly with tracing optical fibers for carrying light received from a light launch device. In an exemplary embodiment, the traceable fiber optic cable assembly comprises a traceable fiber optic cable connectorized by a first fiber optic connector and a second fiber optic connector each disposed at end portions of the fiber optic cable. The traceable fiber optic cable comprises at least one data transmission fiber (e.g., transmit and receive optical data fibers) for data communication of an optical data signal therethrough. The traceable fiber optic cable also includes a tracing optical fiber comprising a launch end and a first emission end. The tracing optical fiber is configured to receive an optical tracing signal (e.g., light) from a launch light source and carry the received optical tracing signal from the first launch end to the first emission end for tracing the traceable fiber optic cable. For example, if the first launch end of the tracing optical fiber if located at the first fiber optic connector and the first emission end of the tracing optical fiber is located at the second fiber optic connector, optical tracing signal launched into the first launch end and emitted to the first emission end of the tracing optical fiber may illuminate a portion of the second fiber optic connector to be human perceptible to allow a person to trace the second fiber optic connector of the traceable fiber optic cable. To facilitate the launching of an optical tracing signal into the tracing optical fiber, in examples disclosed herein, the first fiber optic connector contains a registration feature (e.g., connector fiber guide) that is configured to toollessly interface with a removable launch connector when it is desired to launch an optical tracing signal from the launch light source to the launch end of the tracing optical fiber. The launch connector is configured to toollessly engage to the first fiber optic connector to direct the optical tracing signal emitted by the launch light source through the launch connector and to the launch end of the tracing optical fiber at the first fiber optic connector when tracing is desired. The launch connector can be removed from the first fiber optic connector after tracing is completed. In other examples, the traceable fiber optic cable may also include a second tracing optical fiber comprising a second launch end at the second fiber optic connector and a second emission end at the first fiber optic connector to allow interfacing of a launch connector for tracing the first fiber optic connector of the traceable fiber optic connector.

To facilitate the ability to launch an optical tracing signal in the tracing optical fibers disposed at the first and/or second fiber optic connectors of the traceable fiber optic cable assembly, the first and/or second fiber optic connector comprise a housing defining an interior comprising a connector fiber guide. The connector fiber guide comprises a planar surface, a launch opening defined in the planar surface, and at least one alignment surface proximate the first planar surface. The launch end of the first and/or second tracing optical fibers are positioned in the housing of the first and/or second fiber optic connectors, respectively. The emission end of the first and second tracing optical fibers are positioned in the housings of the second and/or first fiber optic connectors, respectively. The planar surface provides cleaving access to the launch end of the tracing optical fiber. The at least one alignment surface is configured to axially align the launch optical fiber of the launch connector with the launch end of the tracing optical fiber when the launch connector is engaged to a first or second fiber optic connector. The first and/or second fiber optic connector further comprises a translucent internal illumination structure positioned within the interior of the housing and a translucent external illumination structure positioned within the exterior of the housing. The translucent internal and external illumination structures are configured to redirect and/or disperse at least a portion of an optical tracing signal when emitted from the emission end of the tracing optical fiber (e.g., by total internal reflection).

Accordingly, the traceable fiber optic cable assembly facilitates the easy tracing of the traceable fiber optic cable assembly using fiber optic tracing signals. Further, the launch connector is easily engaged to and removed from the fiber optic connector with repeatable and reliable alignment of optic fibers, even when the fiber optic connector is mechanically and/or electronically engaged with a fiber optic component. The traceable fiber optic cable assembly connectors are configured to efficiently illuminate an exterior of the connector for effective visibility for a user to quickly locate the traceable fiber optic cable assembly connector.

Reference is now made in detail to exemplary embodiments of the disclosure, examples of which are illustrated in the accompanying drawings. Whenever possible, the same or similar reference numerals are used throughout the drawings to refer to the same or similar parts. It should be understood that the embodiments disclosed herein are merely examples, each incorporating certain benefits of the present disclosure. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

The optical tracing signal, as used herein, includes light directed from a first end of an optical fiber to a second end of the optical fiber. The optical tracing signal is used as a visual indicator to alert a user to the location of a portion of the cable assembly. The optical tracing signal may pulse, fluctuate, or otherwise vary in some embodiments, may also include data in some embodiments, and may not include data in other embodiments.

Figure 1B:
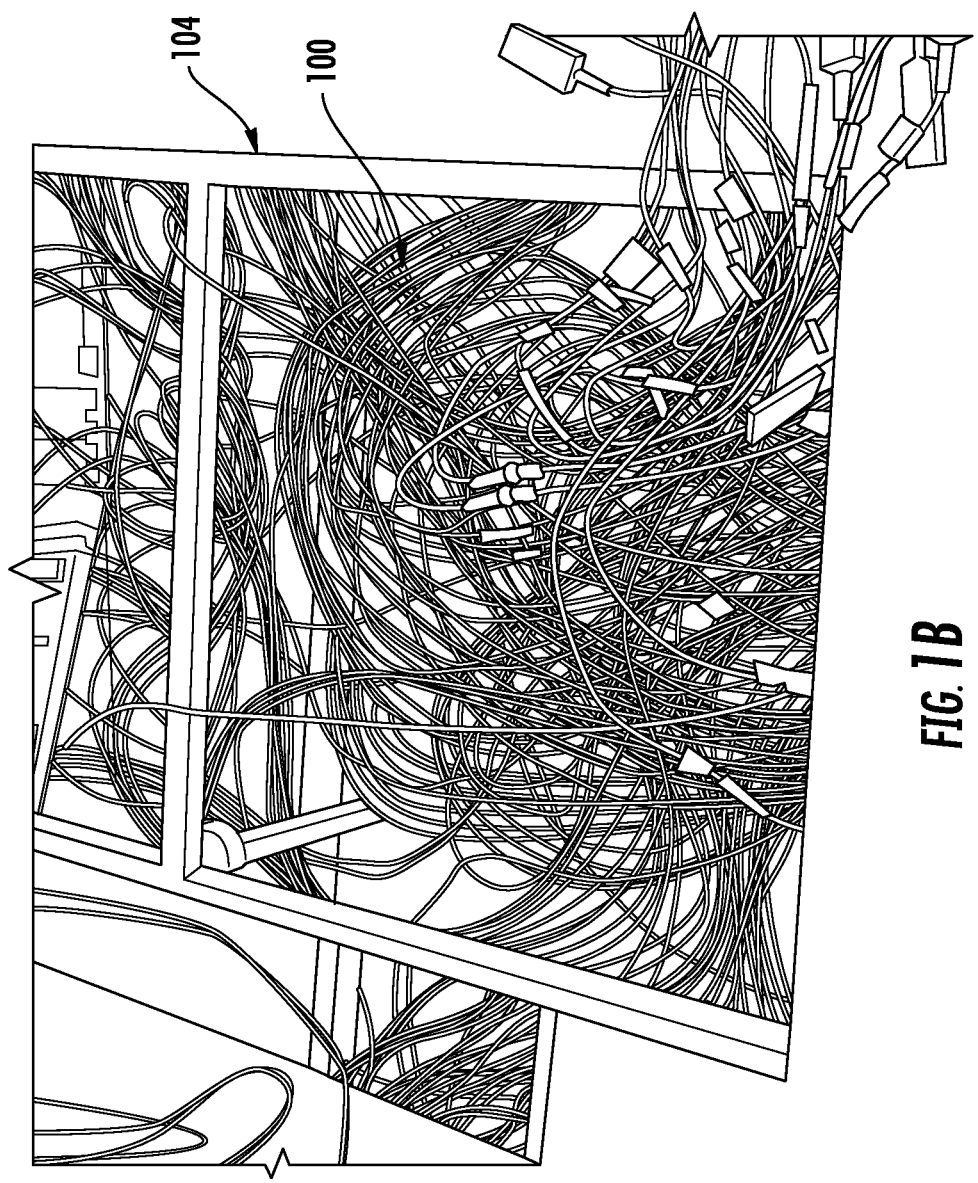
FIG. 1B is a perspective view of an under-floor cable tray supporting patch cords.
Figure 2A:
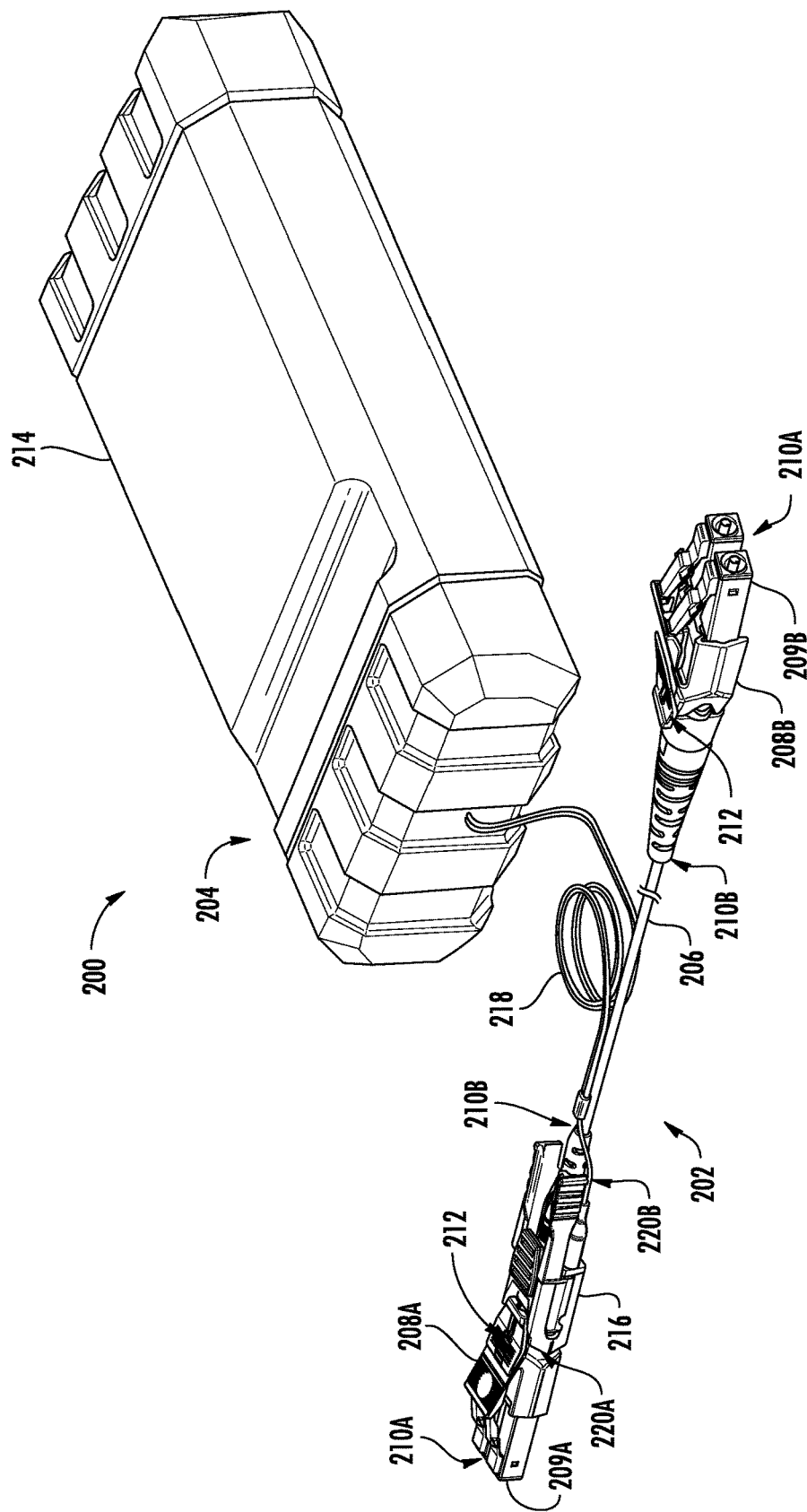
FIG. 2A is a perspective view of an exemplary cable tracing system, such as for use with the patch cords of FIGS. 1A-1B.
Figure 2B:
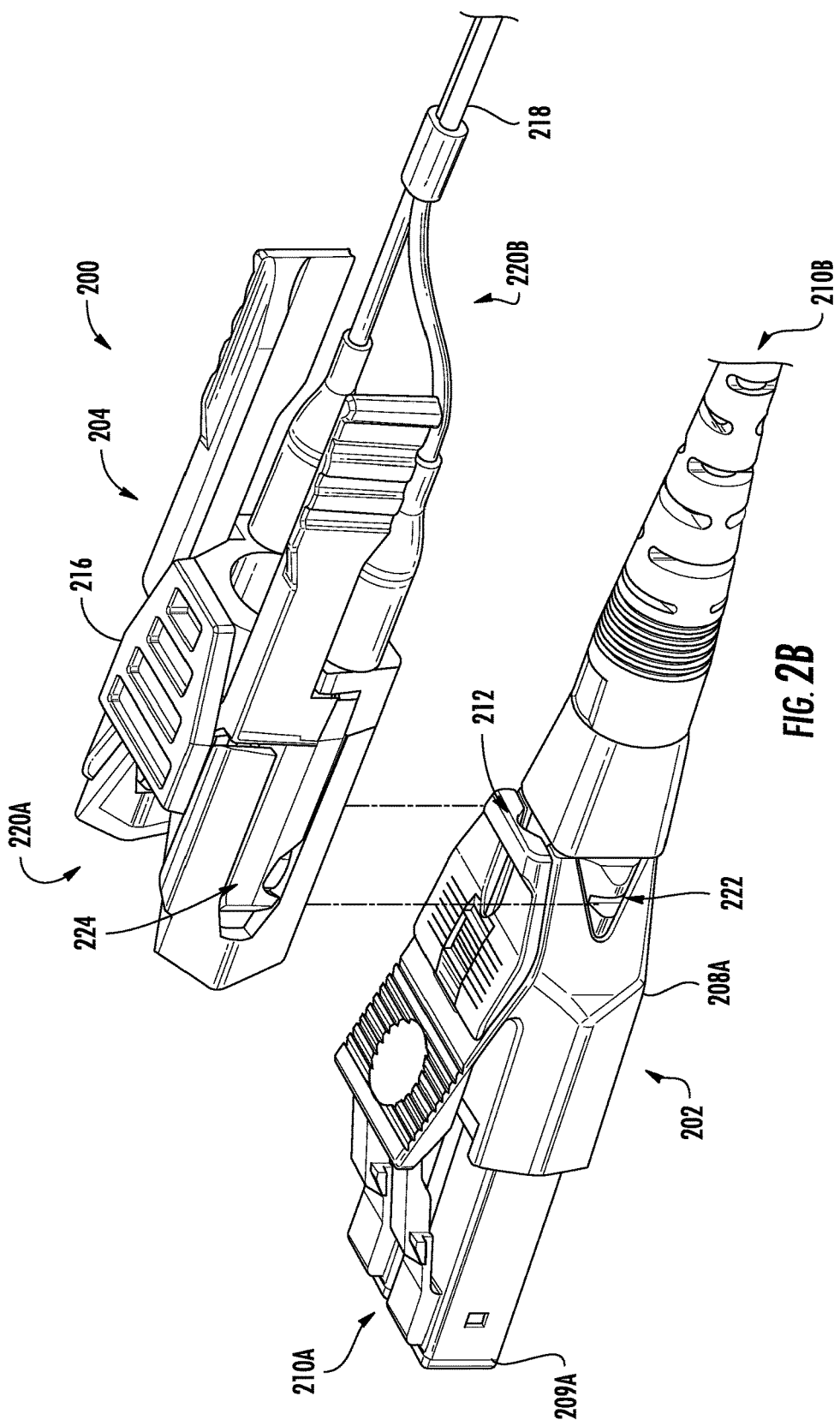
FIG. 2B is a perspective view of the cable tracing system of FIG. 2A illustrating a launch connector disengaged from a first fiber optic connector.
Figure 2C:
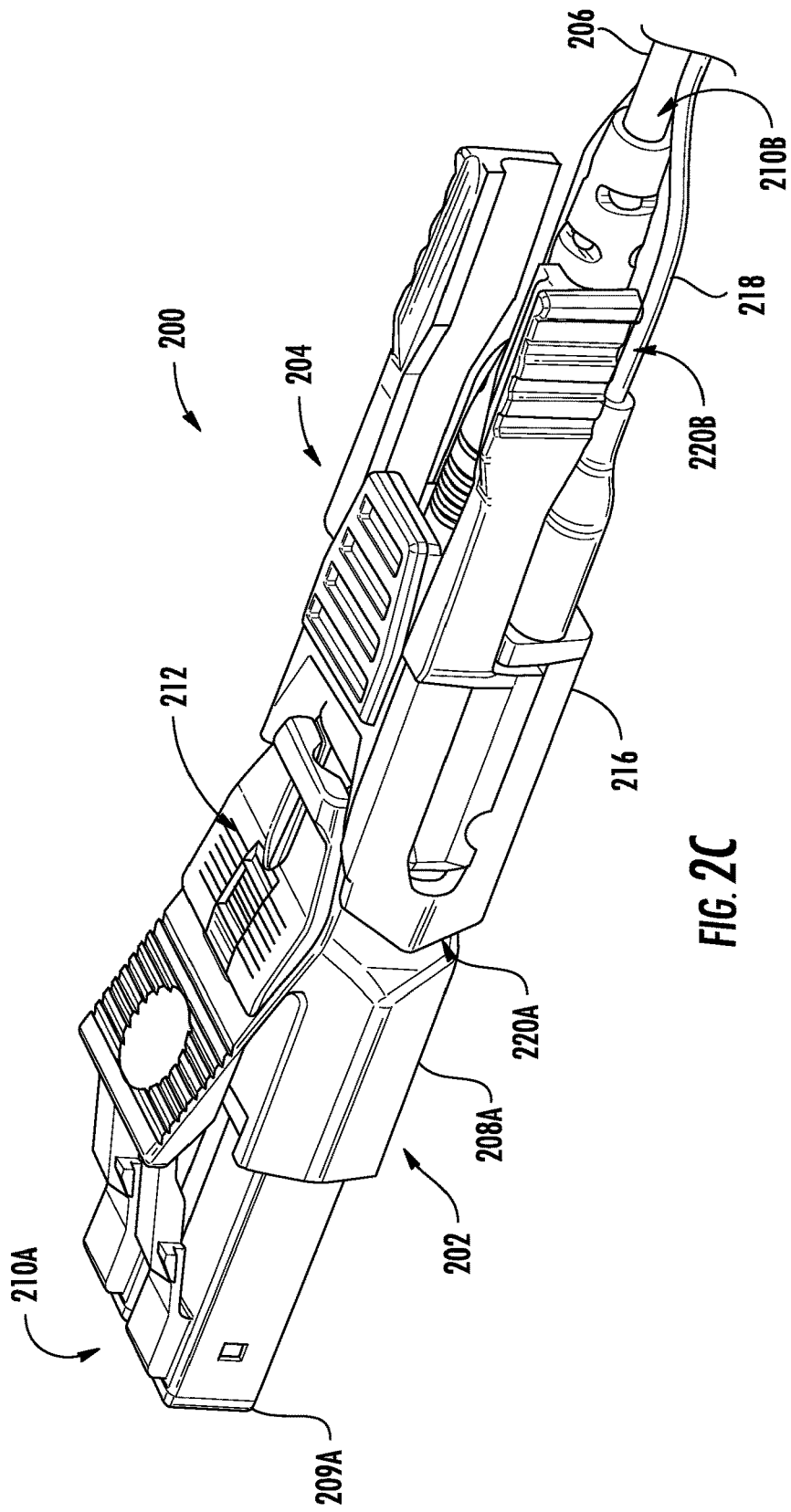
FIG. 2C is a perspective view of the cable tracing system of FIG. 2A illustrating a launch connector engaged with the first fiber optic connector.

FIGS. 2A-2C are views of an exemplary cable tracing system 200 that can be used to trace a fiber optic cable assembly 202. The cable tracing system 200 facilitates the easy tracing of ends of a traceable fiber optic cable (e.g., fiber optic cable 206) using fiber optic tracing signals. FIG. 2A is a perspective view of the exemplary cable tracing system 200, such as for use with the patch cords 100 of FIGS. 1A-1B. The cable tracing system 200 comprises a traceable fiber optic cable assembly 202 and a light launch device 204. As will be discussed by example in more detail below, the cable tracing system 200 allows a user to selectively attach the light launch device 204 to a part of the traceable fiber optic cable assembly 202 and use the light launch device 204 to inject one or more optical tracing signals (e.g., fiber optic tracing signal, a first optical tracing signal, second optical tracing signal, etc.) into the traceable fiber optic cable assembly 202. This allows the user to trace the location of part or all of the traceable fiber optic cable assembly 202 based on the propagation of the optical tracing signals into the traceable fiber optic cable assembly 202.

As discussed below in more detail, the traceable fiber optic cable assembly 202 and/or light launch device 204 includes one or more alignment features for quickly aligning optical fibers within the traceable fiber optic cable assembly 202 and the light launch device 204. Further, the traceable fiber optic cable assembly 202 comprises one or more illumination components (e.g., illumination structures) to efficiently and effectively translate and disperse light for easily locating one or more portions of the traceable fiber optic cable assembly 202. In this manner, the traceable fiber optic cable assembly 202 and light launch device 204 provide easy tracing of the traceable fiber optic cable assembly 202 using fiber optic tracing signals. Further, the light launch device 204 is easily attached to and removed from the traceable fiber optic cable assembly 202 with repeatable and reliable alignment of optical fibers (even when both ends of the traceable fiber optic cable assembly 202 are plugged in), and without the need for tools to interface the light launch device 204 with the fiber optic cable assembly 202. The cable tracing system 200 is configured to efficiently illuminate a portion of the traceable fiber optic cable assembly 202 for effective visibility for a user to quickly locate one or more portions of the traceable fiber optic cable assembly 202.

With reference to FIGS. 2A-2C, the traceable fiber optic cable assembly 202 comprises a fiber optic cable 206, a first fiber optic connector 208A (e.g., traceable fiber optic cable first connector, traceable fiber optic cable assembly first connector, etc.) at a first end of the fiber optic cable 206, and a second fiber optic connector 208B (e.g., traceable fiber optic cable second connector, traceable fiber optic cable assembly second connector, etc.) at a second end of the fiber optic cable 206. The first fiber optic connector 208A and the second fiber optic connector 208B are present on opposite ends (e.g., first end 209A, and second end 209B) of the fiber optic cable 206 to allow the traceable fiber optic cable assembly 202 to act as a patch cord between components of a network. In use, the fiber optic cable 206 may extend between two locations, such as two equipment racks in a data center, telecommunications room, or the like. Further, in some embodiments, the fiber optic cable 206 may have a length between about zero meters and about 30 meters, and in some embodiments, the fiber optic cable 206 may have a length between about 1 meter and about 5 meters. In other embodiments, the fiber optic cable 206 may have a length of more than 30 meters.

The first and second fiber optic connectors 208A, 208B are merely an example. Thus, although FIGS. 2A-2C (among other figures herein) illustrate the first and second fiber optic connectors 208A, 208B as an LC duplex connector, the features described below may be applicable to different connector configurations and different connector sub-assembly designs. This includes simplex configurations of LC connector sub-assemblies, and both simplex and duplex configurations of different (i.e., non-LC) connector sub-assembly designs.

The first fiber optic connector 208A and the second fiber optic connector 208B each comprise a distal end 210A and a proximal end 210B. More specifically, the proximal end 210B of the first fiber optic connector 208A and the second fiber optic connector 208B is towards a center of the fiber optic cable 206. In other words, the distance between the proximal ends 210B of the first and second fiber optic connectors 208A, 208B is less than the distance between the distal ends 210A of the first and second fiber optic connectors 208A, 208B.

Further, the first and second fiber optic connectors 208A, 208B each comprise an illumination component 212 (e.g., illumination component that may include one or more total internal reflection (TIR) structures, etc.). The illumination component 212 directs (e.g., propagates) the light emitted from the fiber so that the fiber optic connector 208A, 208B is easily visible to workers in a data center environment. For example, in some embodiments, the first illumination component 212 of the second fiber optic connector 208B illuminates after receiving a first fiber optic tracing signal from the first fiber optic connector 208A to communicate the location of the second fiber optic connector 208B, and/or the second illumination component 212 of the first fiber optic connector 208A illuminates after receiving a second fiber optic tracing signal from the second fiber optic connector 208B to communicate the location of the first fiber optic connector 208A. In particular, in some embodiments, the first and second fiber optic tracing signals are transmitted consecutively and/or not simultaneously (e.g., not concurrently). In this way, one or more tracing optical fibers within the fiber optic cable 206 provide for traceablility of the fiber optic cable 206 from one or both of the ends 209A, 209B of the fiber optic cable 206. As explained below, the cable tracing system 200 (e.g., traceable fiber optic cable assembly 202) provides the ability to trace a fiber optic cable 206 without disconnecting the fiber optic cable 206 from corresponding receptacles.

In one embodiment, the traceable fiber optic cable assembly 202 comprises an end point only (EPO) configuration. In an EPO configuration, a far end of the traceable fiber optic cable assembly 202 (e.g., second fiber optic connector 208B) illuminates (e.g., lights up) when a near end of the traceable fiber optic cable assembly 202 (e.g., a first fiber optic connector 208A) is activated (e.g., receives an optical tracing signal). However, in another embodiment, the traceable fiber optic cable assembly 202 comprises an along the length (ATL) configuration. In an ATL configuration, at least a portion of the fiber optic cable 206 is illuminated (in some embodiments, the first fiber optic connector 208A and/or the second fiber optic connector 208B may also be illuminated). The description below is with respect to an EPO configuration, however, the teachings are also applicable to an ATL configuration.

The light launch device 204 comprises a launch module 214, a launch connector 216, and a launch cable 218 therebetween. The launch module 214 generates the fiber optic tracing signal for direction through the traceable fiber optic cable assembly 202. The launch connector 216 is selectively attachable to and removable from the first fiber optic connector 208A and/or second fiber optic connector 208B. The launch cable 218 directs (e.g., propagates) the fiber optic tracing signal from the launch module 214 to the first fiber optic connector 208A or the second fiber optic connector 208B. In this way, one or more launch optical fibers within the launch cable 218 provide for injection of the fiber optic tracing signal into the fiber optic cable 206 for traceablility of the fiber optic cable 206 from one or both the ends 209A, 209B of the fiber optic cable 206. The launch connector 216 comprises a distal end 220A and a proximal end 220B.

FIG. 2B is a perspective view of the cable tracing system 200 of FIG. 2A illustrating the launch connector 216 of the light launch device 204 disengaged from the first fiber optic connector 208A in a disengaged position (e.g., disconnected position, detached position, etc.). FIG. 2C is a perspective view of the cable tracing system 200 of FIG. 2A illustrating the launch connector 216 of the light launch device 204 engaged with the first fiber optic connector 208A in an engaged position (e.g., connected position, attached position, etc.).

Referring specifically to FIG. 2B and as explained below in more detail, to facilitate the launching of an optical tracing signal into the fiber optic cable 206 (e.g., having one or more optical tracing fibers), in examples disclosed herein, the first and/or second fiber optic connectors 208A, 208B contain a registration feature 222 (e.g., first and second connector fiber guides) that is configured to interface with a removable launch connector 216 of the light launch device 204 when it is desired to launch an optical tracing signal from the light launch device 204 to the launch cable 218. In particular, the launch connector 216 is configured to engage to the first fiber optic connector 208A to direct the optical tracing signal emitted from the light launch device 204 through the launch connector 216 and to the fiber optic cable 206 at the first fiber optic connector 208A when tracing is desired. The launch connector 216 can be removed from the first fiber optic connector 208A after tracing is completed. More specifically, for example, an optical tracing fiber of the fiber optic cable 206 comprises a first end face (which may be polished) positioned within the registration feature 222 of the first fiber optic connector 208A and exposed to the environment. An optical launch fiber of the launch cable 218 comprises a first end face (which may be polished) positioned within a registration feature 224 (e.g., first and second launch fiber guides) of the launch connector 216. The registration feature 222 (e.g., v-groove, shape and configuration of surfaces of the registration feature 222) and registration feature 224 are configured to easily and effectively mechanically engage the first fiber optic connector 208A and align the first end face of the optical tracing fiber of the fiber optic cable 206 with the first end face of the optical launch fiber of the launch cable 218 to establish optical connection therebetween when the launch connector 216 is engaged to the first fiber optic connector 208A. In this way, the light launch device 204 transmits an optical tracing signal from the light launch device 204 into the first fiber optic connector 208A to illuminate the second fiber optic connector 208B to trace ends of the fiber optic cable assembly 202. In some embodiments, the registration feature 222 comprises cleaving access (e.g., a planar surface) to form a launch end for a launch fiber of the fiber optic cable 206 positioned in the registration feature 222, as will be described in more detail below.

A user operates the launch connector 216 to selectively engage (e.g., connect, attach, etc.) the launch connector 216 with the first fiber optic connector 208A (or the second fiber optic connector 208B). The launch connector 216 can be attached or removed even when the first fiber optic connector 208A and/or second fiber optic connector 208B is engaged with another fiber optic component (e.g., patch panel, first fiber optic component, second fiber optic component, etc.), or any other network component. For example, the launch connector 216 may vertically or axially (e.g., from a proximal end 210B of the first or second fiber optic connector 208A, 208B) engage the first or second fiber optic connector 208A, 208B.

The launch connector 216 and the first fiber optic connector 208A (or second fiber optic connector 208B) mechanically interact with one another to align their respective optical fibers (discussed in more detail below) to direct an optical tracing signal therebetween. In particular, once engaged, the user operates the light launch device 204 to inject an optical tracing signal into the first fiber optic connector 208A (or second fiber optic connector 208B) to illuminate the second fiber optic connector 208B (or first fiber optic connector 208A) through the fiber optic cable 206.

In this way, a user can quickly and easily locate the ends 209A, 209B of the traceable fiber optic cable assembly 202 (e.g., the first fiber optic connector 208A and the second fiber optic connector 208B), which streamlines and simplifies the process of tracing or otherwise identifying a fiber optic cable 206 in a congested environment. As a result, the technician can reliably identify the fiber optic cable 206 in question (which may be a telecommunication patch cord) from amongst many other cables (which may also be telecommunication patch cords). The cable tracing system 200 may also have the advantage of being an optically-activated cable tracing system using only passive tracing elements associated with the fiber optic cable 206 (although active tracing elements may still be provided in addition to the passive tracing elements, if desired).

Once completed, a user can then operate the launch connector 216 to selectively disengage the launch connector 216 from the first fiber optic connector 208A (or the second fiber optic connector 208B).

Figure 3A:
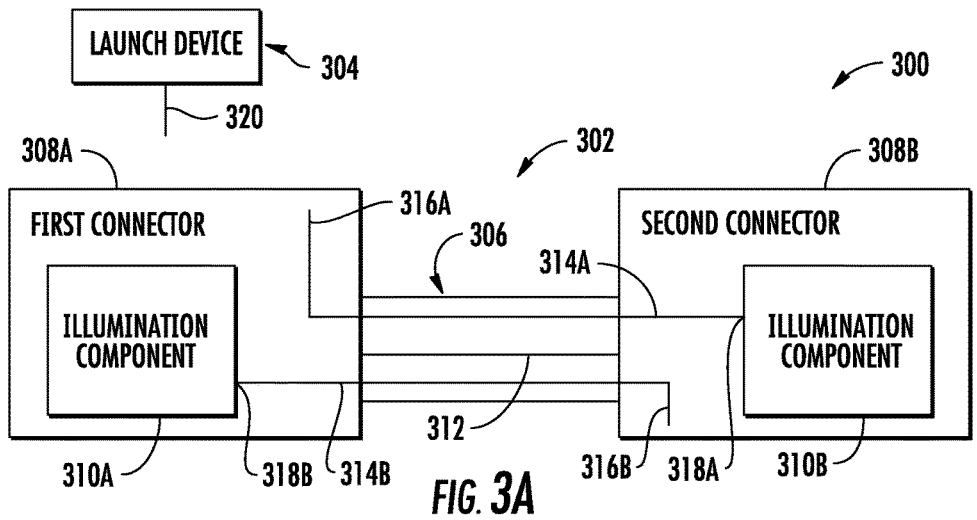
FIG. 3A is a schematic diagram of another embodiment of the exemplary cable tracing system in FIGS. 2A-2C.
Figure 3B:
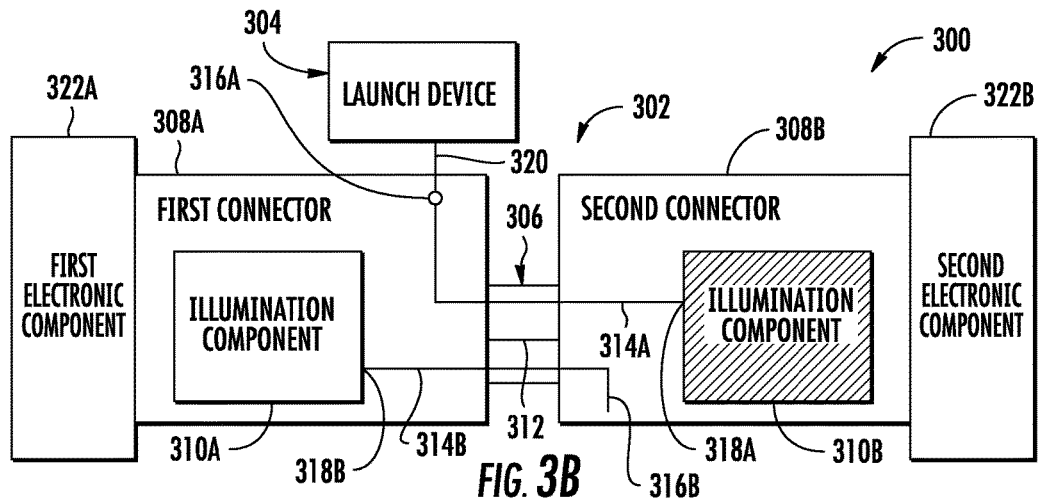
FIG. 3B is a schematic diagram illustrating the cable tracing system of FIG. 3A.
Figure 3C:
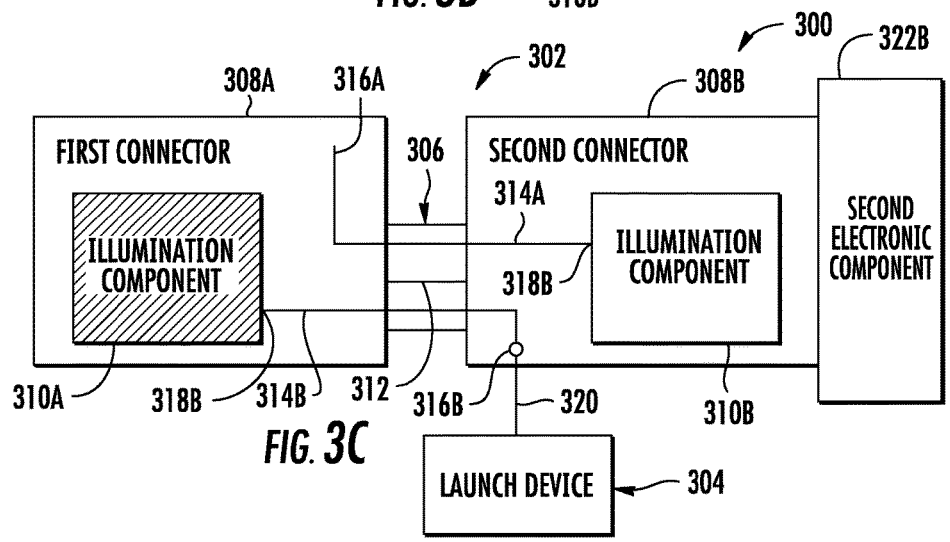
FIG. 3C is another schematic diagram illustrating the cable tracing system of FIG. 3A.

FIGS. 3A-3C are schematic diagrams of another embodiment of the exemplary cable tracing system in FIGS. 2A-2C providing a general overview of the cable tracing system 300 and how the cable tracing system 300 selectively sends signals to illuminate ends of a cable, thereby allowing a user to trace the ends of a cable. More specifically, FIG. 3A is a schematic diagram of another embodiment of an exemplary cable tracing system 300 of FIG. 2A. The cable tracing system 300 comprises a traceable cable assembly 302 and a light launch device 304 (as similarly described above with FIGS. 2A-2C). As shown, the traceable cable assembly 302 comprises a first connector 308A and a second connector 308B, and a fiber optic cable 306 therebetween. In some embodiments, the fiber optic cable 306 may be more appropriately referred to as a conduit, without having any data transmission elements. It should be noted that other environments could use this tracing concept like other fiber optic deployment applications, electrical interconnects, and potentially liquid or gas conduits, etc. For example, the fiber optic cable 306 may direct fluids such as air or liquid and may be appropriate for use in a medical setting such as IV lines or oxygen tubing.

Any suitable type of connector could be used with the cable tracing system 300. The first connector 308A and the second connector 308B may vary widely depending on the nature of the cable and the components being connected. The specific type of connectors should match the port configuration of the network component and will vary based upon the quantity and type of signals being directed by the cable. The first connector 308A includes a first illumination component 310A, and the second connector 308B includes a second illumination component 310B (as similarly described above with FIGS. 2A-2C and described in more detail below). The fiber optic cable 306 may have a different design or configuration depending on the types of connectors used.

The traceable cable assembly 302 further comprises a data transmission element 312 (e.g., optical data fiber), as well as a first tracing element 314A (e.g., first tracing optical fiber) and/or second tracing element 314B (e.g., second tracing optical fiber) extending between the first connector 308A and the second connector 308B. The data transmission element 312 extends between the first connector 308A and the second connector 308B to carry transmission of one or more data signals (e.g., optical data signals) therebetween. Generally, the data transmission element 312 is a structure capable of carrying a data signal from one end of the fiber optic cable 306 (or any other type of cable) to the other. The data transmission element 312 may be configured to direct an electrical signal, for example, using a copper wire or other electrically conductive material. Alternatively, or in addition, the data transmission element 312 may be configured to direct an optical signal by conducting electromagnetic waves such as ultraviolet, infrared, or visible light to carry data from one location to another. The data transmission element 312 could comprise one or more data transmission elements, which may be of the same type or different types as compared to one another.

The first tracing element 314A and the second tracing element 314B are used to allow for accurate identification of ends of the traceable cable assembly 302. In particular, the first tracing element 314A comprises a first launch end 316A and a first emission end 318A. The first launch end 316A is positioned within the first connector 308A and the first emission end 318A is positioned within or external to the second connector 308B and is in communication with the second illumination component 310B. The second tracing element 314B comprises a second launch end 316B positioned within the second connector 308B and a second emission end 318B positioned within or external to the first connector 308A and in communication with the first illumination component 310A. It is noted that although two tracing elements are shown, in certain embodiments, only one tracing element may be used. In some embodiments, the operator can visually identify the first tracing element 314A and/or the second tracing element 314B with or without special equipment, such as an IR camera. In some embodiments, discussed below, the first tracing element 314A and the second tracing element 314B are in the form of tracing optical fibers configured to direct and emit tracer light for visualization purposes.

As explained below, the light launch device 304 comprises a launch fiber 320 to insert a tracing signal into one or both of the first tracing fiber 314A and the second tracing fiber 314B. The first and second launch ends 316A, 316B may be flat cleaved, flat polished or otherwise prepared to efficiently receive the light from the light launch device 304 and may be positioned flush with the connector wall, slightly inside the first and second connectors 308A, 308B or slightly outside the first and second connectors 308A, 308B. Further, one or more illumination components are positioned at the tracing optical fiber emission ends 318A, 318B which provide optical directing and/or optical scattering features to illuminate the first and second connectors 308A, 308B to be easily found by operators.

FIG. 3B is an exemplary schematic diagram illustrating the cable tracing system 300 of FIG. 2A. As shown, the first connector 308A is mechanically engaged with and in communication with a first network component 322A, and the second connector 308B is mechanically engaged with and in communication with a second network component 322B. Additionally, the launch fiber 320 of the light launch device 304 is in communication with the first launch end 316A of the first tracing element 314A. The light launch device 304 emits an optical tracing signal (e.g., first optical tracing signal) through the first launch end 316A through the first tracing element 314A and exits through the first emission end 318A in the second illumination component 310B thereby illuminating the second illumination component 310B. In this way, a user can connect the light launch device 304 to the first connector 308A to locate the second connector 308B by illumination thereof.

FIG. 3C is another exemplary schematic diagram illustrating the cable tracing system 300 of FIG. 2A. Here, the first connector 308A is not mechanically engaged or in communication with a network component, but the second connector 308B is mechanically engaged and in communication with the second network component 322B. In this configuration, the launch fiber 320 of the light launch device 304 is in communication with the second launch end 316B of the second tracing element 314B. The light launch device 304 emits a second tracing signal through the second launch end 316B through the second tracing element 314B and exits through the second emission end 318B in the first illumination component 310A thereby illuminating the first illumination component 310A. In this way, a user can connect the light launch device 304 to the second connector 308B to locate the first connector 308A by illumination thereof, regardless of whether the first connector 308A and the second connector 308B are connected to a first network component 322A or a second network component 322B (e.g., when the second connector 308B is connected to a second network component 322B, and the first connector 308A is not connected to a first network component 322A).

Now that a general overview of the cable tracing system 300 has been provided, a more detailed discussion of the cable tracing system 200 (using optical tracing signals and/or optical data signals) will be discussed.

Figure 4:
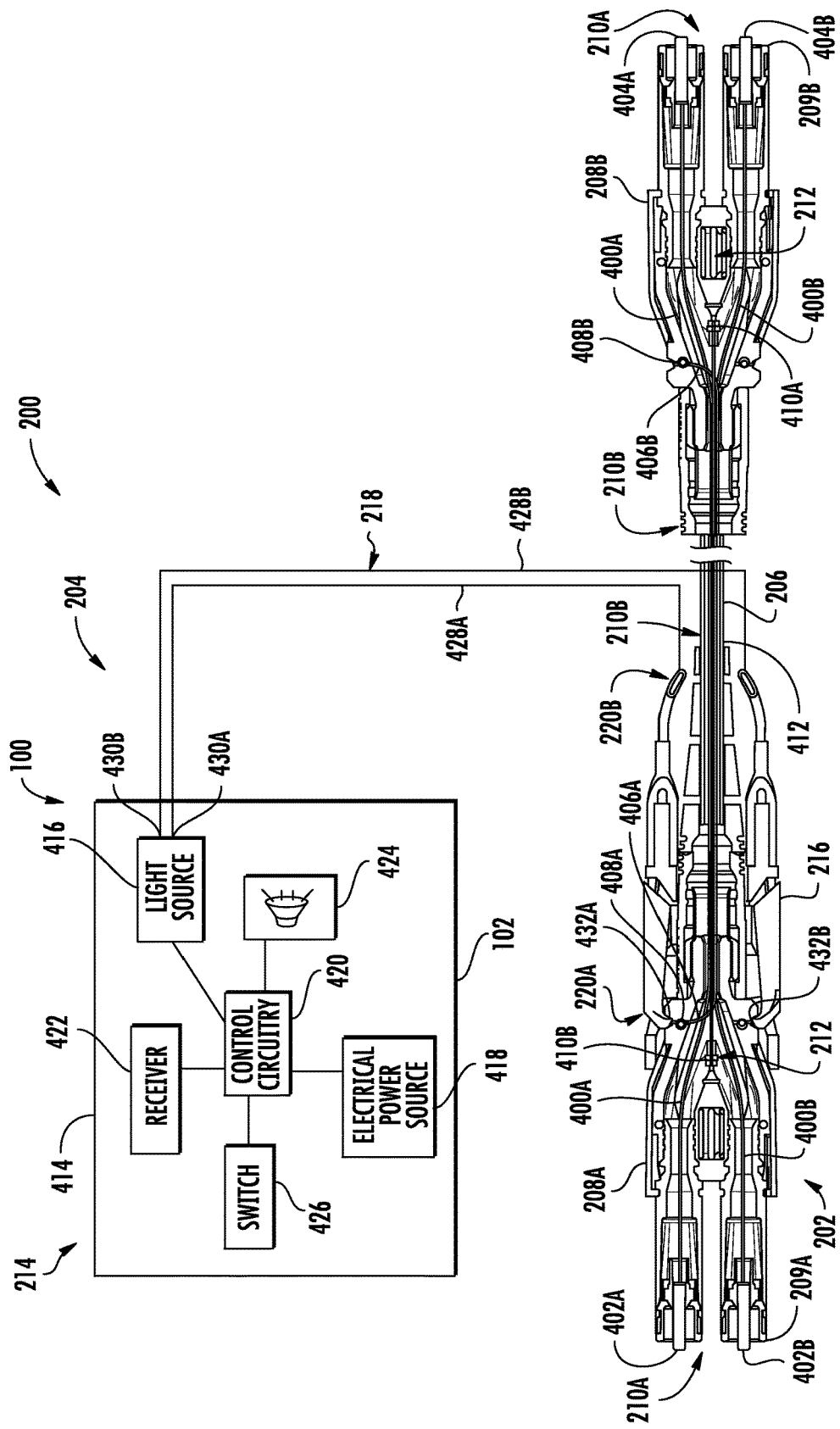
FIG. 4 is a more detailed schematic diagram of the cable tracing system of FIGS. 2A-2C.

To explain tracing of the fiber optic cable 206 and flow of the optical tracing signal, FIG. 4 is provided. FIG. 4 is a more detailed schematic diagram illustrating an exemplary embodiment of the cable tracing system 200 of FIGS. 2A-2C. As shown, the cable tracing system 200 comprises the traceable fiber optic cable assembly 202 and the light launch device 204. The traceable fiber optic cable assembly 202 comprises the fiber optic cable 206, the first fiber optic connector 208A, and the second fiber optic connector 208B. The fiber optic cable 206 comprises a first data transmission fiber 400A (e.g., first data optical fiber, first data transmission element) and a second data transmission fiber 400B (e.g., second data optical fiber, first data transmission element). The first data transmission fiber 400A comprises a first end 402A and a second end 404A, and the second data transmission fiber 400B comprises a first end 402B and a second end 404B. The first data transmission fiber 400A and the second data transmission fiber 400B carry optical data signals from the first fiber optic connector 208A to (and through) the second fiber optic connector 208B, and/or vice versa. Any number of data transmission fibers could be used, such as depending on networking requirements, data transmission requirements, etc.

Further, the fiber optic cable 206 comprises a first tracing optical fiber 406A and a second tracing optical fiber 406B for direction of a fiber optic tracing signal therethrough, thereby facilitating a user in tracing the ends of the fiber optic cable 206. As noted above, one example of tracing elements is tracing optical fibers 406A, 406B. In particular, the first tracing optical fiber 406A extends along the length of the fiber optic cable 206, and the second tracing optical fiber 406B extends along the length of the fiber optic cable 206 in the opposite direction. The first tracing optical fiber 406A comprises a first launch end 408A and a first emission end 410A, and the second tracing optical fiber 406B comprises a second launch end 408B and a second emission end 410B. The first launch end 408A of the first tracing optical fiber 406A and the second emission end 410B of the second tracing optical fiber 406B are positioned within the first fiber optic connector 208A, and the first emission end 410A of the first tracing optical fiber 406A and the second launch end 408B of the second tracing optical fiber 406B are positioned within the second fiber optic connector 208B.

Each of the first and second launch ends 408A, 408B comprise a bend (at or proximate thereto), and each of the first and second emission ends 410A, 410B are generally straight (at or proximate thereto). The bend of the first and second launch ends 408A, 408B allow injection of an optical tracing signal into one or more sides of the first and/or second fiber optic connectors 208A, 208B. The straight first and second emission ends 410A, 410B allow emission of an optical tracing signal into a center of the first and/or second fiber optic connectors 208A, 208B, and in particular, into an internal illumination structure at a center of the first and/or second fiber optic connectors 208A, 208B (described in more detail below). In some embodiments, the emission ends of the tracing optical fibers may also be bent. For example, in some embodiments, the emission ends include a bend of between 0 and 90 degrees. The first and second launch ends 408A, 408B are configured to receive light from the light launch device 204 while the emission ends 410A, 410B are configured to emit light. The bends at or near the first and second launch ends 408A, 408B may be about 90 degrees (or any other angle) to allow for convenient injection of light into the first and second tracing optical fibers 406A, 406B.

Note that in certain embodiments the fiber optic cable 206 only uses one of the first tracing optical fiber 406A and the second tracing optical fiber 406B. As discussed above, the first tracing optical fiber 406A and the second tracing optical fiber 406B enable an operator to identify the fiber optic cable 206 (e.g., ends thereof) by injecting light into ends of the fiber optic cable 206 using a light launch device 204.

The fiber optic cable 206 further comprises a jacket 412 (e.g., hollow tube forming a conduit) substantially surrounding at least a portion of the first data transmission fiber 400A, the second data transmission fiber 400B, the first tracing optical fiber 406A, and the second tracing optical fiber 406B for protection thereof. Alternatively, the first and second data transmission fibers 400A, 400B and/or the first and second tracing optical fibers 406A, 406B may be only partially embedded within the jacket 412 and/or mounted to an outer surface of the jacket 412, or otherwise attached to the jacket 412. The first data transmission fiber 400A and/or the second data transmission fiber 400B may have a core and/or cladding. Further, there may be strength members (e.g., aramid yarns) or other elements located within the fiber optic cable 206 between the first and second data transmission fibers 400A, 400B and the jacket 412.

With continuing reference to FIG. 4, the light launch device 204 is used to inject an optical tracing signal into one of the first or second fiber optic connectors 208A, 208B for transmission of the optical tracing signal to emit from an opposite end of the fiber optic cable 206 for a user to quickly and easily trace the ends 209A, 209B of the fiber optic cable 206. The light launch device 204 comprises the launch module 214, the launch connector 216, and the launch cable 218 therebetween. As shown, the launch connector 216 is attached to the first fiber optic connector 208A. The launch module 214 comprises a housing 414, and may have a number of elements stored in the housing 414. The launch module 214 further comprises a light source 416 (e.g., laser source), an electrical power source 418 (e.g., batteries), control circuitry 420 respectively connected to other components of the light launch device 204 (e.g., to control the light source 416 and power usage), a receiver 422 or other wireless communication components (e.g., to receive commands from an external controller), a speaker 424 (to allow for the generation of audible signals), a switch 426 (e.g., an on-off switch), and/or one or more user interface features. One or more of these could be included in (e.g., inside), on, and/or outside the housing 414 of the light launch device 204. For example, in some embodiments the light source 416 (e.g., a red or green laser) is located at the launch connector 216 rather than in the housing 414. In certain embodiments, the housing 414 may be approximately the size of a standard flashlight or much smaller or larger depending on the application. The housing 414 should be sufficiently durable to protect the components contained within the housing 414 (e.g., in the event of a drop onto a hard surface).

In one embodiment, the light source 416 may emit a wavelength that is chosen to enhance visibility, such as a wavelength as near to 555 nm as possible. In some embodiments, the light source 416 is a 520-540 nm green laser diode, LED (light emitting diode) or super-luminescent diode (SLD). Alternatively, other colors/wavelengths may be emitted, such as red light from approximately 620-650 nm. In other embodiments, non-laser light sources may be used, such as LEDs. Several factors may be considered when selecting an appropriate light source 416, and the factors may include, but are not limited to, visibility, cost, eye safety, peak power, power consumption, size, and commercial availability. While the light source 416 is shown as part of the housing 414, in other embodiments the light source 416 may be part of the launch connector 216 or may be located elsewhere on the light launch device 204, such as on the launch cable 218. In some embodiments, the power of the light source 416 is as high as can be used safely according to industry safety standards, such as a green laser up to 40 mW coupled to a multimode delivery waveguide fiber with core diameter of about 50 microns or more and a numerical aperture about 0.2 or more.

The launch cable 218 (e.g., delivery waveguide, umbilical, etc.) may comprise a first launch fiber 428A (e.g., first launch optical fiber) and a second launch fiber 428B (e.g., second launch optical fiber). In one embodiment, each first and second launch fiber 428A, 428B direct green, 520 nm semiconductor lasers and are a high numerical aperture, wide mode field, multimode fiber. The fibers could be 0.5 NA, 125 micron core delivery fibers that have a low index of refraction polymer cladding layer directly outside of the core glass.

The first launch fiber 428A comprises a first launch end 430A and a second emission end 432A, and the second launch fiber 428B comprises a second launch end 430B and a second emission end 432B. The first and second launch ends 430A, 430B are optically connected with the light source 416. In this way, the launch cable 218 provides a path for directing light and/or electrical power to one or more of the first and second emission ends 432A, 432B. The launch cable 218 may be several meters in length, for example, so that the housing 414 of the light launch device 204 can be placed on the ground while the launch connector 216 is at least indirectly coupled with the traceable fiber optic cable assembly 202 several meters away. The launch connector 216 may be mounted to, or otherwise provided at or near the first launch end 408A of the first tracing optical fiber 406A or the second launch end 408B of the second tracing optical fiber 406B. The launch connector 216 may help provide a high efficiency launch of light into the first tracing optical fiber 406A and/or the second tracing optical fiber 406B.

In particular, as shown, the launch connector 216 is attached to the first fiber optic connector 208A, and the first emission end 432A of the first launch fiber 428A of the launch cable 218 is aligned with the first launch end 408A of the first tracing optical fiber 406A. In this way, a first optical tracing signal is generated by the light source 416, and directed through the first and second launch fibers 428A, 428B. The first optical tracing signal then exits the first emission end 432A of the first launch fiber 428A and enters the first launch end 408A of the first tracing optical fiber 406A positioned in the first fiber optic connector 208A. The first optical tracing signal then travels through the first tracing optical fiber 406A until it exits the first emission end 410A of the first tracing optical fiber 406A positioned in the second fiber optic connector 208B. Accordingly, a user can use the light launch device 204 to locate a second end 209B of the fiber optic cable 206 after attaching the light launch device 204 to a first end 209A of the fiber optic cable 206.

The allowed mechanical tolerances for the first and second launch fibers 428A, 428B to the first and second tracing optical fibers 406A, 406B (e.g., tracing fiber) may be less than about +/−100 microns, and preferably less than about +/−50 microns, although broader tolerances are also useable in some embodiments. For example, the first and second launch fibers 428A, 428B and first and second the tracing optical fibers 406A, 406B could be selected to enable a larger tolerance. In some embodiments, the first and second launch fibers 428A, 428B have a significantly narrower core diameter and mode field diameter (MFD) than the first and second tracing optical fibers 406A, 406B. In some embodiments, the first and second tracing optical fibers 406A, 406B will be a 240 micron diameter core 0.5 numerical aperture (NA) plastic optical fiber (POF). In such embodiments, there is 100% spatial overlap of the first and second launch fibers 428A, 428B to the first and second tracing optical fibers 406A, 406B for any lateral offset below 57.5 microns. The NA of the two fibers are the same so very little light will be lost from typical angular misalignments of a few degrees. In some embodiments, launch fibers 428A, 428B are used with smaller MFDs than 125 microns and lower NAs if the tolerance stack up requires it (e.g., Corning VSDN fiber with an 80 micron MFD and a 0.29 NA).

Figure 5A:
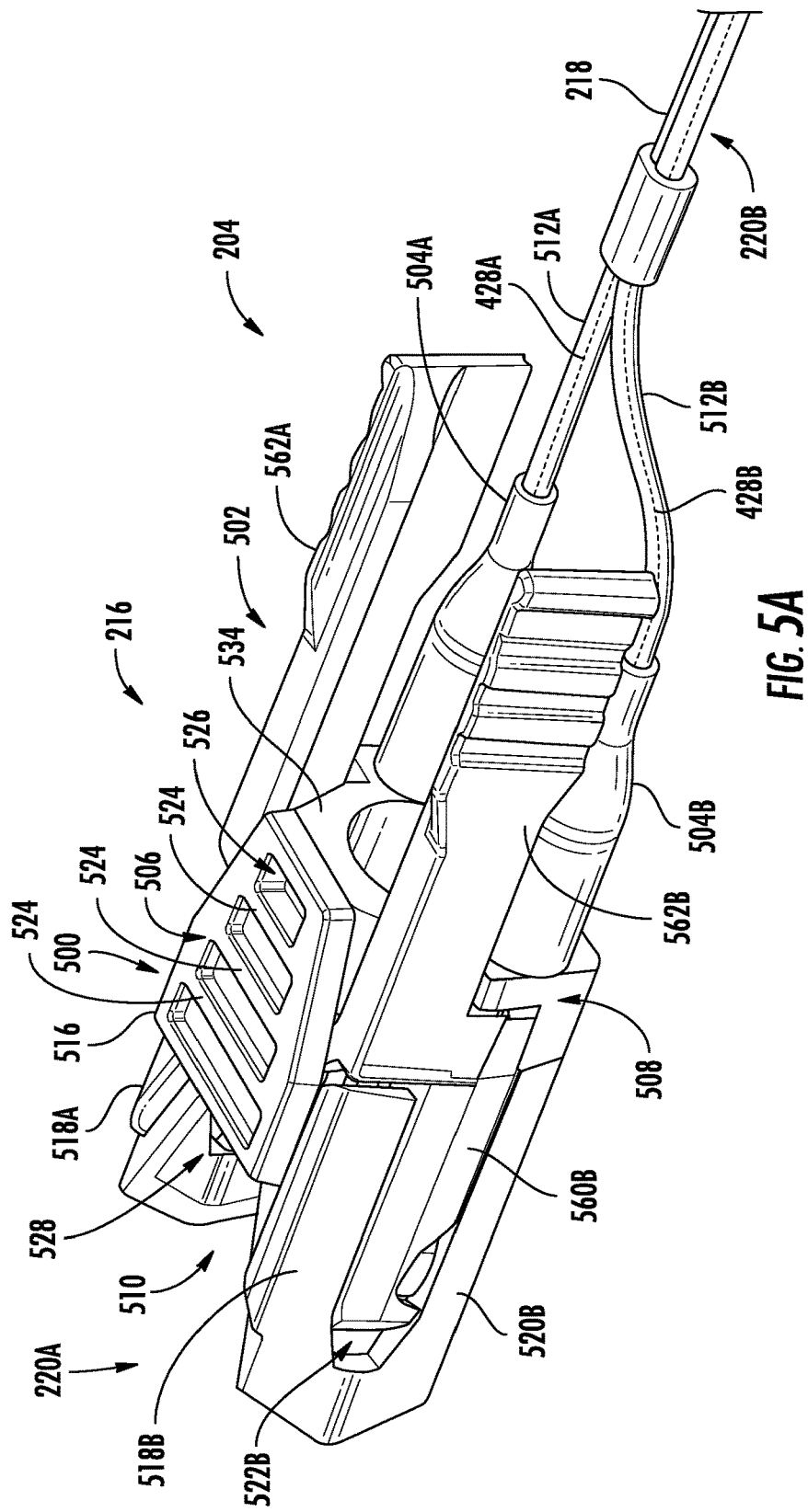
FIG. 5A is a rear top perspective view of the launch connector of FIGS. 2A-2C and 4.
Figure 5B:
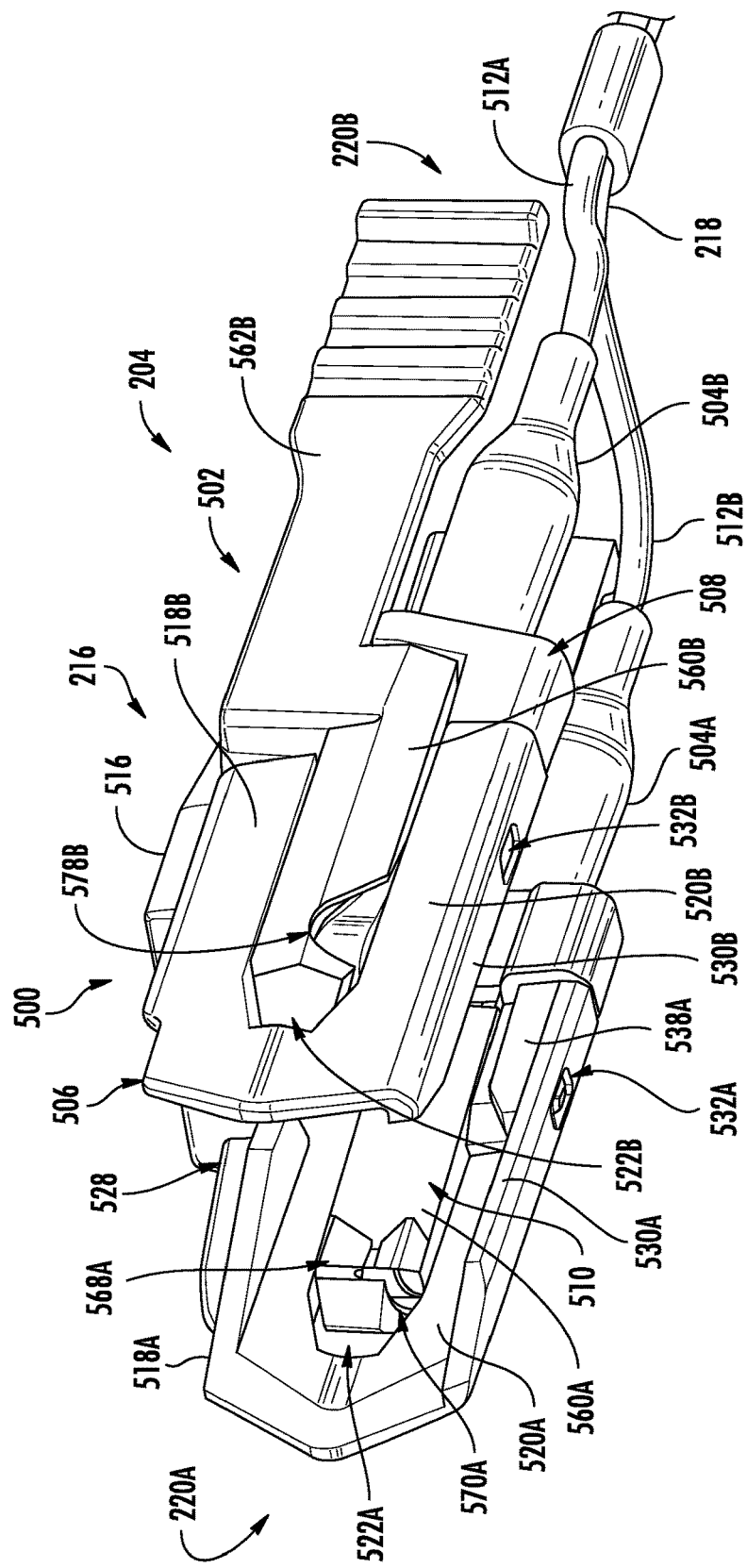
FIG. 5B is a front bottom perspective view of the launch connector of FIG. 5A.
Figure 5C:
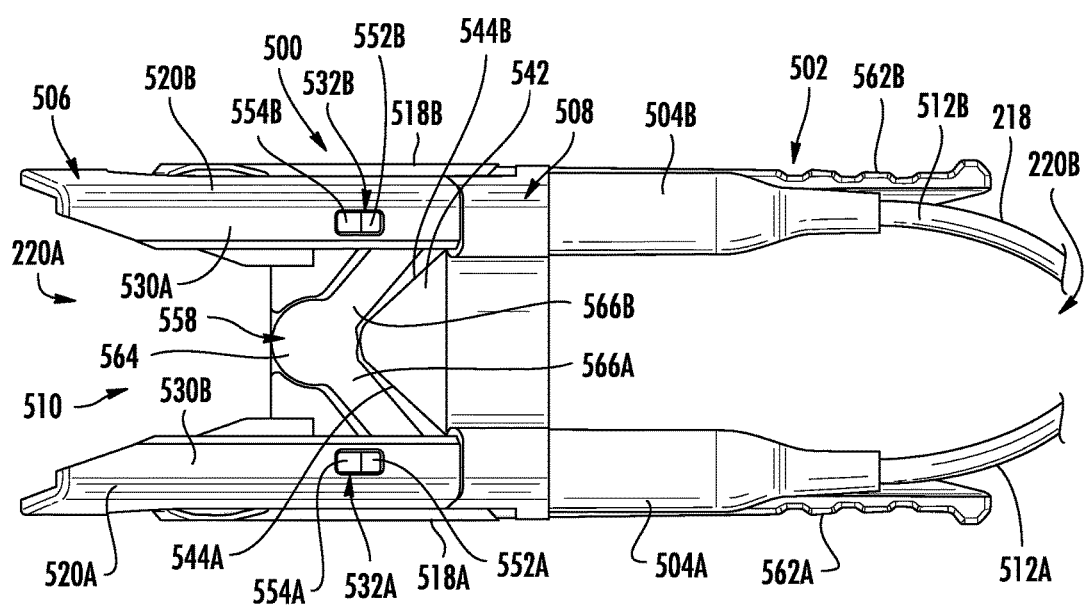
FIG. 5C is a bottom view of the launch connector of FIG. 5A.
Figure 5D:
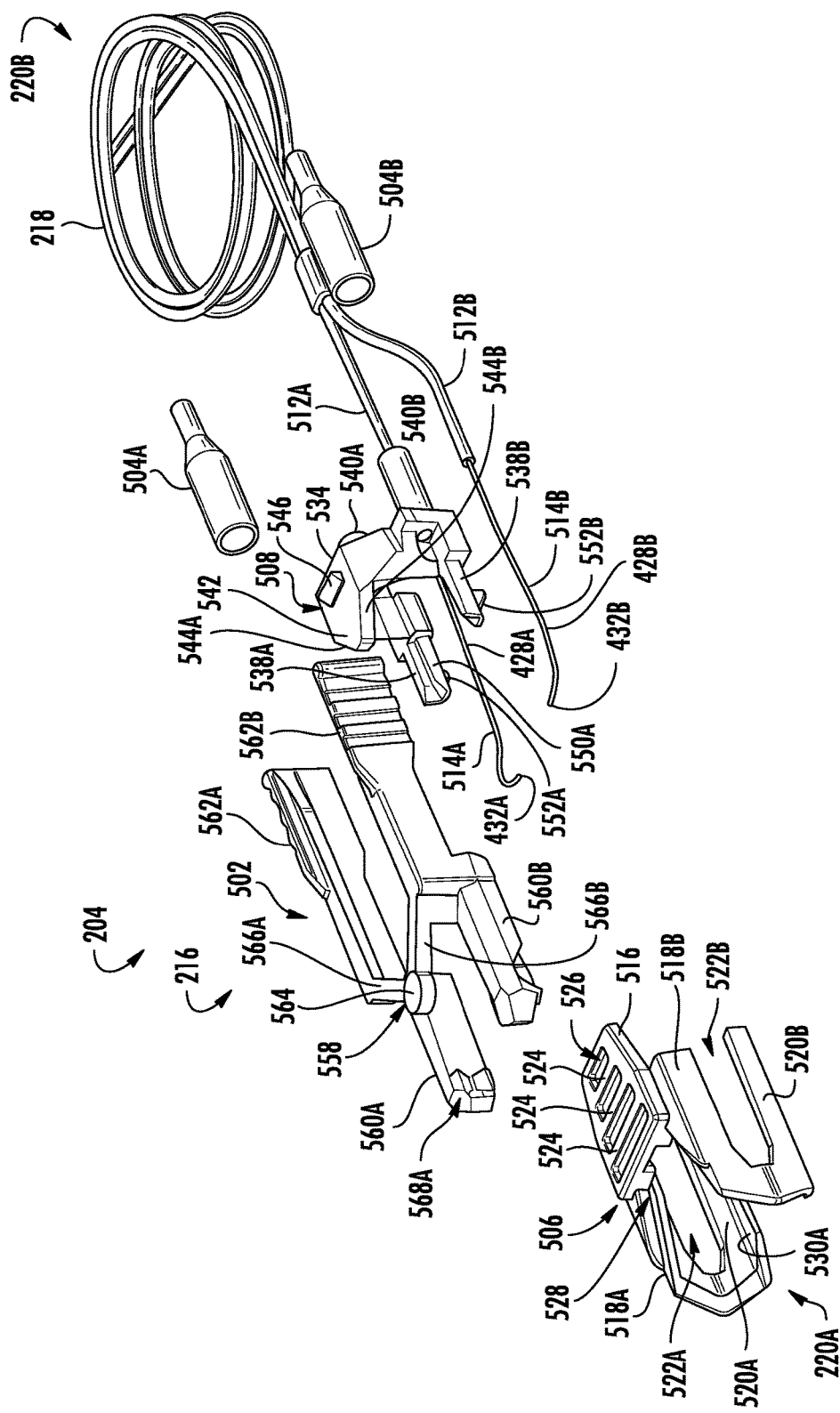
FIG. 5D is an exploded perspective view of the launch connector of FIG. 5A.

FIGS. 5A-5K are views of the launch connector 216 of the light launch device 204 of FIGS. 2A-2C. The launch connector 216 engages one of the first or second fiber optic connectors 208A, 208B (without any need for removal of the first or second fiber optic connectors 208A, 208B from a network component) to facilitate alignment and injection of an optical tracing signal into (e.g., optical communication between, optical connection between) the first or second launch ends 430A, 430B of first or second launch fibers 428A, 428B of the fiber optic cable 206 to trace the ends 209A, 209B of the fiber optic cable 206. In particular, FIGS. 5A-5D provide an overview of the launch connector 216 where FIG. 5A is a rear top perspective view, FIG. 5B is a front bottom perspective view, FIG. 5C is a bottom view, and FIG. 5D is an exploded perspective view. The launch connector 216 comprises a housing 500, a clip 502 secured to the housing 500 and pivotable therein to engage one of the first and second fiber optic connectors 208A, 208B. The launch connector 216 also includes a first tension relief member 504A and a second tension relief member 504B at a proximal end 220B of the housing 500 to relieve strain on the first and second launch fibers 428A, 428B entering the housing 500. In particular, the housing 500 comprises a front body 506 and a rear body 508 with the clip 502 positioned and secured therebetween. The housing 500 (e.g., front body 506 and rear body 508) defines a central channel 510 (with an open bottom) to receive at least a portion of the first fiber optic connector 208A or the second fiber optic connector 208B therein. Parts of the clip 502 pivot to secure (e.g., engage, attach, etc.) the launch connector 216 to the first fiber optic connector 208A or the second fiber optic connector 208B.

Also as shown, the launch cable 218 comprises the first and second launch fibers 428A, 428B, with a first jacket 512A surrounding the first launch fiber 428A, and the second jacket 512B surrounding the second launch fiber 428B to protect the first and second launch fibers 428A, 428B. Referring specifically to FIG. 5D the first launch fiber 428A comprises an extended portion 514A that extends past an end of the first jacket 512A, and the second launch fiber 428B comprises an extended portion 514B that extends past an end of the second jacket 512B. These extended portions 514A, 514B are retained within the housing 500 and include the first and second emission ends 432A, 432B for directing optical tracing signals to the first fiber optic connector 208A or second fiber optic connector 208B (explained below in more detail).

Figure 5E:
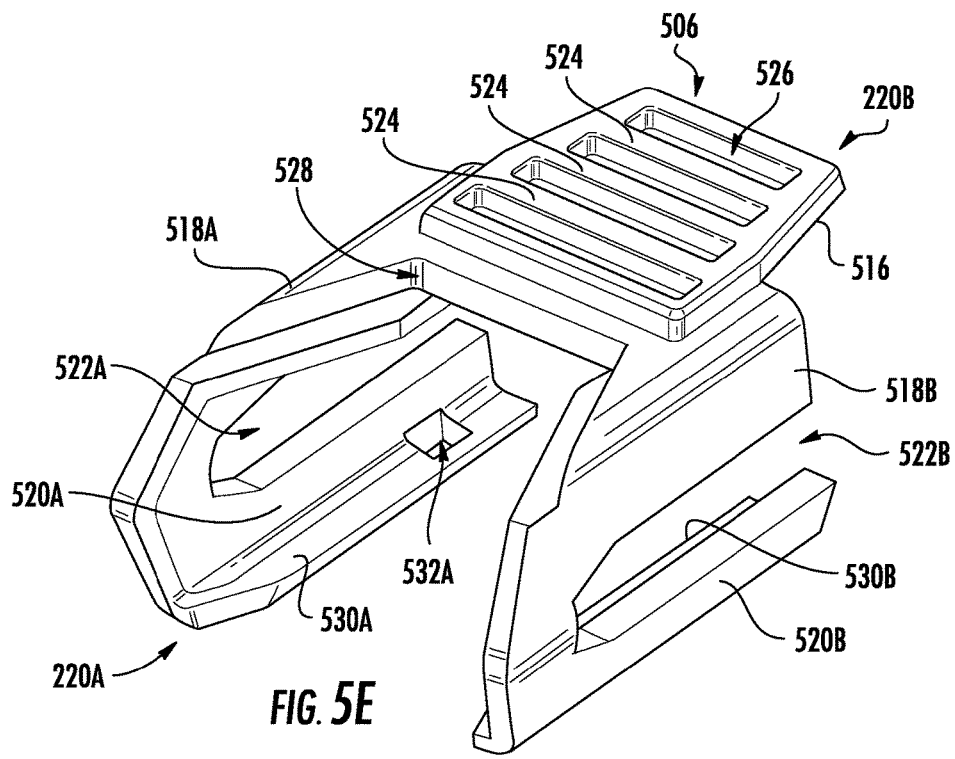
FIG. 5E is a top front perspective view of the front body of the launch connector of FIG. 5A.
Figure 5F:
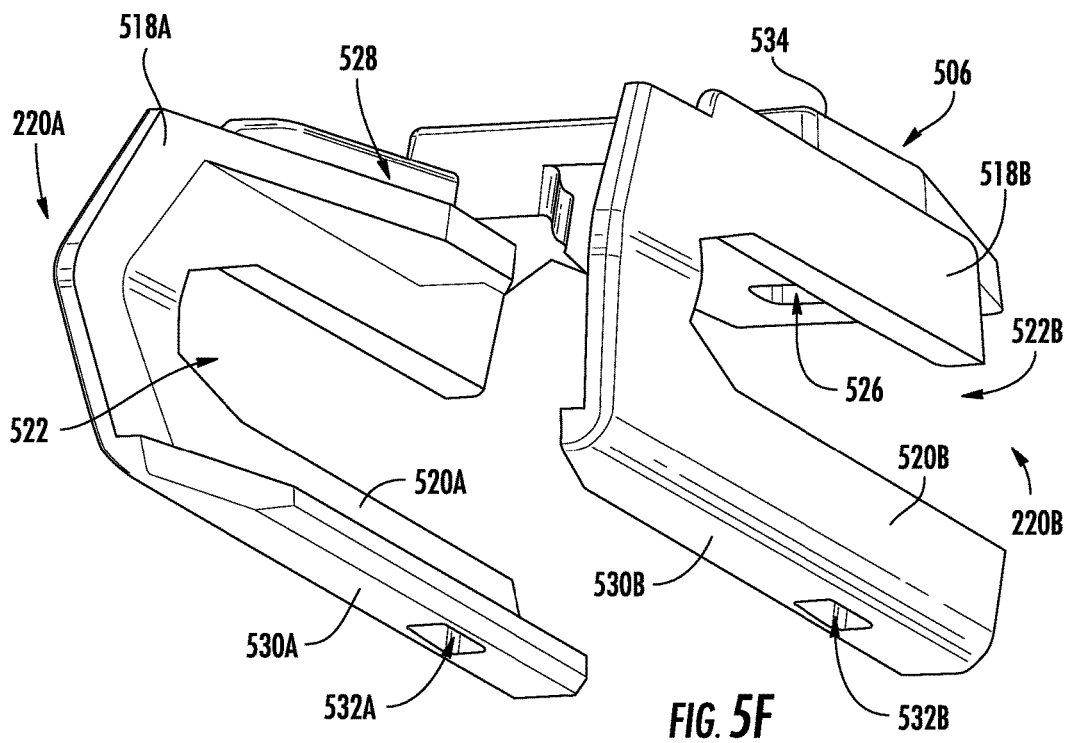
FIG. 5F is a bottom front perspective view of the front body of the launch connector of FIG. 5A.

FIGS. 5E-5F are views of the front body 506. In some embodiments, the front body 506 provides for gross alignment (e.g., rough alignment, approximate alignment, etc.) of the first or second emission ends 432A, 432B of the first or second launch fibers 428A, 428B with the first or second launch ends 408A, 408B of the first or second tracing optical fiber 406A, 406B. The front body 506 comprise a top panel 516, a left sidewall 518A extending from a left side of the top panel 516, a right sidewall 518B extending from a right side of the top panel 516, a left rail 520A (attached to a bottom of the left sidewall 518A and at a left side of the top panel 516), and a right rail 520B (attached to a bottom of the right sidewall 518B and at a right side of the top panel 516). A proximal end 220B of the top panel 516 extends past the left and right sidewalls 518A, 518B. In particular, a distal end 220A of the left rail 520A is attached to and extends downwardly from a distal end 220A of the left sidewall 518A, and a distal end 220A of the right rail 520B is attached to and extends downwardly from a distal end 220A of the right sidewall 518B. Accordingly, a left groove 522A is defined between a bottom of the left sidewall 518A and a top of the left rail 520A, and a right groove 522B is defined between a bottom of the right sidewall 518B and a top of the right rail 520B. The left groove 522A and right groove 522B configured to receive portions of the clip 502 therein (explained in more detail below). Thus the left and right grooves 522A, 522B extend from a proximal end 220B of the front body 506 to a distal end of the front body 506. As shown, the top panel 516, left and right sidewalls 518A, 518B, and/or left and right rails 520A, 520B at least partly define the central channel 510.

The top panel 516 comprises horizontal ribs 524 in a top surface thereof at a proximal end 220B thereof. The horizontal ribs 524 or grooves (e.g., extending from the left side to the right side) allow a user better gripping access to the top of the launch connector 216 (e.g., to slidably engage the launch connector 216 with the first fiber optic connector 208A or the second fiber optic connector 208B). The top panel 516 further comprises an aperture 526 (e.g., between two of the horizontal ribs 524) at a proximal end 220B of the front body 506 to receive a portion of the rear body 508 to secure the rear body 508 to the front body 506. Further, the distal end of the top panel 516 defines a recess 528 to provide clearance for a locking member of the first fiber optic connector 208A or second fiber optic connector 208B.

The left rail 520A comprises a left flange 530A extending inwardly from a bottom of the left rail 520A with a left opening 532A at a proximal end 220B of the left rail 520A. The right rail 520B comprises a right flange 530B extending inwardly from a bottom of the right rail 520B with a right opening 532B at a proximal end 220B of the right rail 520B. In this way, the left and right rails 520A, 520B (and the left and right openings 532A, 532B) are configured to receive a portion of the rear body 508 to secure the rear body 508 to the front body 506. Additionally, or alternatively, the left and right rails 520A, 520B (e.g., left and right flanges 530A, 530B) may also be configured to slidably engage a portion of the first or second fiber optic connectors 208A, 208B (e.g., to allow axial engagement and prevent vertical engagement or disengagement with the first or second fiber optic connector 208A, 208B).

Figure 5G:
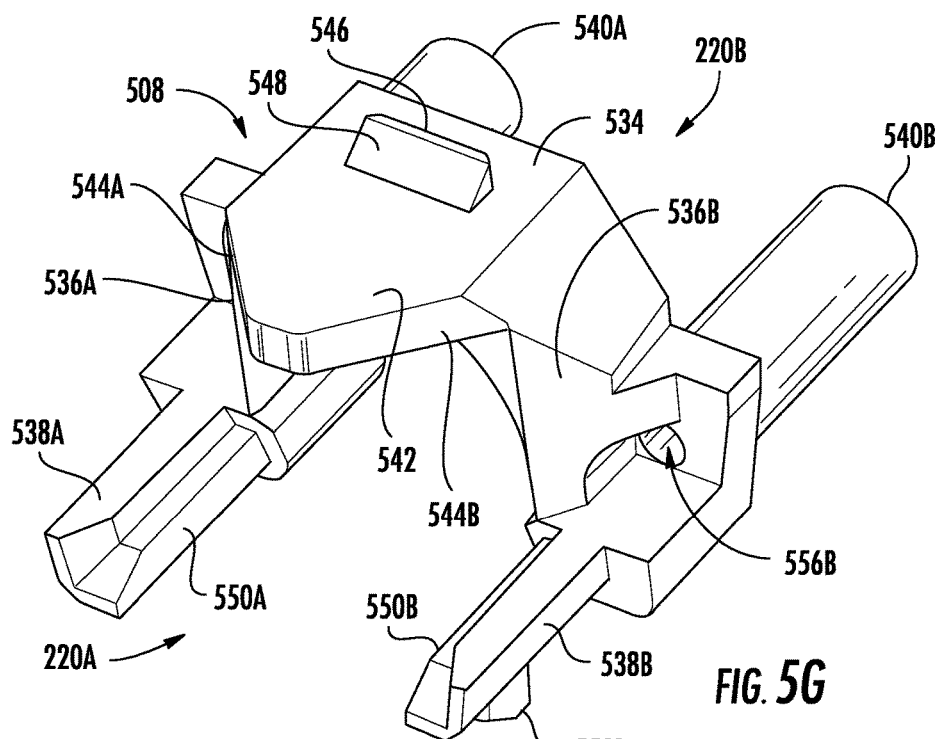
FIG. 5G is a top front perspective view of the rear body of the launch connector of FIG. 5A.
Figure 5H:
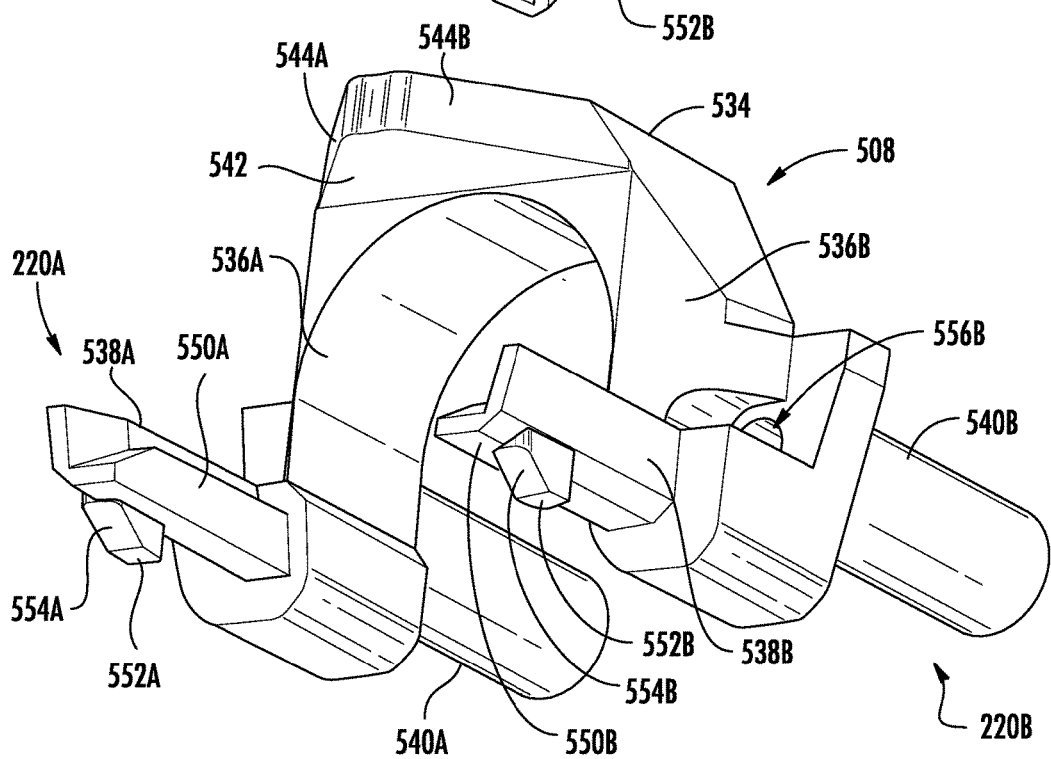
FIG. 5H is a bottom front perspective view of the rear body of the launch connector of FIG. 5A.
Figure 51:
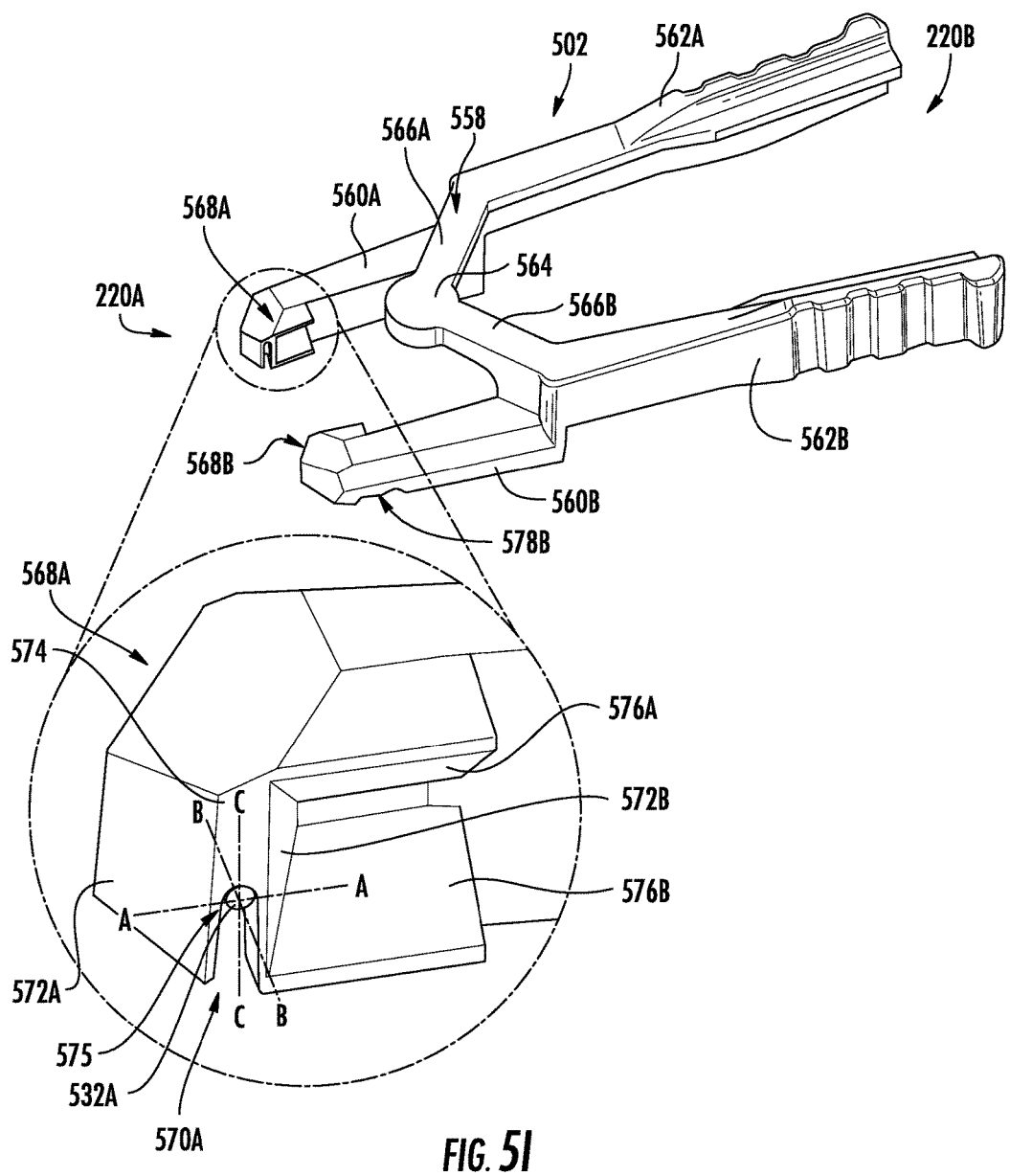

FIGS. 5G-5H are views of the rear body 508. The rear body 508 comprises a top panel 534, a left sidewall 536A extending from a left side of the top panel 534, a right sidewall 536B extending from a right side of the top panel 534, a forwardly extending left rail 538A (attached to the left sidewall 536A at a bottom thereof and at a left side of the top panel 534), a forwardly extending right rail 538B (attached to the right sidewall 536B at a bottom thereof and at a right side of the top panel 534), a rearwardly extending left strain relief cylinder 540A (attached to the left sidewall 536A at a bottom thereof and at a left side of the top panel 534), and a rearwardly extending right strain relief cylinder 540B (attached to the right sidewall 536B at a bottom thereof and at a right side of the top panel 534). An underside of the top panel 534, and left and right sidewalls 536A, 536B form a general archway, which define the central channel 510 and are configured to receive at least a portion of the first or second fiber optic connector 208A, 208B.

The top panel 534 assembles the front body 506 to the rear body 508, retains the clip 502 within the housing 500, and/or limits the motion of the clip 502. The top panel 534 comprises a forwardly extending overhang 542 with a left tapered sidewall 544A and a right tapered sidewall 544B (e.g., the left and right tapered sidewalls 544A, 544B form an angle to one another). In other words, the overhang 542 extends past a distal end 220A of the left and right sidewalls 536A, 536B. The left and right tapered sidewalls 544A, 544B are angled to provide clearance for and/or a limit to the pivoting (e.g., bending) of the clip 502. The top panel 534 further comprises a horizontally extending engagement nub 546 with a front tapered surface 548. The engagement nub 546 is configured to be inserted into the front body top panel aperture 526 to attach the rear body 508 to the front body 506. The tapered surface 548 facilitates assembly of the rear body 508 to the front body 506 as the engagement nub 546 is inserted into and engages the front body top panel aperture 526.

The left and right rails 538A, 538B are used to assemble the front body 506 to the rear body 508 and to retain the launch connector 216 to the first or second fiber optic connectors 208A, 208B. The left rail 538A comprises an inwardly extending left flange 550A, a downwardly extending engagement nub 552A (extending from a bottom of the left rail 538A and/or left flange 550A) with a front taper 554A. The right rail 538B comprises an inwardly extending right flange 550B, a downwardly extending engagement nub 552B (extending from a bottom of the right rail 538B and/or right flange 550B) with a front taper 554B. The left and right rails 538A 538B are configured to slide onto the left and right rails 520A, 520B of the front body 506, such that the left and right rail engagement nubs 552A, 552B of the rear body 508 insert into and are retained within the left and right rail openings 532A, 532B of the front body 506. The front tapers 554A, 554B facilitate engagement of left and right rail engagement nubs 552A, 552B of the rear body 508 with the left and right rail openings 532A, 532B of the front body 506.

The left strain relief cylinder 540A defines a channel 556A, and the right strain relief cylinder 540B defines a channel 556B. The outsides of the left and right strain relief cylinders 540A, 540B are configured to be inserted into left and right tension relief members 504A, 504B, respectively. The channels 556A, 556B are configured to receive the first and second launch fiber extended portions 514A, 514B of the launch cable 218 therethrough, respectively, to relieve strain and prevent over bending of the first and second launch fiber extended portions 514A, 514B.

Figure 5J:
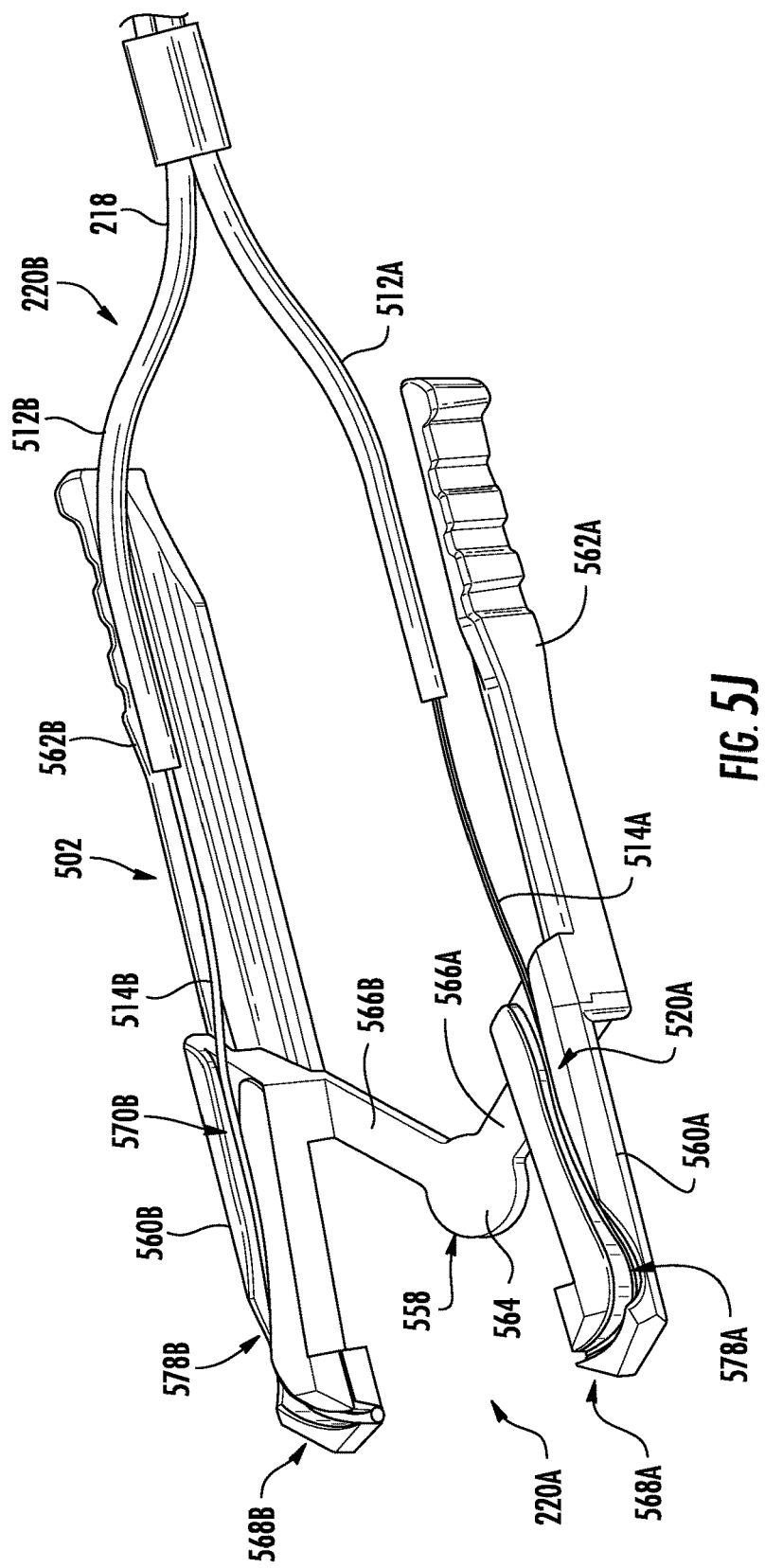
FIG. 5J is a bottom perspective view of the clip of the launch connector of FIG. 5A including first and second launch optical fibers positioned therein.

FIGS. 5I-5K are views of the clip 502. The clip 502 comprises a bar 558, a left engagement arm 560A (e.g., first engagement arm) forwardly extending from a left end of the bar 558, a right engagement arm 560B (e.g., second engagement arm) forwardly extending form a right end of the bar 558, a left handle 562A rearwardly extending from a left end of the bar 558 (and axially aligned with the left engagement arm 560A), and a right handle 562B rearwardly extending from a right end of the bar 558 (and axially aligned with the right engagement arm 560B). The bar 558 flexes to allow the left and right engagement arms 560A, 560B to pivot away from each other when the left and right handles 562A, 562B are pushed inwardly towards each other.

The bar 558 comprises a central disc 564 with a left connection member 566A extending to the rear and left and a right connection member 566B extending to the rear and right. In other words, the left and right connection members 566A, 566B extend rearwardly (toward a proximal end 220B from the central disc 564 and at an angle from one another. This allows the bar 558 to bend and absorb the resulting strain without fracturing.

A top surface of the left and right handles 562A, 562B is approximately flush (e.g., level) with a top surface of the bar 558. Comparatively, a top surface (and/or axis) of the left and right engagement arms 560A, 560B is offset (e.g., lower) from the top surface (and/or axis) of the bar 558 and/or left and right handles 562A, 562B. In this way, when assembled with the front body 506 and rear body 508, the left and right engagement arms 560A, 560B are positioned in the front body left and right grooves 522A, 522B. The clip 502 is secured within the housing 500 by vertical constrainment between the front body top panel 516 and the front body left and right rails 520A, 520B and the rear body left and right rails 538A, 538B. The clip 502 is secured within the housing 500 by horizontal constrainment by positioning the top panel 534 of the rear body 508 and the left and right sidewalls 536A, 536B of the rear body 508 between and at a distal end of the left and right handles 562A, 562B of the clip 502. The clip 502 is secured within the housing 500 by axial constrainment (e.g., forward and backward) by positioning of the bar central disc 564 of the clip 502 proximate the overhang 542 of the rear body 508 and positioning of a front of the left and right handles 562A, 562B of the clip 502 proximate the proximal end of the left and right sidewalls 518A, 518B of the front body 506.

The left engagement arm 560A comprises a left launch fiber guide 568A (at a distal end thereof) and an underside groove 570A (along a length thereof), and the right engagement arm 560B comprises a right launch fiber guide 568B (at a distal end thereof) and an underside groove 570B (along a length thereof). The left and right launch fiber guides 568A, 568B are configured to engage the first and second fiber optic connectors 208A, 208B, and the underside grooves 570A, 570B are configured to retain a portion of the first and second launch fiber extended portions 514A, 514B of the launch cable 218, such that first and second launch ends 430A, 430B of the first and second launch fibers 428A, 428B are positioned in the left and right launch fiber guides 568A, 568B. The first and second launch fiber extended portions 514A, 514B as held in the underside groove 570A, 570B will keep the first and second launch fiber extended portions 514A, 514B from bending below the minimum allowed bend radius (e.g., 2.4 mm).

The left and right launch fiber guides 568A, 568B provide for fine alignment (e.g., precise alignment, etc.) of the first or second emission ends 432A, 432B of the first or second launch fibers 428A, 428B with the first or second launch ends 408A, 408B of the first or second tracing optical fiber 406A, 406B.

Each of the left and right launch fiber guides 568A, 568B comprises a front alignment surface 572A (towards a distal end 220A) and a rear alignment surface 572B (towards a proximal end 220B) with a planar surface 574 (e.g., substantially planar surface) positioned therebetween. The front and rear alignment surfaces 572A, 572B extend inwardly, thereby forming a triangular prism. As shown, the first emission end 432A of the first launch fiber 428A may be flush with the planar surface 574 of the left launch fiber guide 568A, and retained in place by a fastening element (e.g., adhesive) in an emission opening 575 defined in the planar surface 574 by the underside groove 570A, 570B.

The front alignment surface 572A comprises a first gradient that varies along a first axis A-A perpendicular to a central axis B-B of the first or second emission end 432A, 432B of the first or second launch fibers 428A, 428B. The rear alignment surface 572B comprises a second gradient that varies along the first axis A-A in a direction opposite from the first gradient. In this way, for example, the left launch fiber guide 568A aligns the first emission end 432A of the launch fiber 428A with the first launch end 408A of the first tracing optical fiber 406A in a horizontal direction.

Each of the left and right launch fiber guides 568A, 568B comprises a top alignment surface 576A (towards a distal end 220A of the left and right handles 562A, 562B, and proximate and proximal of the rear alignment surface 572B) and a rear alignment surface 576B (towards a distal end of the left and right handles 562A, 562B, and proximate and proximal of the rear alignment surface 572B). The top and bottom alignment surfaces 576A, 576B extend between the planar surface 574 and an inside surface of the left and right handles 562A, 562B. The top alignment surface 576A comprises a third gradient that varies along a second axis C-C perpendicular to the first axis A-A and perpendicular to the central axis B-B of the first or second launch fiber emission end 432A, 432B. The bottom alignment surface 576B comprises a fourth gradient that varies along the second axis C-C in a direction opposite from the third gradient. Thus, the top and bottom alignment surfaces 576A, 576B form a concavity. In this way, for example, the left launch fiber guide 568A aligns the first launch fiber emission end 432A with the first tracing optical fiber launch end 408A in a vertical direction.

In this way, at least a portion of the first, second, third, and/or fourth alignment surfaces comprise planar and/or curved surfaces. Further, in some embodiments more or fewer alignment surfaces and/or gradients may be used. For example, in one embodiment, only the front and rear alignment surfaces 572A, 572B are used with a planar surface 574 (e.g., substantially planar surface) positioned in between (e.g., creating a cone bifurcated by the planar surface). As explained in more detail below, the left and right launch fiber guides 568A, 568B (e.g., the alignment surfaces 472A, 472B, 476A, 476B) mate with corresponding surfaces on the first or second fiber optic connectors 208A, 208B to align, for example, the first launch fiber emission end 432A with the first tracing optical fiber launch end 408A for efficient coupling. In this way, the left and right launch fiber guides 568A, 568B (e.g., the first, second, third, and/or fourth alignment surfaces thereof) may form all or a portion of any of a plurality of suitable shapes. For example, the left and right launch fiber guides 568A, 568B (e.g., the first, second, third, and/or fourth alignment surfaces thereof) may form part or all of a cone, cylinder, sphere, prism (e.g., triangular, rectangular, etc.), and/or pyramid (e.g., triangular, rectangular, etc.), or combinations thereof. In particular, the left and right launch fiber guides 568A, 568B provide lateral alignment (e.g., horizontal and vertical alignment, such as along axes A-A and C-C), proximal alignment (e.g., along axis B-B), and angular alignment (e.g., in line with axis B-B). However, in certain embodiments, for example, misalignment tolerances of the first launch fiber emission end 432A with the first tracing optical fiber launch end 408A can be up to 200 microns (e.g., up to 100 microns, up to 50 microns, etc.).

Further, in certain embodiments the left engagement arm 560A further comprises a sidewall notch 578A, and the right engagement arm 560B further comprises a sidewall notch 578B to provide access to the first and second launch ends 430A, 430B of the first and second launch fibers 428A after assembly of the clip 502 to the housing 500 (e.g., for polishing or otherwise finishing of the first and second launch ends 430A, 430B of the first and second launch fibers 428A, 428B).

Figure 5L:
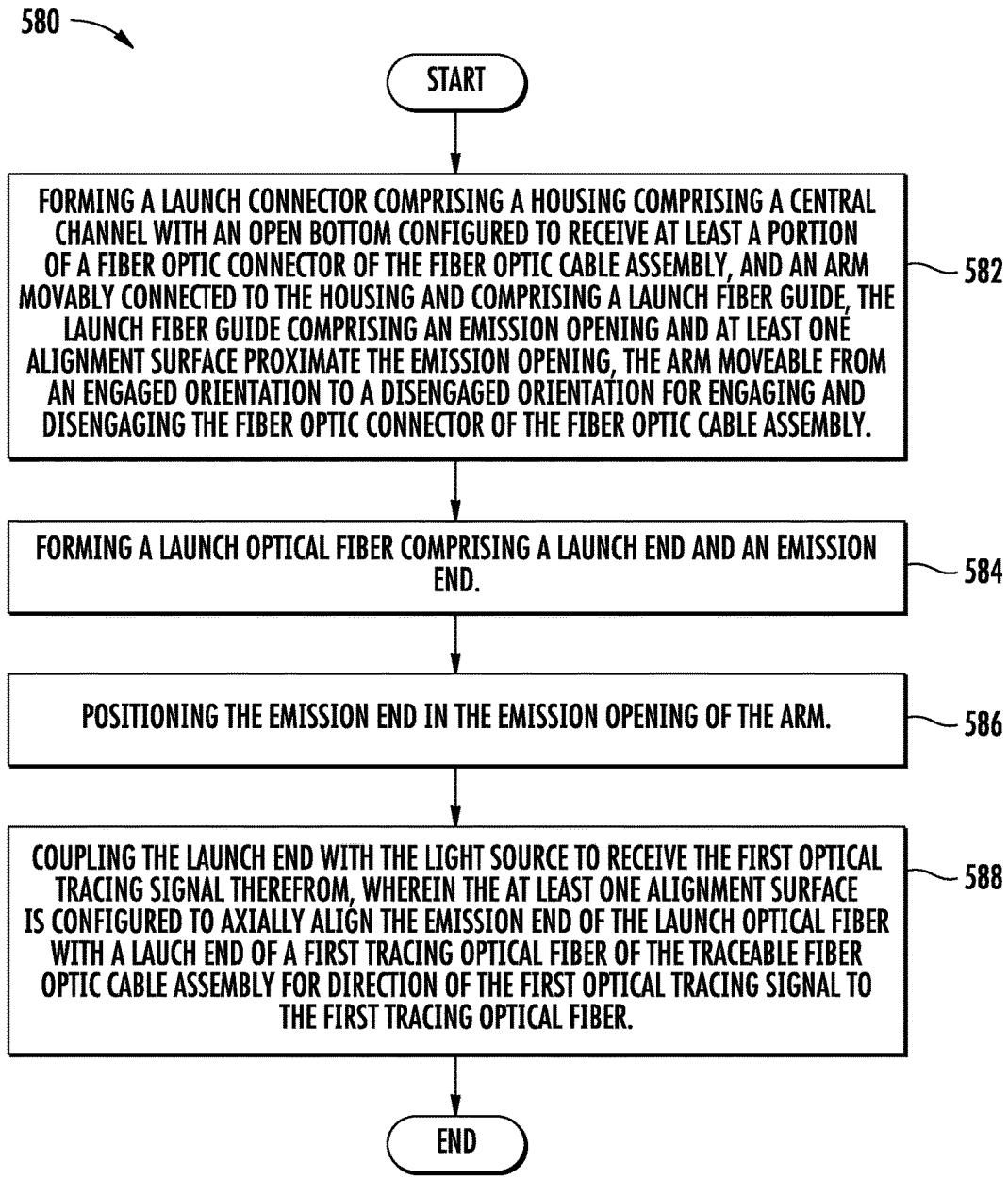
FIG. 5L is a flowchart illustrating an exemplary process for forming the launch connector of FIGS. 2A-5K.

FIG. 5L is a flowchart illustrating an exemplary process 580 for forming (e.g., manufacturing) the launch connector of FIGS. 2A-5L. Step 582 comprises forming a launch connector 216 comprising a housing 500 (e.g., body) comprising the central channel 510 with an open bottom configured to receive at least a portion of a fiber optic connector 208A, 208B of the traceable fiber optic cable assembly 202, and the left engagement arm 560A movably connected to the housing 500 (e.g., body) and comprising a left launch fiber guide 568A, the left launch fiber guide 568A comprising an emission opening 575 and at least one alignment surface (e.g., front or rear alignment surfaces 572A, 572B, top or bottom alignment surfaces 576A, 576B) proximate the emission opening 575, the left engagement arm 560A moveable from an engaged orientation to a disengaged orientation for engaging and disengaging the fiber optic connector 208A, 208B of the traceable fiber optic cable assembly 202. Step 584 comprises forming a launch fiber 428A comprising a launch end 430A and an emission end 432A. Step 586 comprises positioning the emission end 432A in the emission opening 575 of the left engagement arm 560A. Step 588 comprises coupling the launch end 430A with the light source 416 to receive the first optical tracing signal therefrom, wherein the at least one alignment surface (e.g., front or rear alignment surfaces 572A, 572B, top or bottom alignment surfaces 576A, 576B) is configured to axially align the emission end 432A of the launch fiber 428A with a launch end 408A of a first tracing optical fiber 406A of the traceable fiber optic cable assembly 202 for direction of the first optical tracing signal to the first tracing optical fiber 406A.

The launch connector 216 is configured to selectively engage to and disengage from the traceable fiber optic cable assembly 202 for tracing ends 209A, 209B of the fiber optic cable 206 be injection of an optical tracing signal into the fiber optic cable 206. In particular, the left and right launch fiber guides 568A, 568B are configured to interact with and mate with the left and right connector fiber guides 600A, 600B for alignment and injection of the optical tracing signal from the launch connector 216 into the first or second fiber optic connector 208A, 208B. In this way, the left and right launch fiber guides 568A, 568B and the left and right connector fiber guides 600A, 600B are not limited to any particular shape or configuration, but could be anything to register the launch fiber 428A with the first or second tracing optical fiber 406A, 406B.

Figure 6A:
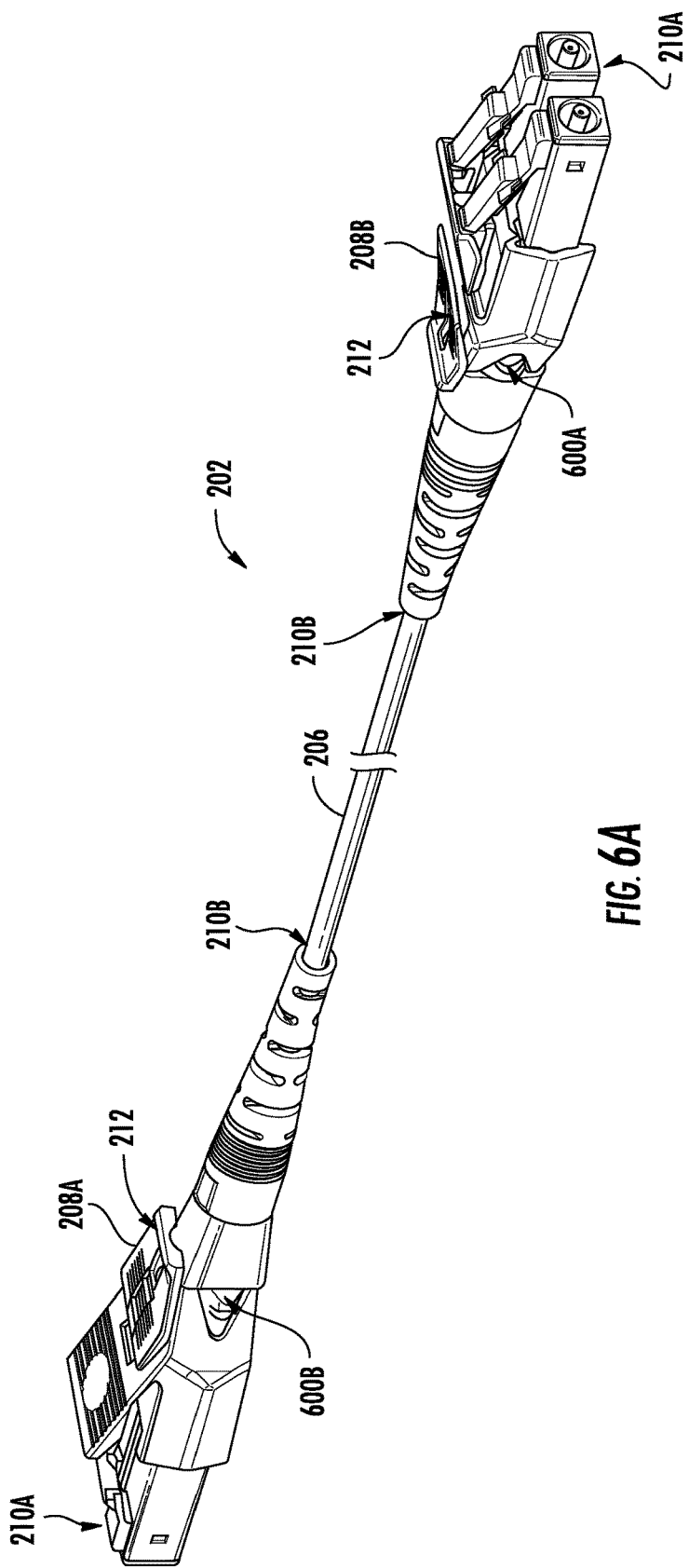
FIG. 6A is a perspective view of the traceable fiber optic cable assembly of FIGS. 2A-2C and 4.

FIGS. 6A-6E are views of the traceable fiber optic cable assembly 202 of FIGS. 2A-2C and 4. In particular, FIG. 6A is a perspective view of the traceable fiber optic cable assembly 202. As discussed above, the traceable fiber optic cable assembly 202 comprises a fiber optic cable 206, a first fiber optic connector 208A, and a second fiber optic connector 208B. Each of the first and second fiber optic connectors 208A, 208B comprise a left connector fiber guide 600A (e.g., first connector fiber guide) and a right connector fiber guide 600B (e.g., second connector fiber guide).

FIGS. 6B-6E are views of the right connector fiber guide 600B. Each of the left and right connector fiber guides 600A, 600B comprises a front alignment surface 602A (towards a distal end 210A) and a rear alignment surface 602B (towards a proximal end 210B) with a planar surface 604 (e.g. substantially planar surface) positioned therebetween. The planar surface 604 comprises a launch opening 606 approximately centered therein to receive the first or second tracing optical fibers 406A, 406B. As shown, the first tracing optical fiber launch end 408A may be flush with the planar surface 604. The front and rear alignment surfaces 602A, 602B extend outwardly (e.g., from a left and right side or peripheral edge of the planar surface 604), thereby forming a concavity. Further, a top and bottom edge of the planar surface 604 is unimpeded, and is not proximate any alignment surface. This provides access to cleave, for example, the first tracing optical fiber 406A from the launch end 408A, when the first tracing optical fiber 406A is positioned within the left or right connector fiber guide 600B. In some embodiments, the first and second launch ends 408A, 408B may be cleaved before insertion (e.g., pre-cleaved) into the left and right connector fiber guides 600A, 600B.

The front alignment surface 602A comprises a first gradient that varies along a first axis D-D perpendicular to a central axis E-E of the first tracing optical fiber launch end 408A. The rear alignment surface 602B comprises a second gradient that varies along the first axis D-D in a direction opposite from the first gradient. In this way, for example, the left connector fiber guide 600A aligns the launch end 408A of the first tracing optical fiber 406A with the first emission end 432A of the first launch fiber 428A in a horizontal direction.

Each of the connector fiber guides 600A, 600B comprises a top alignment surface 608A (proximate and proximal of the rear alignment surface 602B) and a bottom alignment surface 608B (proximate and proximal of the rear alignment surface 602B). The top alignment surface 608A comprises a third gradient that varies along a second axis F-F perpendicular to the first axis D-D and perpendicular to the central axis E-E of the first or second launch end 408A, 408B of the first or second tracing optical fibers 406A, 406B. The bottom alignment surface 608B comprises a fourth gradient that varies along the second axis F-F in a direction opposite from the third gradient. Thus, the top and bottom alignment surfaces 608A, 608B extend outwardly forming a raised curved protrusion. In this way, for example, the left connector fiber guide 600A aligns the first launch end 408A of the first tracing optical fiber 406A with the first launch fiber emission end 432A in a vertical direction.

In this way, at least a portion of the first, second, third, and/or fourth alignment surfaces comprise planar and/or curved surfaces. Further, in some embodiments more or fewer alignment surfaces and/or gradients may be used. For example, in one embodiment, only the front and rear alignment surfaces 602A, 602B are used with a planar surface 604 (e.g., substantially planar surface) positioned in between (e.g., creating a cone bifurcated by the planar surface). In this way, the left and right connector fiber guides 600A, 600B (e.g., the first, second, third, and/or fourth alignment surfaces thereof) may form all or a portion of any of a plurality of suitable shapes. For example, the left and right connector fiber guides 600A, 600B (e.g., the first, second, third, and/or fourth alignment surfaces thereof) may form part or all of a cone, cylinder, sphere, prism (e.g., triangular, rectangular, etc.), and/or pyramid (e.g., triangular, rectangular, etc.), or combinations thereof. In particular, the left and right connector fiber guides 600A, 600B provide lateral alignment (e.g., horizontal and vertical alignment, such as along axes D-D and F-F), proximal alignment (e.g., along axis E-E), and angular alignment (e.g., in line with axis E-E). However, in certain embodiments, for example, misalignment tolerances of the first launch fiber emission end 432A with the first tracing optical fiber launch end 408A can be up to 200 microns (e.g., up to 100 microns, up to 50 microns, etc.).

As explained in more detail below, the left and right connector fiber guides 600A, 600B (e.g., the alignment surfaces 602A, 602B, 608A, 608B) mate with corresponding surfaces on the left and right launch fiber guides 568A, 568B to align, for example, the first launch end 408A of the first tracing optical fiber 406A with the first emission end 432A of the first launch fiber 428A for efficient coupling.

Further, the left and/or right connector fiber guide 600A, 600B may further comprise an engagement taper 610 (proximate and proximal to the top and bottom alignment surfaces 608A, 608B) to facilitate engagement of the clip 502 to the first or second fiber optic connectors 208A, 208B, as described below.

Figure 7A:
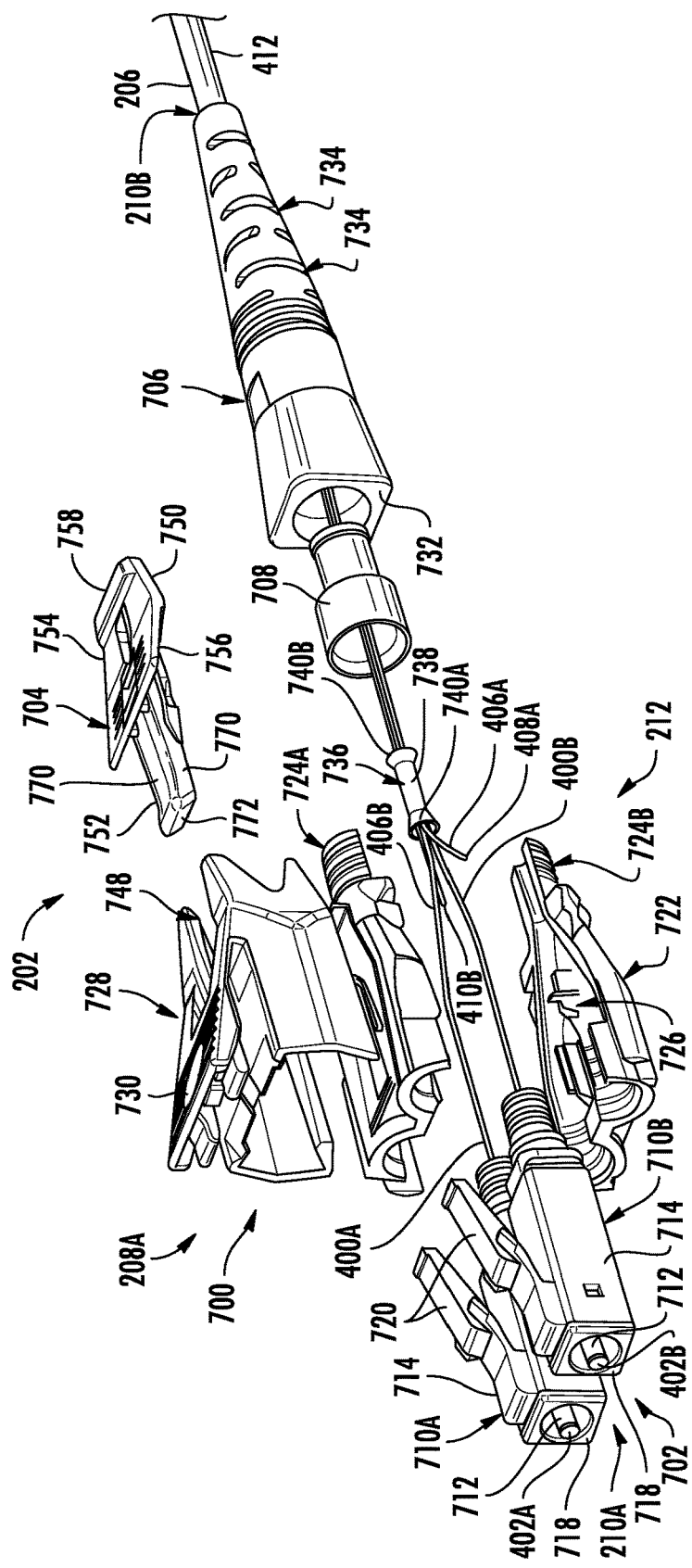
FIG. 7A is an exploded view of the first fiber optic connector of FIGS. 2A-2C, 4, and 6A-6E.
Figure 9A:
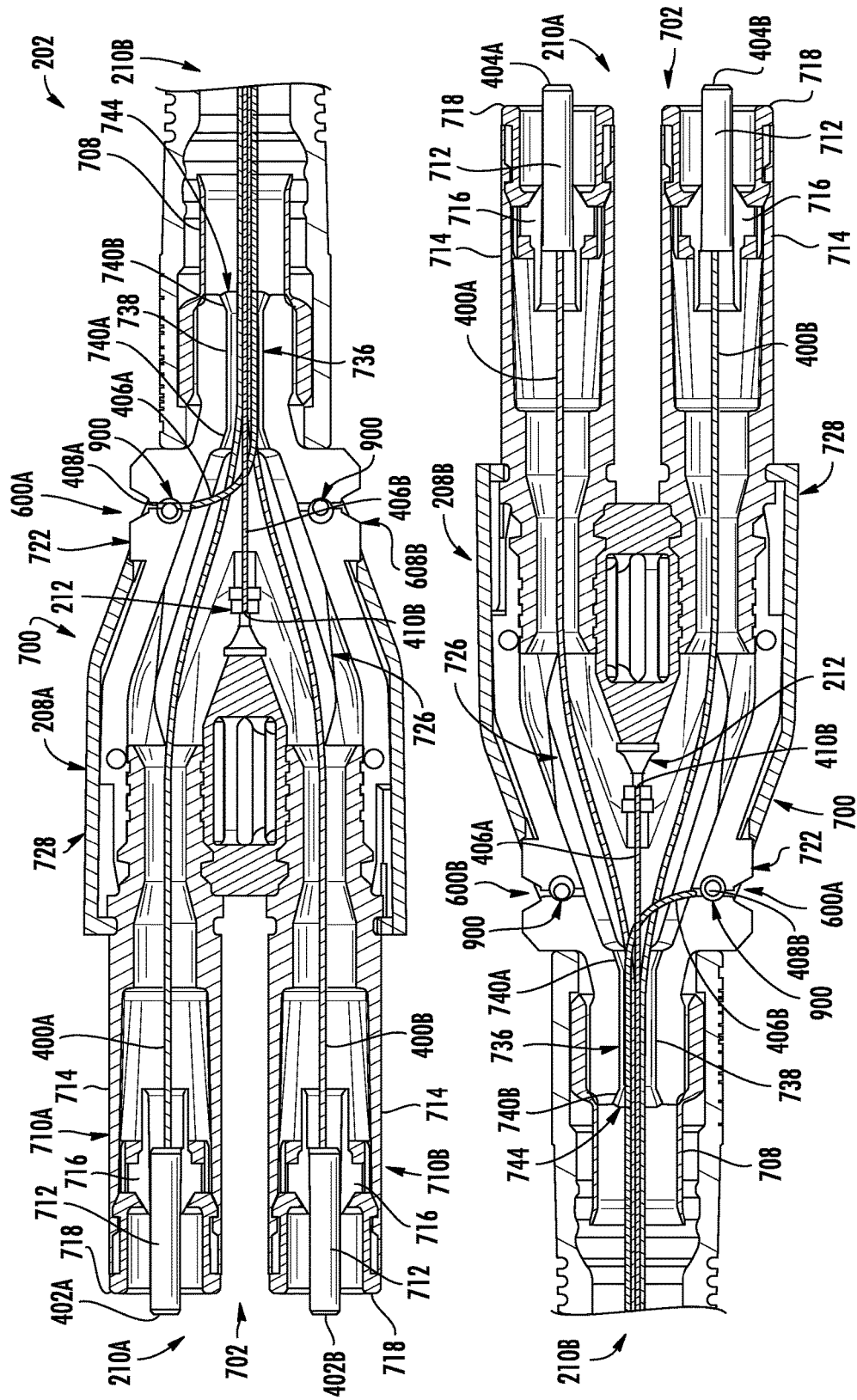
FIG. 9A is a cross-sectional view of the traceable fiber optic cable assembly of FIGS. 2A-2C, 4, and 6A-8F.

FIG. 7A is an exploded view of the first fiber optic connector of FIGS. 2A-2C, 4, and 6A-6F. The first and second fiber optic connectors 208A, 208B (e.g., optical connector, connector, etc.) are in the form of an LC duplex connector (although other types of connectors could be used). Each of the first and second fiber optic connector 208A, 208B comprises a housing 700, a connection interface 702, a locking member 704 (e.g., lock feature), a boot 706, and a crimp band 708, as explained below in more detail. The connection interface 702 comprises first and second LC connector sub-assemblies 710A, 710B. As shown, each connector sub-assembly 710A, 710B includes a ferrule 712 configured to support an optical fiber (e.g., the first and second data transmission fibers 400A, 400B) and a ferrule casing 714 (e.g., connector sub-assembly housing, housing, etc.) surrounding a portion of the ferrule 712. The ferrule 712 extends from a ferrule holder 716 (shown in FIG. 9A) that is retained in the ferrule casing 714 by a cap 718 or internal geometry of the ferrule casing 714. A spring (also not shown) biases the ferrule holder 716 forward within the ferrule casing 714 so that a front end of the ferrule 712 projects beyond the ferrule casing 714. The front end presents the optical fiber (e.g., data transmission fiber 400A, 400B) for optical coupling with a mating component (e.g., another fiber optic connector).

Each connector sub-assembly 710 also includes a latch arm 720 extending outwardly and rearwardly from a portion of the ferrule casing 714. Thus, the latch arm 720 has a proximal end coupled to the ferrule casing 714 and a distal end spaced from the ferrule casing 714. The distal end of the latch arm 720 may be depressed toward the ferrule casing 714 for mating purposes, as will be described in greater detail below.

The housing 700 of the first fiber optic connector 208A includes a body 722 in which a rear portion of each connector sub-assembly 710 (e.g., rear portions of ferrule casing 714) is received. The body 722 comprises a top clamshell 724A and a bottom clamshell 724B (e.g., a two-piece construction). At least a portion of the body 722 is translucent to allow at least a portion of the optical tracing signal to exit the housing 700. Note that translucent, at least as used herein, comprises semi-transparent and transparent. In particular, as used herein, the term semi-transparent identifies objects that allow at least some light to pass through at least part of the object and transparent identifies objects that allow substantially all light to pass through all or part of the object. In some embodiments, at least part of the body 722 is semi-transparent (e.g., translucent but not transparent). In yet other embodiments, at least part of the body 722 is transparent. Top and bottom clamshells 724A, 724B attach together to define an interior 726 (e.g., of the housing 700). The first and second data transmission fibers 400A, 400B (e.g., first and second optical data fibers) are routed through the interior 726 from the rear of the housing 700 to the connector sub-assemblies 710. The top and bottom surface of the body 722 is mostly flat as this is where the light exits the body 722, and it is desirable to leave the light path uninterrupted until it reaches the locking member 704 (described below in more detail).

The housing 700 further comprises a trigger casing 728 with a trigger arm 730 extending forward and outwardly from a top of the trigger casing 728 (and/or body 722). The trigger arm 730 is depressible and biased upward (e.g., away from the body 722). The trigger arm 730 extends outwardly from the body 722 and over the distal end of the latch arm 720. This advantageously allows the trigger arm 730 to engage and disengage both latch arms 720 at the same time with a single trigger, and also inhibits fiber optic cables from snagging on the latch arms 720. The locking member 704 moves relative to the housing 700 (including the trigger casing 728 and trigger arm 730) to allow or prevent the trigger arm 730 from depressing and activating the latch arms 720. The trigger casing 728 is slidably removable from the body 722, such as to reverse polarity of the first fiber optic connector 208A (explained in more detail below).

The trigger arm 730 is shown as a separate component (e.g., a clip) removably attached to the body 722, but may alternatively be integrally formed with the body 722 so as to be part of a unitary (i.e., monolithic) structure with the body 722. However, providing the trigger arm 730 as a removable component may provide certain benefits. For example, it may be possible to remove the trigger arm 730 and attach it to the opposite side of the body 722. The connector sub-assemblies 710 may also be configured to independently rotate within the body 722 so the latch arms 720 can be orientated on the opposite side of the body 722 as well. Repositioning the trigger arm 730 and connector sub-assemblies 710 in such a manner reverses the polarity scheme of the first fiber optic connector 208A. Additional details and advantages of such polarity reversal, and an exemplary configuration of the trigger arm 730 and body 722 in general, are described in U.S. Pat. No. 8,152,385, whose disclosure of these aspects is herein incorporated by reference.

The housing 700 may be attached to a fiber optic cable 206 that includes the first and second data transmission fibers 400A, 400B (e.g., first and second optical data fibers and first and second tracing optical fibers 406A, 406B). For example, the optical fibers may be un-buffered fibers extending from within a cable jacket 412 of the fiber optic cable 206. One or more strength members (e.g., aramid yarn) may extend from the cable jacket 412. The strength members may be secured to a rear of the housing 700 by a crimp band 708 that is crimped onto the rear of the housing 700. In other embodiments, the fiber optic cable 206 may have a different configuration or be secured to the housing 700 or other part of the first fiber optic connector 208A in a different manner (e.g., using an adhesive).

To help prevent sharp bends in the optical fibers where the fiber optic cable 206 is secured to the housing 700, the first fiber optic connector 208A further includes a boot 706 extending over a portion of the fiber optic cable 206 and the housing 700. The boot 706 comprises a substantially flat proximal surface 732 (e.g., with a substantially rectangular cross section). Slots 734 provide controlled bending for fiber optic cable 206. Boot 706 is rotatably attached to the housing 700. More specifically, boot 706 is able to be rotated at least about 45 degrees in both directions, thereby allowing removal of the trigger arm 730 for polarity reversal (explained in more detail below).

Further, the housing 700 may further comprise a metal guide tube 736 at a rear of the housing 700 to further prevent sharp bends in the optical fibers as the optical fibers enter the body 722. More specifically, the metal guide tube 736 comprises a cylindrical body 738 with a first tapered end 740A and a second tapered end 740B opposite thereto. The first and second tapered ends 740A, 740B further prevent sharp bends. The metal guide tube 736 prevents the optical fibers from being pinched during assembly of the top clamshell 724A to the bottom clamshell 724B.

Figure 7B:
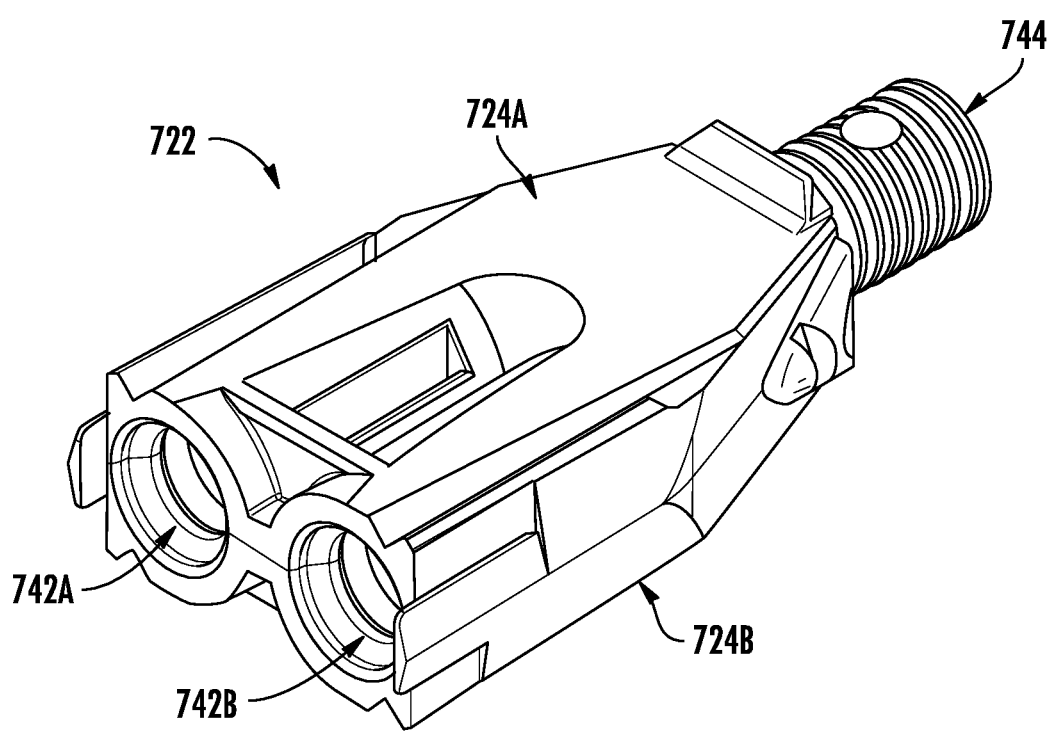
FIG. 7B is a perspective view of the housing body of the first fiber optic connector of FIG. 6A.

FIG. 7B is a perspective view of the body 722 of the first fiber optic connector 208A of FIG. 7A. As shown, the body 722 comprises a top clamshell 724A and a bottom clamshell 724B. In this embodiment, the top clamshell 724A and bottom clamshell 724B are substantially identical, but other embodiments can use body portions that are not identical. The top clamshell 724A and bottom clamshell 724B attach together and form first and second front apertures 742A, 742B (e.g., two substantially parallel apertures 742) for receiving first and second connector subassemblies 710A, 710B. First front aperture 742A and second front aperture 742B are configured to receive and retain a portion of the first and second connector subassemblies 710A, 710B in such a manner as to allow rotation for polarity reversal.

The housing 700 further comprises a rear aperture 744 opposite from the first and second front apertures 742A, 742B that is at least partially defined from the mating of the top and bottom clamshells 724A, 724B. The rear aperture 744 is in continuous communication with the first and second front apertures 742A, 742B by body 722 through interior 726. The rear aperture 744 is configured to interact with fiber optic cable 206 and crimp band 708 to allow ingress of optical fibers through its passage and for securing the fiber optic cable 206 to the housing 700 at the outer periphery. Further the rear aperture 744 is configured to receive the metal guide tube 736 therein. However, as noted above, the connector described is merely exemplary, and other types of connectors are within the scope of this disclosure.

Figure 7C:
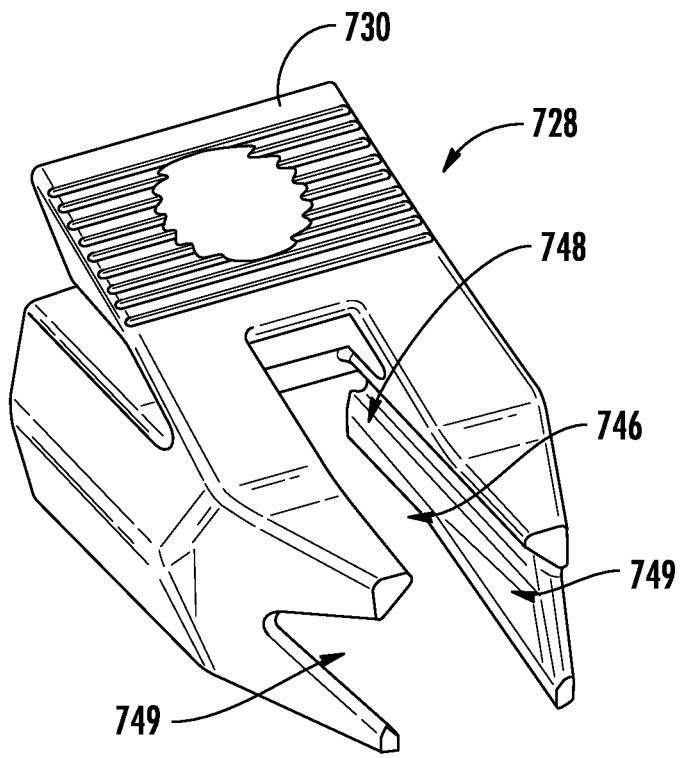
FIG. 7C is a rear perspective view of a trigger casing of the first fiber optic connector of FIG. 6A.
Figure 7D:
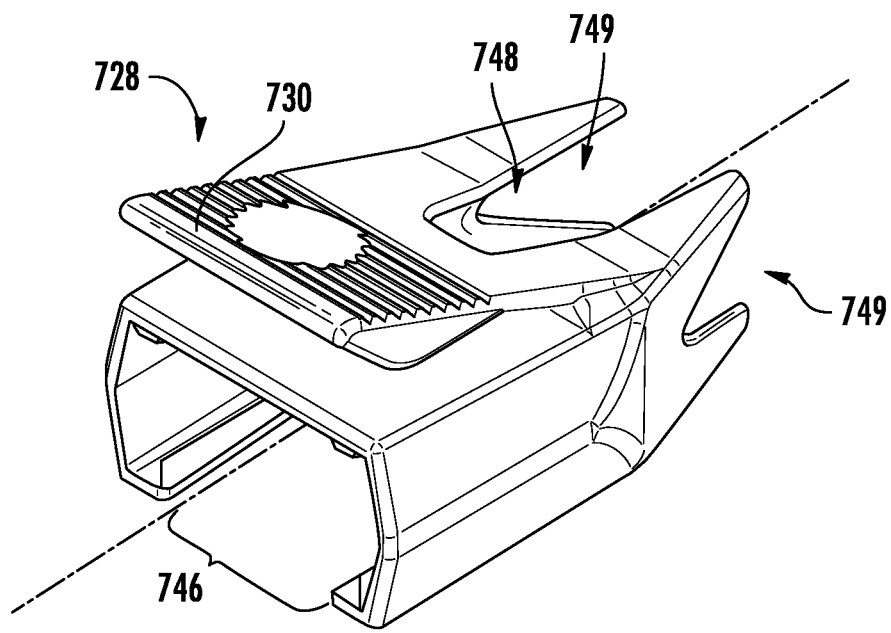
FIG. 7D is a front perspective view of the trigger casing of the first fiber optic connector of FIG. 6A.

FIGS. 7C and 7D are views of the trigger casing 728 of the first fiber optic connector of FIG. 7A. The trigger casing 728 is substantially rectangular with a substantially rectangular through passage. The trigger arm 730 comprises a flexible arm attached to a top surface of the trigger casing 728 and extending angularly away from it. The trigger casing 728 further comprises a lateral gap 746 in a bottom thereof, to allow the trigger casing 728 to be removed from the body 722. The rectangular shape of the trigger casing 728 and passage prevent accidental rotation of the trigger casing 728 relative to the body 722. The trigger casing 728 may have a lateral gap 746 in the trigger arm 730 towards a bottom of the trigger arm 730, to receive a portion of the locking member 704 therethrough, as explained in more detail below. Further, the trigger casing 728 may comprise a top opening 748 to receive a portion of the locking member 704 therein. Further, the trigger casing 728 may comprise side apertures 749 to facilitate removal of the trigger casing 728 from the body 722 and to receive the left or right connector fiber guide 600A, 600B therein.

Figure 7E:
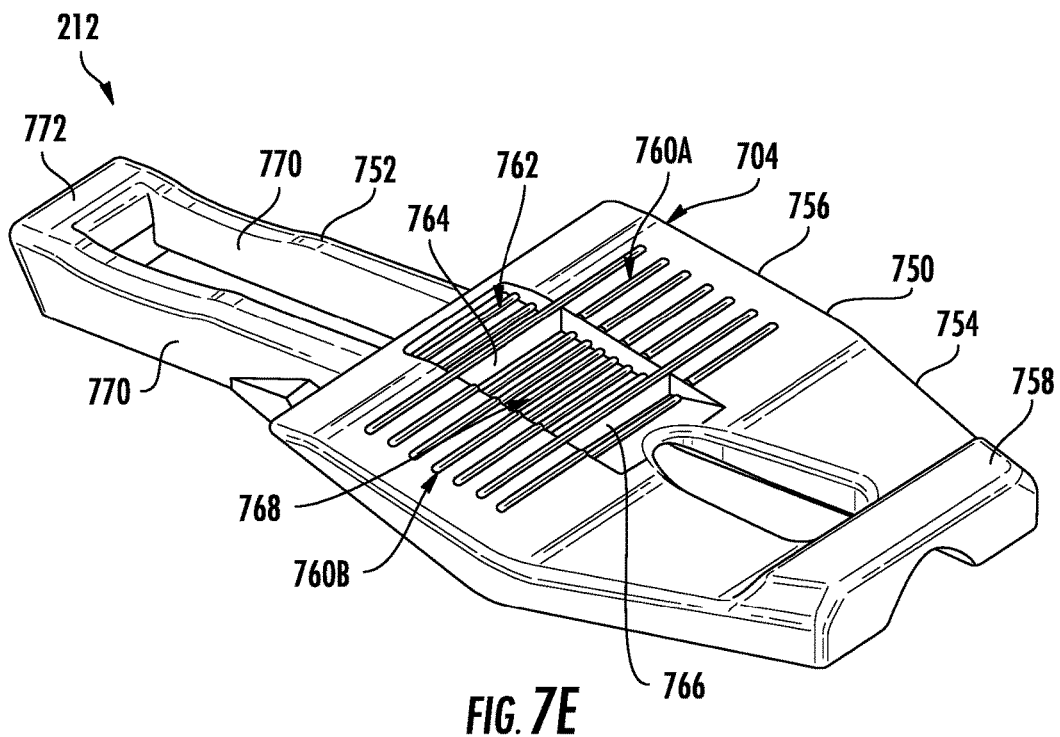
FIG. 7E is a rear perspective view of a locking member of the first fiber optic connector of FIG. 6A.
Figure 7F:
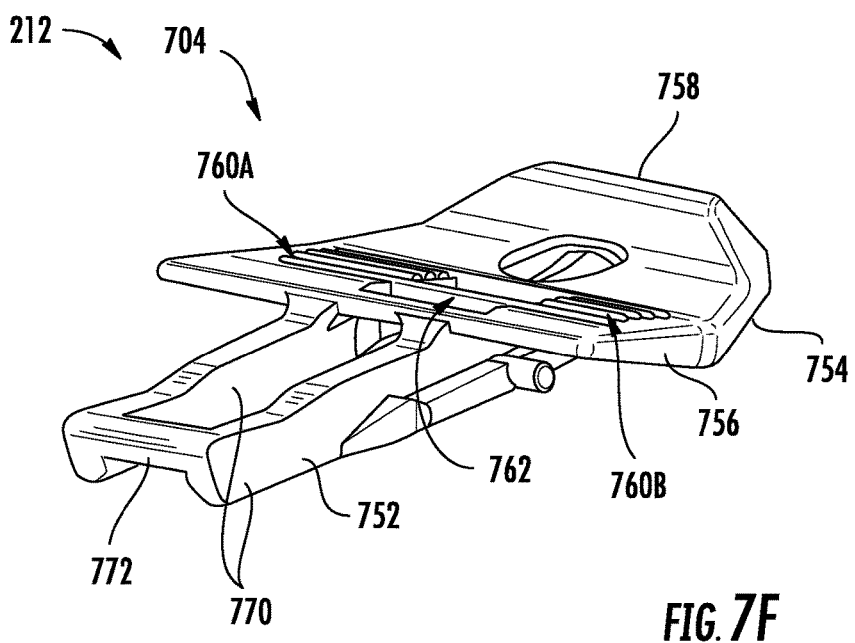
FIG. 7F is a front perspective view of the locking member of the first fiber optic connector of FIG. 6A.

FIGS. 7E and 7F are views of the locking member 704 of the first fiber optic connector 208A. The locking member 704 is translucent to allow passage of the optical tracing signal therethrough so that the optical tracing signal exits the housing 700. The locking member 704 comprises a proximal portion 750 and a distal portion 752, the proximal portion 750 wider than the distal portion 752. The proximal portion 750 may, for example, have a front end with a width greater than that of the top opening 748 of the trigger casing 728 in the trigger arm 730, but equal to or less than that of the trigger arm 730 in general. In the embodiment shown, the proximal portion 750 includes a first segment 754 and a second segment 756 bent or otherwise inclined relative to the first segment 754. Such a configuration enables the proximal portion 750 to have a shape generally conforming to or otherwise complementing that of the trigger arm 730, as will be described in greater detail below. The first segment 754 may also include a ramp, flange, ledge or other raised gripping element 758 at a rear of the locking member 704 to make it easier for a user to move the locking member 704 between its forward and rearward positions (explained in more detail below). The design of the locking member 704 as an illumination component may be further optimized by reducing the height and area of the gripping element 758 which may be raised and block light.

The second segment 756 comprises left gripping ridges 760A, right gripping ridges 760B, and an external TIR structure 762 positioned therebetween. In particular, the illumination component 212 comprises the external TIR structure 762. The left and right gripping ridges 760A, 760B are used to facilitate sliding of the locking member 704. The external TIR structure 762 extends from the front to the back of the locking member 704. The locking member 704 comprises a major forward TIR surface 764, a major rearward TIR surface 766, and a plurality of minor TIR surfaces 768. The plurality of minor TIR surfaces 768 could be positioned between the major forward TIR surface 764 and the major rearward TIR surface 766, positioned on both sides of the major forward TIR surface 764, and/or positioned on both sides of the major rearward TIR surface 766. As explained in more detail below, the major forward TIR surface 764, major rearward TIR surface 766, and/or plurality of minor TIR surfaces 768 redirect an emitted optical tracing signal proximally (e.g., toward a user). However, the major forward TIR surface 764, major rearward TIR surface 766, and/or minor TIR surfaces 768 may redirect the emitted optical tracing signal at different angles and may depend on the position of the locking member 704 relative to the housing 700 (explained in more detail below). The top of the major forward TIR surface 764 and/or major rearward TIR surface 766 could be the same height as the left and right gripping ridges 760A, 760B to provide a consistent horizontal height for comfort of a user when gripping the locking member 704.

The distal portion 752 in the embodiment shown includes axial or elongated bars 770 that are spaced apart from each other. The elongated bars 770 extend forward from an underside of the second segment 756 to a crossbar 772, which extends between the elongated bars 770. The distal portion 752 may also include one or more locking features configured to cooperate with complementary locking features on the trigger arm 730 to removably secure the locking member 704 in the forward position, rearward position, or both.

Figure 7G:
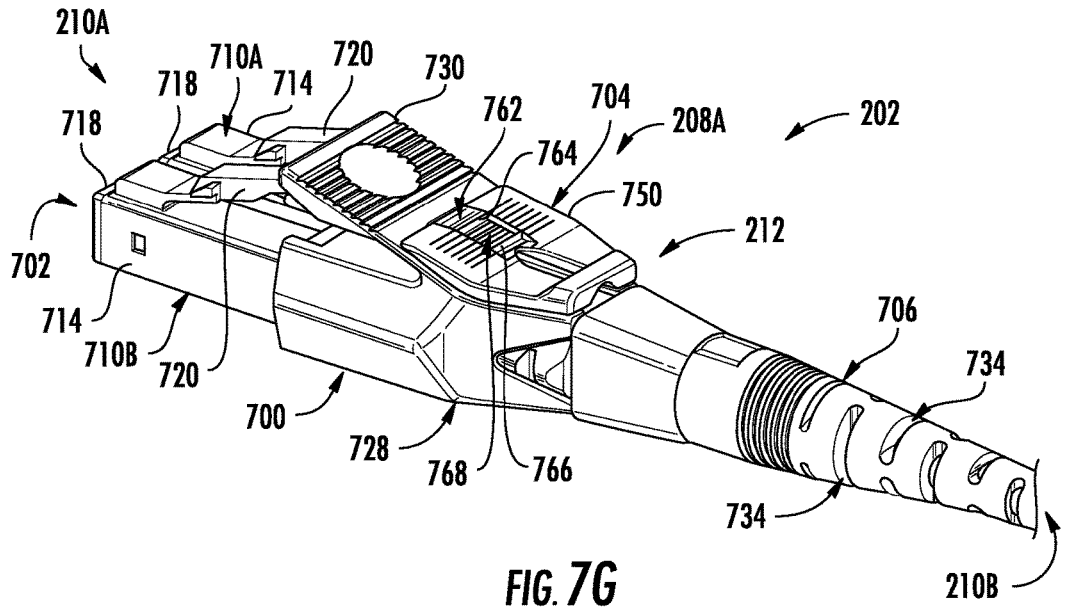
FIG. 7G is a rear perspective view of the first fiber optic connector of FIG. 6A with the locking member in an unlocked orientation.
Figure 7H:
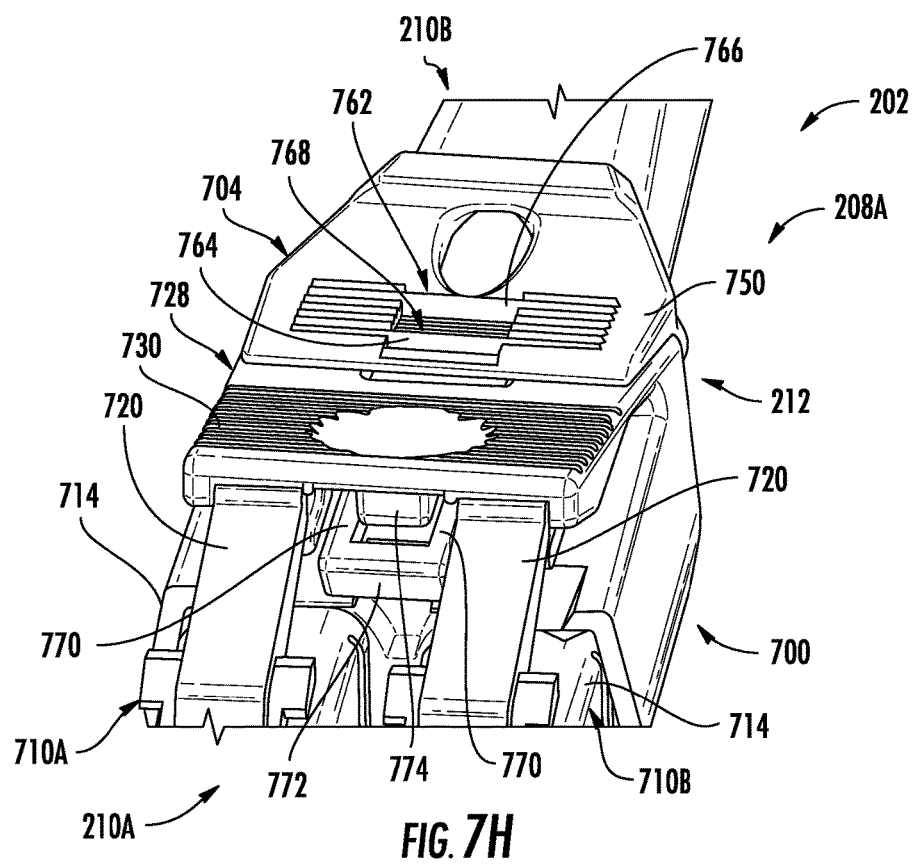
FIG. 7H is a front perspective view of the first fiber optic connector of FIG. 6A with the locking member in the unlocked orientation.

FIGS. 7G and 7H are views of the locking member 704 in an unlocked orientation (e.g., slid forward). The underside of the trigger arm 730 includes a wedge 774 between axial slots left and right elongated bars 770 of the locking member 704. The wedge 774 may initially be positioned above the elongated bars 770 of the locking member 704, as may be the case, for example, when the trigger arm 730 has not yet been depressed or otherwise moved in a direction toward the body 722. The wedge 774 is sized to fit within space between the elongated bars 770. Additionally, when the locking member 704 is in its forward position, the crossbar 772 of the locking member 704 is positioned forward of the wedge 774. Thus, in the forward position of the locking member 704, the wedge 774 can be received between the elongated bars 770 to allow the trigger arm 730 to move toward the body 722 and trigger casing 728 far enough to depress the distal ends of the latch arms 720. In other words, the crossbar 772 does not interfere or interact with the wedge 774 in the forward position of the locking member 704.

Figure 7I:
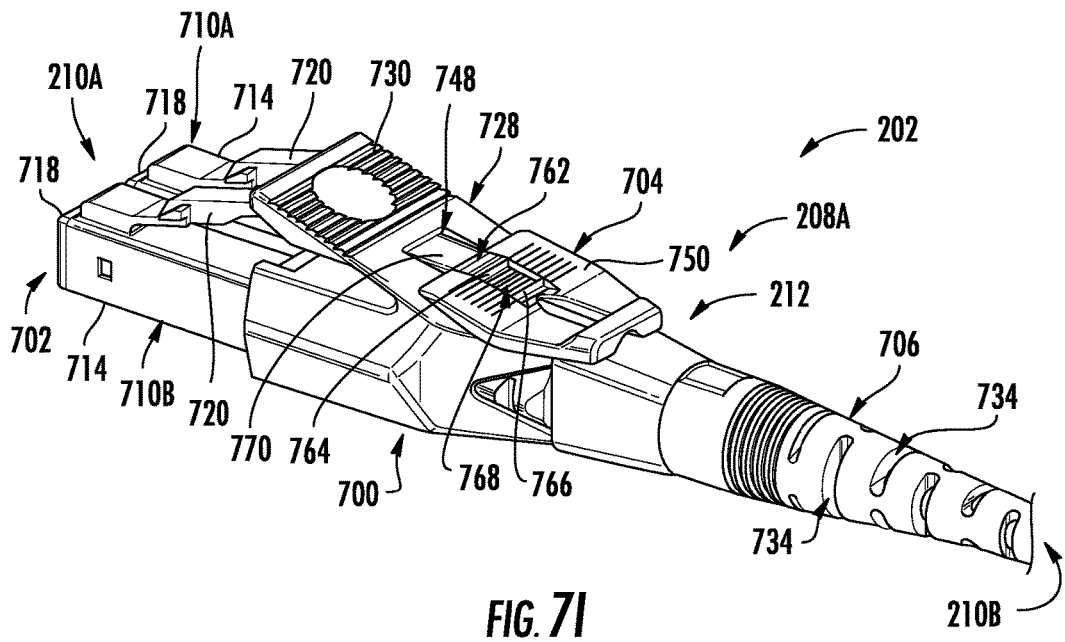
FIG. 7I is a rear perspective view of the first fiber optic connector of FIG. 6A with the locking member in a locked orientation.
Figure 7J:
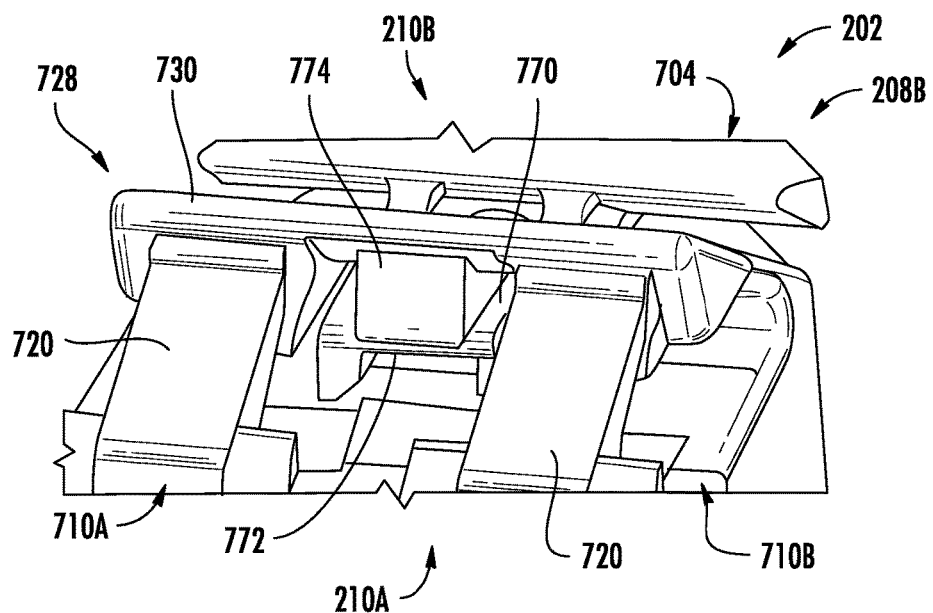
FIG. 7J is a front perspective view of the first fiber optic connector of FIG. 6A the locking member in the locked orientation.

FIGS. 7I and 7J are views of the locking member 704 in a locked orientation (e.g., slid backward). In contrast, the crossbar 772 is positioned under the wedge 774 when the locking member 704 is in its rearward position. Such an arrangement effectively prevents the trigger arm 730 from being moved towards the body 722 and trigger casing 728, or at least moved to an extent that may result in the latch arms 720 being depressed by the trigger arm 730 and moving from an initial position. For example, there may be contact between the wedge 774 and the crossbar 772 when the trigger arm 730 has not been moved at all from an initial position toward the body 722 and the trigger casing 728. Alternatively, there may be contact very soon after such movement so that only a limited range of movement is possible. The trigger arm 730 and latch arms 720 in such alternative embodiments may be configured so that the trigger arm 730 does not depress the distal ends of the latch arms 720 despite the limited range of movement.

As can be appreciated, the crossbar 772 defines a stop feature on the distal portion 752 of the locking member 704 in the embodiment shown. In other embodiments, the locking member 704 may have a different shape or configuration, yet still include a stop feature that functions in a manner similar to the crossbar 772. Thus, the stop feature may be in a form other than the crossbar 772.

Figure 8A:
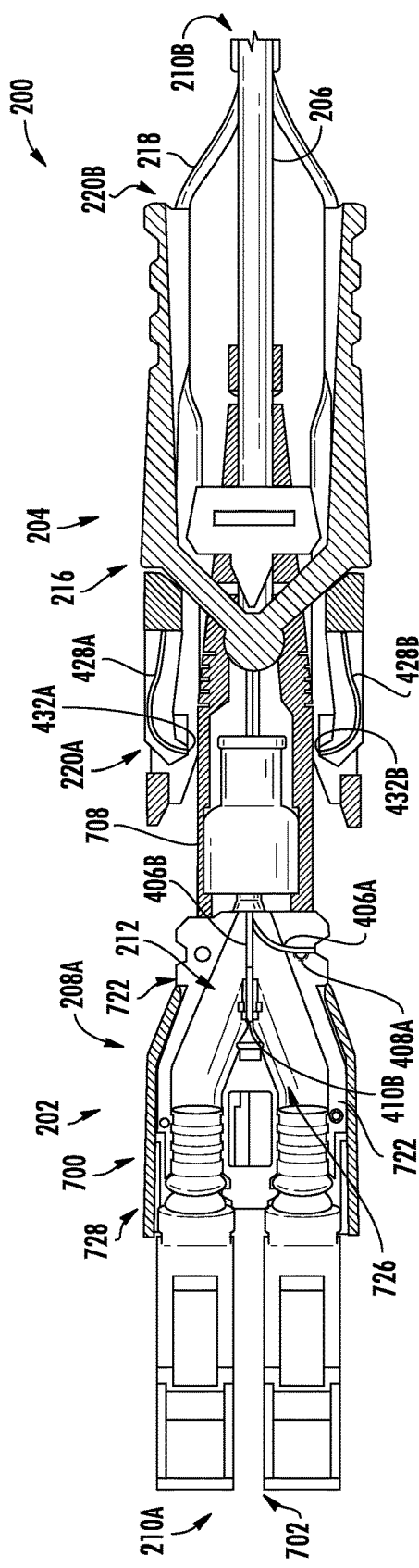
FIG. 8A is a cross-sectional top view of the first fiber optic connector of FIGS. 2A-2C, 4, and 6A-7J and the launch connector of FIGS. 2A-2C, 4, and 5A-5L disengaged from one another.
Figure 8B:
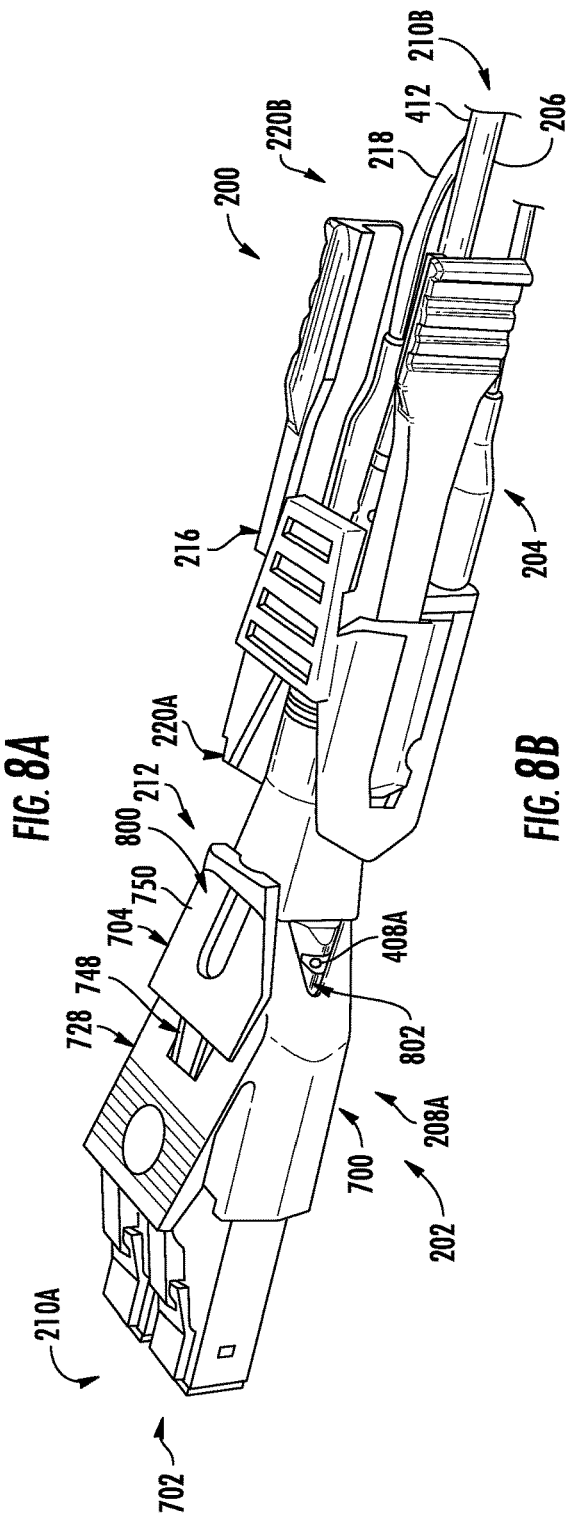
FIG. 8B is a top perspective view of the first fiber optic connector and launch connector of FIG. 8A.

FIGS. 8A-8F are views of attachment and use of the light launch device 204 with the traceable fiber optic cable assembly 202. In particular, FIGS. 8A and 8B are views of the launch connector 216 in a detached position relative to the first fiber optic connector 208A. As shown, the distance between the planar surfaces 574 of the left and right launch fiber guides 568A, 568B is less than the distance between the farthest point of the top and bottom alignment surfaces 608A, 608B of the left and right connector fiber guides 600A, 600B. Further, each of the first and second fiber optic connectors 208A, 208B comprise an illumination component 212. As shown, the illumination component 212 comprises a top primary illumination component 800 and a side secondary illumination component 802. In particular, the illumination component 212 comprises the top primary illumination component 800 and the side secondary illumination component 802, wherein the top primary illumination component 800 comprises the external TIR structure 762, and wherein the side secondary illumination component 802 comprises the internal TIR structure (described below). The top primary illumination component 800 (and external TIR structure 762) comprises the locking member 704 and the side secondary illumination component 802 (and internal TIR structure) comprises the left and/or right connector fiber guide 600A, 600B which protrudes through side apertures 749 of the trigger casing 728. In this embodiment, the trigger casing 728 is opaque, but in other embodiments, the trigger casing 728 could be translucent. The trigger casing 728 may be opaque for reasons related to communicating information to a user (e.g., type of connector).

FIGS. 8C and 8D are views of the launch connector 216 as it engages the first fiber optic connector 208A. In particular, a user presses the left and right handles 562A, 562B of the launch connector clip 502 towards each other which causes the left and right launch fiber guides 568A, 568B to pivot away from each other, increasing the distance between them. Accordingly, the distance between the left and right launch fiber guides 568A, 568B is increased to be at least the distance between the farthest point of the top and bottom surfaces 608A, 608B of the left and right connector fiber guides 600A, 600B, which is sufficient to move the left and right launch fiber guides 568A, 568B past the farthest point of the top and bottom surfaces 608A, 608B of the left and right connector fiber guides 600A, 600B as the launch connector 216 axially moves towards the distal end of the first fiber optic connector 208A. Further, the engagement taper 610 of the left and/or right connector fiber guide 600A, 600B is angled to interact with the front tapered surface 572 of the left and/or right launch fiber guides 568A, 568B of the left and right engagement arms 560A, 560B facilitating separation of the left and right launch fiber guides 568A, 568B as the launch connector 216 moves axially towards the distal end of the first fiber optic connector 208A.

Figure 8E:
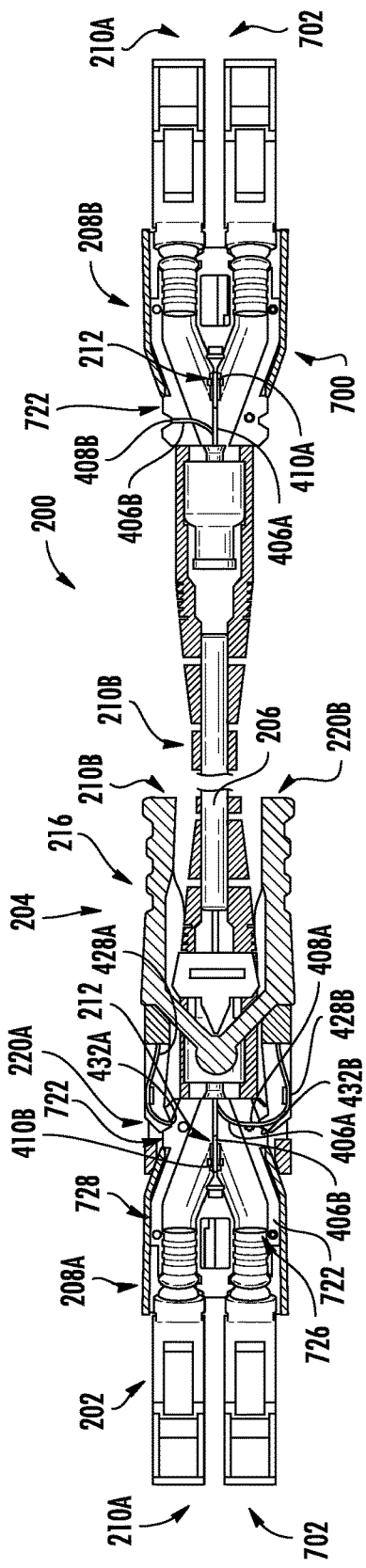
FIG. 8E is a cross-sectional top view of the traceable fiber optic cable assembly and launch connector of FIG. 8A in an engaged position and sending a first optical tracing signal to the second fiber optic connector.
Figure 8F:
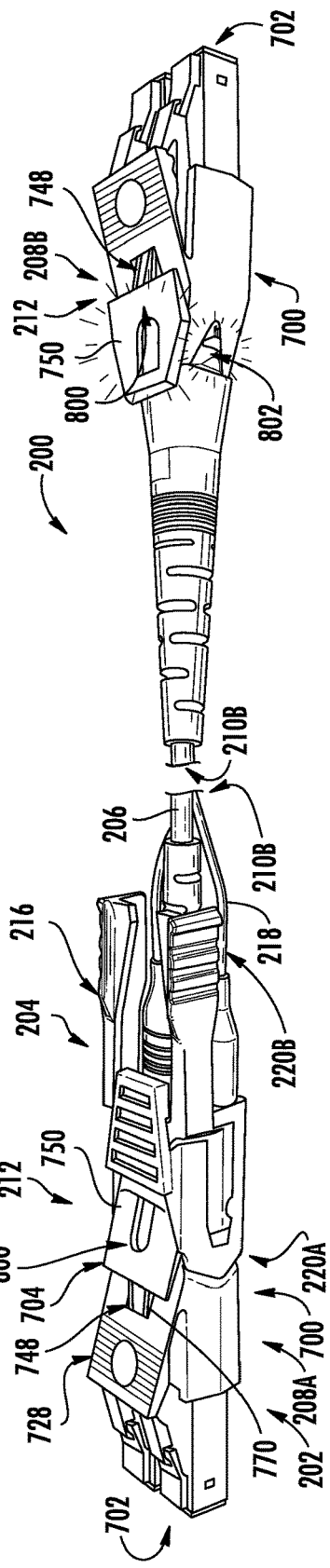
FIG. 8F is a top perspective view of the traceable fiber optic cable assembly and launch connector of FIG. 8E.

FIGS. 8E and 8F are views of the launch connector 216 in an attached position relative to the first fiber optic connector 208A. As shown, the left and right handles 562A, 562B of the launch connector clip 502 have been released which causes the left and right launch fiber guides 568A, 568B towards away from each other, decreasing the distance (e.g., launch fiber guide separation distance) between them. The distance between the planar surfaces 574 of the clip left and right launch fiber guides 568A, 568B has decreased such that it is less than the distance between the farthest point of the top and bottom surfaces 608A, 608B of the left and right connector fiber guides 600A, 600B, thereby axially retaining the launch connector 216 relative to the first fiber optic connector 208A. More specifically, the left and/or right connector fiber guide 600A, 600B is complementary in size and shape to the left and/or right launch fiber guide 568A, 568B to mate the left and/or right launch fiber guide 568A, 568B to the left and/or right connector fiber guide 600A, 600B. Further, the alignment surfaces 602A, 602B, 608A, 608B of the left and/or right connector fiber guides 600A, 600B and the alignment surfaces 572A, 572B, 576A, 576B of the left and/or right launch fiber guides 568A, 568B interact with one another to align the launch ends 408A, 408B of the first and second tracing optical fibers 406A, 406B with the emission ends 432A, 432B of the first and second launch fibers 428A, 428B. More specifically, for example, the top alignment surface 608A of the left connector fiber guide 600A mates with the top alignment surface 576A, of the left launch fiber guide 568A, the bottom alignment surface 608B of the left connector fiber guide 600A mates with the bottom alignment surface 576B of the left launch fiber guide 568A, the front alignment surface 602A of the left connector fiber guide 600A mates with front alignment surface 572A of the left launch fiber guide 568A, the rear alignment surface 602B of the left connector fiber guide 600A mates with the rear alignment surface 572B of the left launch fiber guide 568A, and the planar surface 604 of the left connector fiber guide 600A mates with the planar surface 574 of the left launch fiber guide 568A. Accordingly, the first or second launch fiber 428A, 428B is axially aligned with the first or second tracing optical fiber 406A, 406B (e.g., horizontally and/or vertically aligned).

Once engaged, the launch module 214 of the light launch device 204 generates an optical tracing signal which is directed through the first and second launch fibers 428A, 428B. As shown, the optical tracing signal is directed to both of the launch openings 606 of the left and right connector fiber guides 600A, 600B, even though only one of those launch openings 606 includes a tracing optical fiber (e.g., the first tracing optical fiber 406A). This is because the ability to reverse the polarity of the connector changes the orientation of the body 722, where doing so switches whether the first tracing optical fiber 406A is positioned on the left or right side.

Thus, for example, a first optical tracing signal is directed from the first emission end 432A of the first launch fiber 428A to the first launch end 408A of the first tracing optical fiber 406A in the first fiber optic connector 208A to the first emission end 410A of the first tracing optical fiber 406A in the second fiber optic connector 208B. Once emitted, any exposed areas (e.g., the connector fiber guides 600A, 600B) of the body 722 of the first fiber optic connector 208A allows emission the first optical tracing signal out of the second fiber optic connector housing 700 to the user (explained below in more detail). Additionally, the locking member 704 also allows emission of the first optical tracing signal out of the housing 700 second fiber optic connector 208B to the user (explained below in more detail). Note that the first optical tracing signal could be a steady signal or a pulsing signal. An advantage of a pulsing signal is that it is more visible to a user (even with the same peak power), and it is also more energy efficient (e.g., uses less power).

FIGS. 9A-9E are views of the interior of the first and second fiber optic connectors 208A, 208B, and in particular of the mounting of the optical fibers within the housing 700 of the first and second fiber optic connector 208A, 208B. As shown, the bottom clamshell 724B is the same for both the first and second fiber optic connectors 208A, 208B. As shown, the traceable fiber optic cable assembly 202 comprises first and second data transmission fibers 400A, 400B. In particular, the first end 402A of the first data transmission fiber 400A is positioned within a first fiber optic cable ferrule in the first fiber optic connector 208A. The second end 402B of the second data transmission fiber 400B is positioned within the second fiber optic cable ferrule in the second fiber optic connector 208B. Further, the second data transmission fiber first end 402A is positioned within a second fiber optic cable ferrule in the first fiber optic connector 208A, and the second end 402B of the second data transmission fiber 400B is positioned within the first fiber optic cable ferrule in the second fiber optic connector 208B.

Further, as mentioned above, each body 722 comprises a left and right connector fiber guide 600A, 600B at opposite sides of the body. Each of the left and right connector fiber guides 600A, 600B comprises a launch opening 606 in communication with a fiber channel 900 extending from the body interior 726 to external of the left and right connector fiber guides 600A, 600B.

In the first fiber optic connector 208A, the first launch end 408A of the first tracing optical fiber 406A is positioned in the launch opening 606 of the left connector fiber guide 600A and extends through the fiber channel 900. The first emission end 410A of the first tracing optical fiber 406A is centrally mounted in the second fiber optic connector 208B (discussed in more detail below). Similarly, in the second fiber optic connector 208B, the second launch end 408B of the second tracing optical fiber 406B is positioned in the launch opening 606 of the left connector fiber guide 600A and extends through the fiber channel 900. The second tracing optical fiber emission end 410B is centrally mounted in the second fiber optic connector 208A (discussed in more detail below).

Figure 9C:
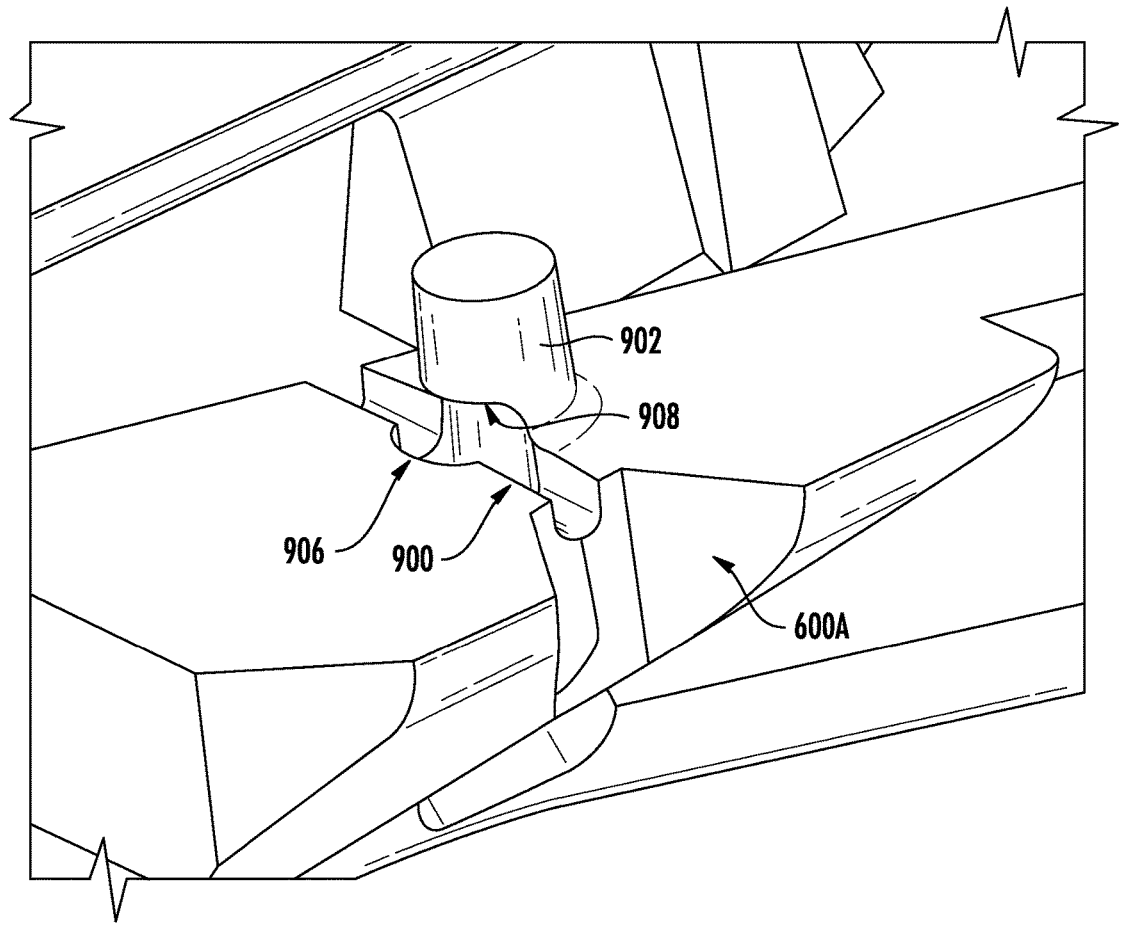
FIG. 9C is an enlarged perspective view of a fiber channel and alignment protrusion feature of FIG. 9B.
Figure 9D:
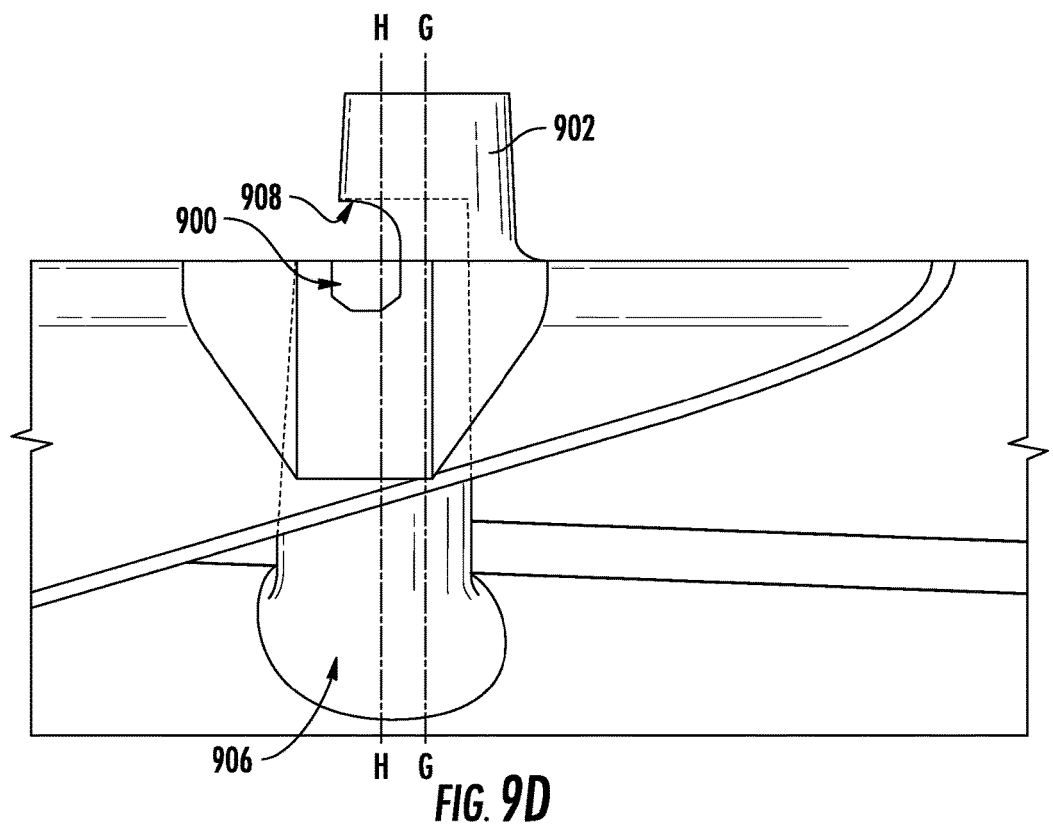
FIG. 9D is a cross-sectional side view of the fiber channel and alignment protrusion feature of FIGS. 9B and 9C.
Figure 9E:
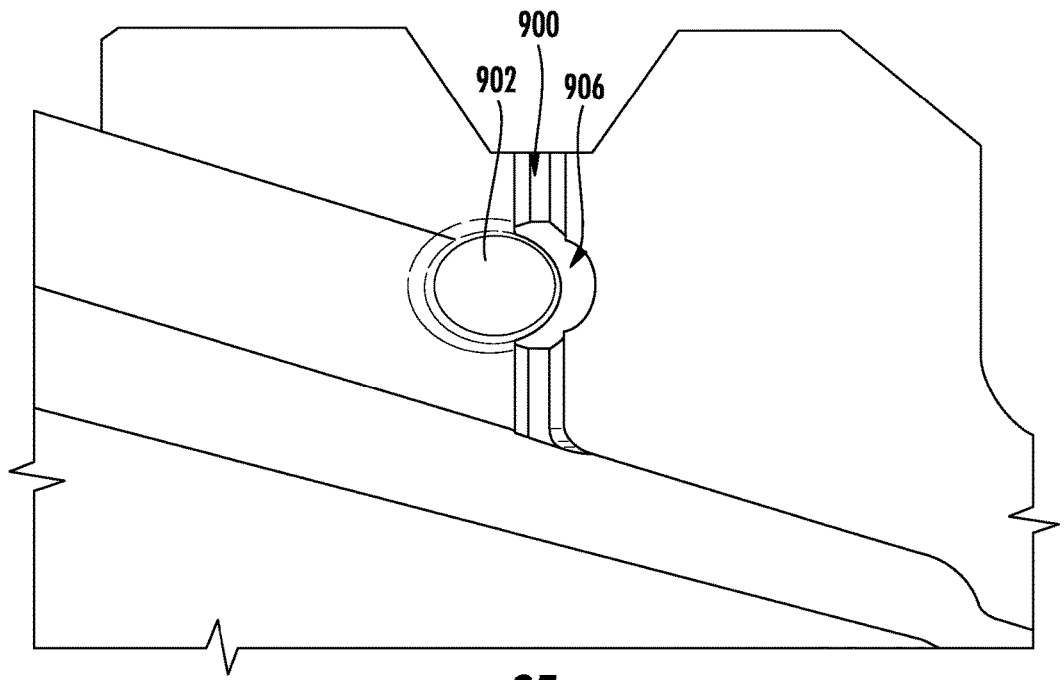
FIG. 9E is a top view of the fiber channel and alignment protrusion feature of FIGS. 9B-9D.

FIG. 9B is a perspective view of the bottom clamshell 724B of the housing 700 of the first and second fiber optic connector 208A, 208B, and FIGS. 9C-9E are views of a fiber channel 900 and alignment protrusion feature of FIG. 9B. Alignment protrusion features 902 cooperate with corresponding alignment cavity features 904, respectively, providing alignment and preventing lateral and axial translation. The alignment features are shown by way of example and in no way limit the possible configurations of such features. Although the top and bottom clamshells 724A, 724B are identical, as discussed above, in other embodiments top and bottom clamshells 724A, 724B may not be substantially identical, such as one half may comprise all the alignment cavity features and the other half comprise all the alignment protrusion features. Likewise, other configurations are possible for securing the housing components together. Other variations include a housing formed from a single component that has an upper and lower portion connected by a living hinge.

As shown, the first launch end 408A of the first tracing optical fiber 406A is positioned in the launch opening 606 of the left connector fiber guide 600A and extends through the fiber channel 900. The fiber channel 900 of the left connector fiber guide 600A comprises an access port 906 at least partially positioned beneath the alignment protrusion feature 902. The access port 906 extends through the bottom clamshell 724B to provide access to the fiber channel 900 (as explained in more detail below). The fiber channel 900 is positioned between the rear aperture 744 and the alignment protrusion feature 902, where at least a portion of the alignment protrusion feature 902 can be positioned above the fiber channel 900 to define an overhang 908.

During assembly, the first tracing optical fiber 406A is bent and positioned in the fiber channel 900, and is biased towards a straight orientation. Accordingly, the overhang 908 and position of the alignment protrusion feature 902 on a side of the fiber channel 900 opposite from the rear aperture 744 act as a hook and prevent the first tracing optical fiber 406A from accidentally disengaging from the fiber channel 900. Further, the overhang 908 prevents any accidental pinching or damage to the first tracing optical fiber 406A when the top and bottom clamshells 724A, 724B are assembled together because the first tracing optical fiber 406A is more enclosed by the overhang 908.

Once the top and bottom clamshells 724A, 724B are assembled, a syringe (or other device) can be inserted into the access port 906 (in some embodiments having a diameter of 0.5 mm, 1 mm, 1.5 mm, etc.) to inject an adhesive or epoxy within the fiber channel 900 to fix the first tracing optical fiber 406A within the fiber channel 900. As shown, the central axis G-G of the alignment protrusion feature 902 is offset from the central axis H-H of the access port 906. This offset facilitates manufacture of the overhang 908.

FIGS. 10A-10H are views of the second emission end 410B of the second tracing optical fiber 406B mounted within the first fiber optic connector 208A and illustrating emission of a fiber optical signal into the first fiber optic connector 208A. In particular, FIGS. 10A-10D are views of the second emission end 410B of the second tracing optical fiber 406B mounted within the first fiber optic connector 208A. As shown, the top and bottom clamshells 724A, 724B each comprise an internal TIR structure 1000 for mounting the first or second emission end 410A, 410B of the first or second tracing optical fiber 406A, 406B within the body 722 of the first and second fiber optic connector 208A, 208B. In particular, the illumination component 212 comprises the internal TIR structure 1000. In particular, the illumination component 212 comprises the top primary illumination component 800 and the side secondary illumination component 802, wherein the top primary illumination component 800 comprises the external TIR structure 762 (e.g., external illumination component), and wherein the side secondary illumination component 802 comprises the internal TIR structure 1000 (e.g., internal illumination component). The top primary illumination component 800 (and external TIR structure 762) comprises the locking member 704 and the side secondary illumination component 802 (and internal TIR structure 1000) comprises the left and/or right connector fiber guide 600A, 600B.

The internal TIR structure 1000 comprises a center column 1002 with an open channel 1004 defined in a top thereof. At a distal end of the center column 1002 is a vertical planar face 1006. Proximate, but distal of the vertical planar face 1006 are left and right stabilizing columns 1008A, 1008B. These stabilizing columns 1008A, 1008B are staggered from one another for proper mating with the stabilizing columns 1008A, 1008B for the top clamshell 724A (which is identical to the bottom clamshell 724B). The stabilizing columns 1008A, 1008B are proximate the vertical planar face 1006 to keep the second emission end 410B of the second tracing optical fiber 406B in place.

Extending from a top of the vertical planar face 1006 is a horizontal mating face 1010. In this way, the horizontal mating face 1010 of the bottom clamshell 724B is configured to mate with the horizontal mating face 1010 of the top clamshell 724A. Accordingly, as shown, when the second tracing optical fiber 406B is positioned in the open channel 1004 of the internal TIR structure 1000, the second emission end 410B of the second tracing optical fiber 406B abuts the vertical planar face 1006 to the top and bottom clamshells 724A, 724B. This forces the first optical signal to emit through the vertical planar face 1010 and enter the material of the top and bottom clamshells 724A, 724B without any redirection or distortion.

Extending from a distal edge of the horizontal mating face 1010 is a sloping TIR surface 1012, the sloping TIR surface 1012 sloping downward (e.g., outward) from the top of the horizontal mating face 1010. The sloping TIR surface 1012 could be planar and/or curved. Further, the sloping TIR surface 1012 is narrower at the top (e.g., inward) then the bottom (e.g., outward) to compensate for the spreading the optical tracing signal as it exits the second emission end 410B of the second tracing optical fiber 406B.

When the top and bottom clamshells 724A, 724B are mated to one another, the proximal edge of the top and bottom sloping TIR surface 1012 from a wedge that splits the emitting fiber optic signal such that half of the fiber optic signal is redirected upward, and half the fiber optic signal is redirected downward. This is because the orientation of the body 722 may be flipped to reverse polarity (discussed in more detail below). The distance of the proximal edge of the sloping TIR surface 1012 to the second emission end 410A of the second tracing optical fiber 406B may vary to optimize optical redirection. TIR is advantageous because it is essentially lossless redirection. Further, the slope of the sloping TIR surface 1012 is partly to redirect the emitted fiber optic signal which creates a cone shape as it exits the second emission end 410B of the second tracing optical fiber 406B.

Figure 10A:
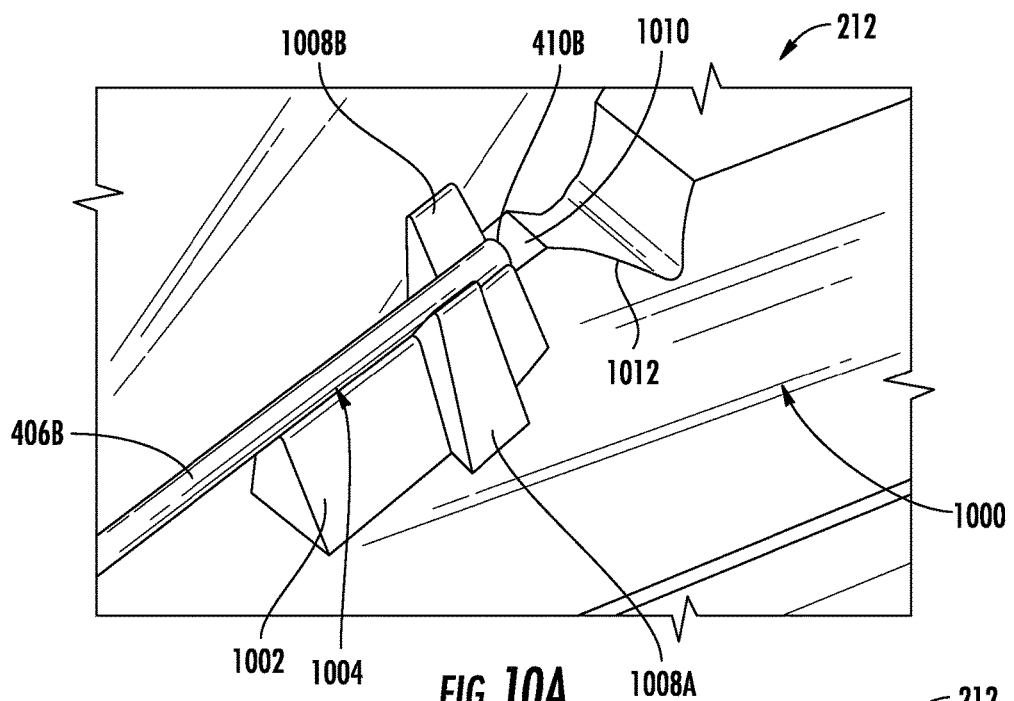
FIG. 10A is a front perspective view of a fiber mount of the bottom clamshell of the first fiber optic connector of FIGS. 2A-2C, 4, and 6A-8F, wherein the emission end of the second tracing optical fiber is secured on the fiber mount.
Figure 10B:
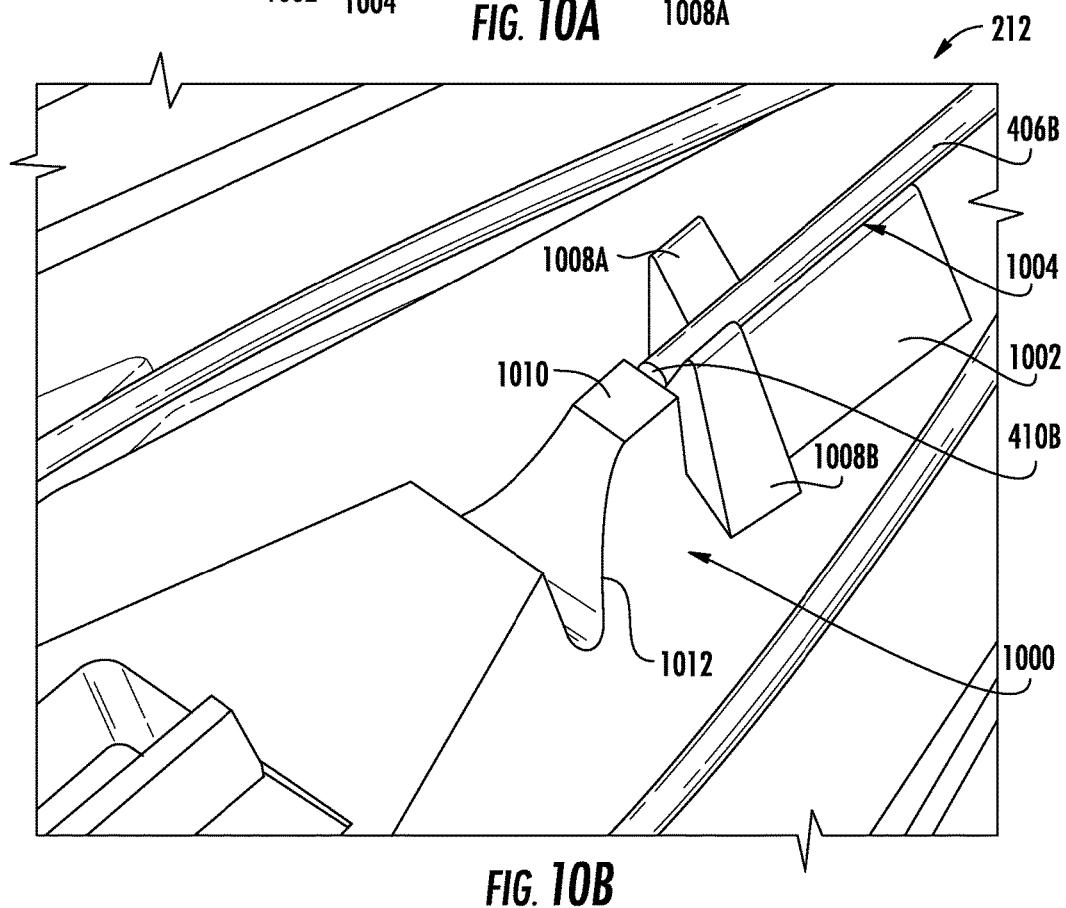
FIG. 10B is a rear perspective view of the emission end of the second tracing optical fiber secured on the fiber mount of the first fiber optic connector of FIG. 10A.
Figure 10C:
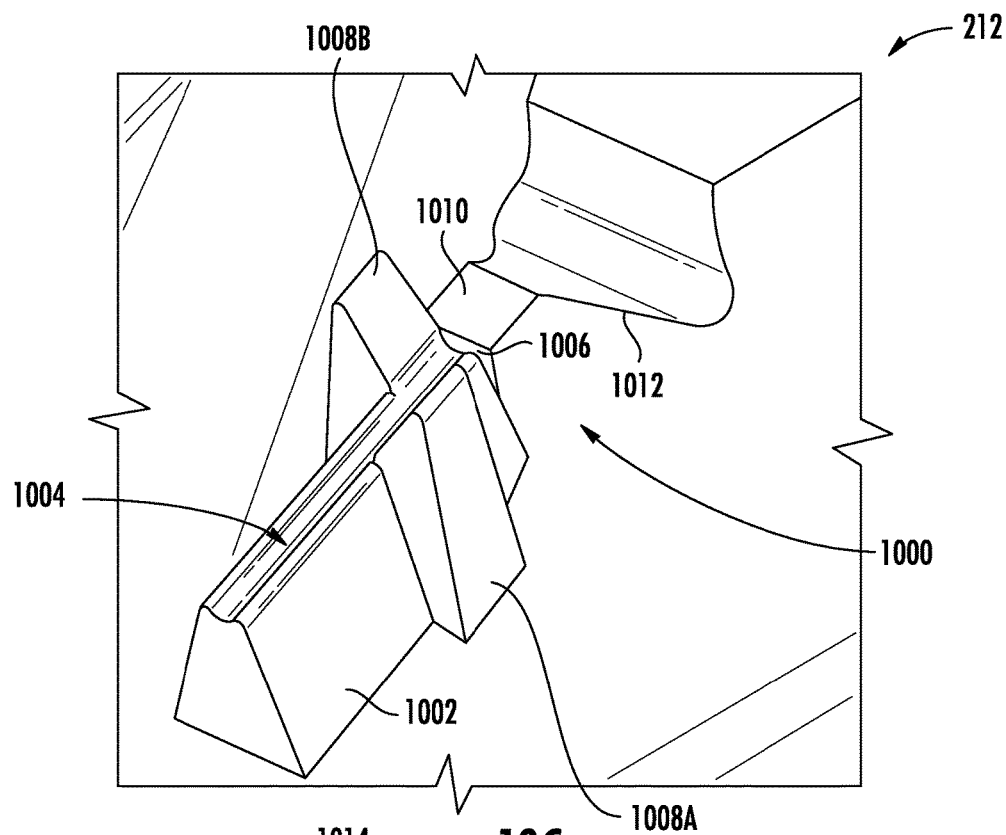
FIG. 10C is a front perspective view of the fiber mount of the first fiber optic connector of FIG. 10A.
Figure 10D:
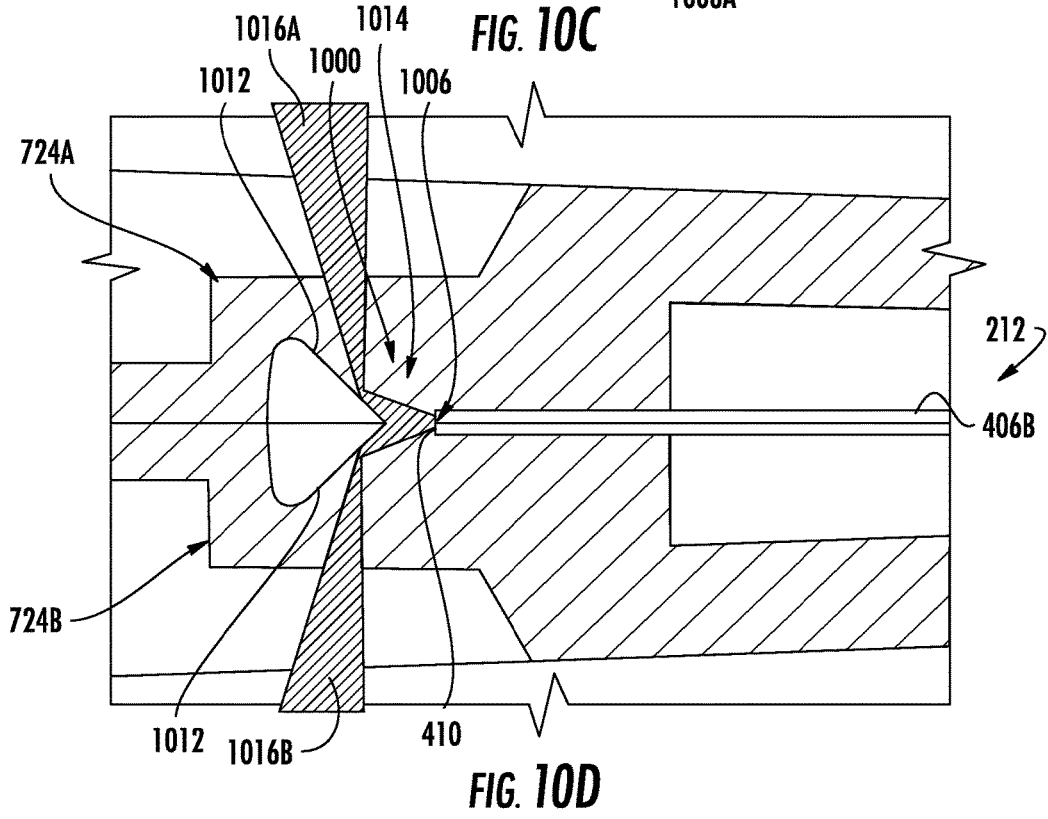
FIG. 10D is a cross-sectional side view of the housing body of the first fiber optic connector of FIG. 10A.
Figure 10E:
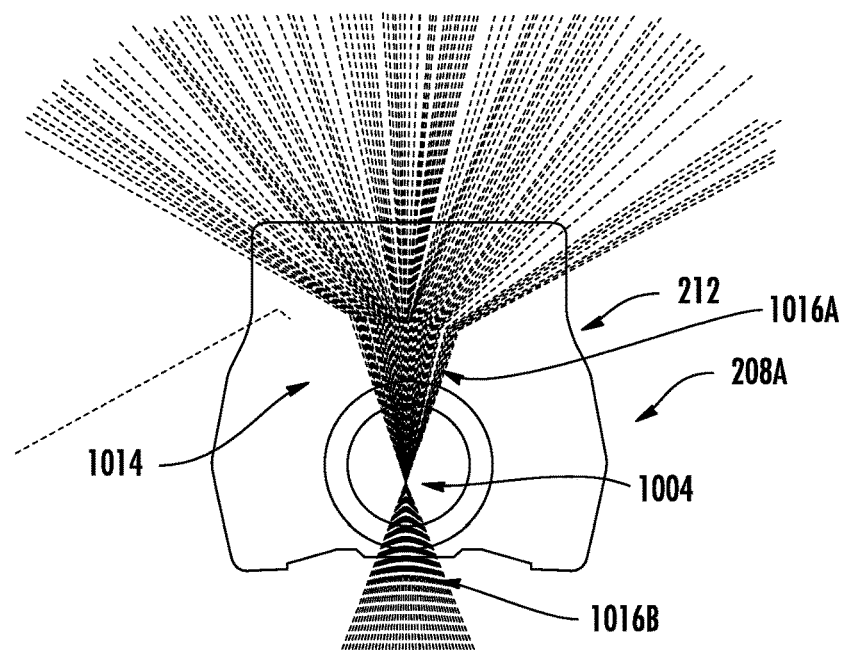
FIG. 10E is a schematic back view of the first fiber optic connector of FIG. 10A illustrating emission of an optical tracing signal from the first fiber optic connector housing using an internal total internal reflection (TIR) surface.
Figure 10F:
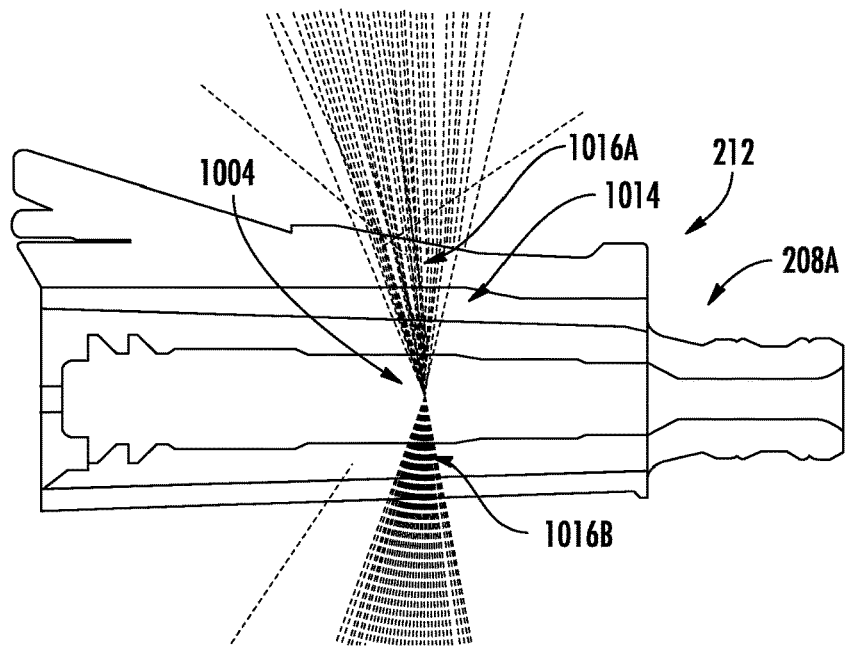
FIG. 10F is a schematic side view of the first fiber optic connector of FIG. 10E.

FIGS. 10D-10F are views of the first fiber optic connector 208A with the optical tracing signal redirected upward and downward by the internal TIR structure 1000. However, the first fiber optic connector 208A shown in FIGS. 10E and 10F has a locking member 704 without any external TIR structure. In other words, the locking member 704 does not redirect any of the emitted fiber optic signal. As shown, the internal TIR structure 1000 redirects a primary portion 1014 of the optical tracing signal such that a first half 1016A of the optical tracing signal is directed upward through the top clamshell 724A, through an aperture in a top of the trigger casing 728, and through the locking member 704, and a second half 1016B of the optical tracing signal is directed downward through the bottom clamshell 724B.

Figure 10G:
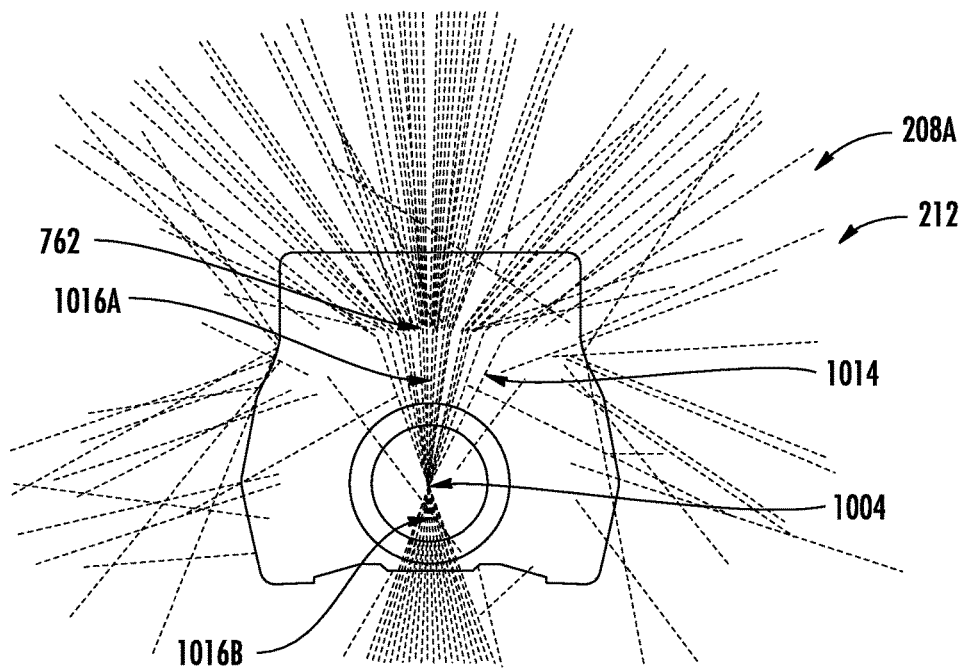
FIG. 10G is a schematic back view of the first fiber optic connector of FIG. 10A illustrating emission of the optical tracing signal from the first fiber optic connector housing using an internal TIR structure and an external TIR structure.
Figure 10H:
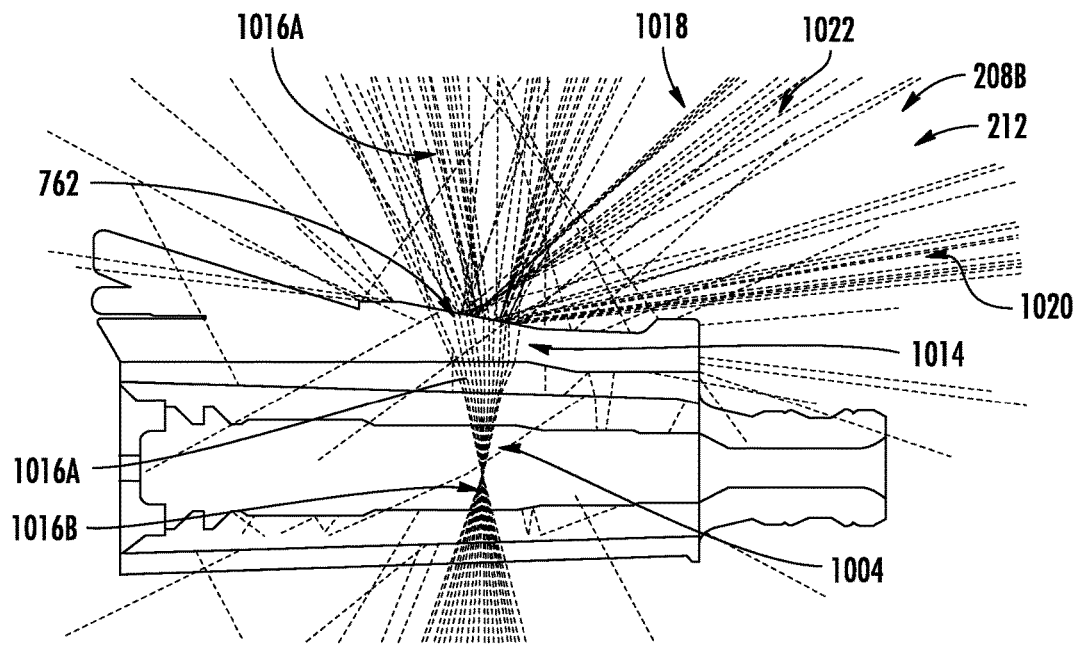
FIG. 10H is a schematic side view of the first fiber optic connector of FIG. 10G.
Figure 101:
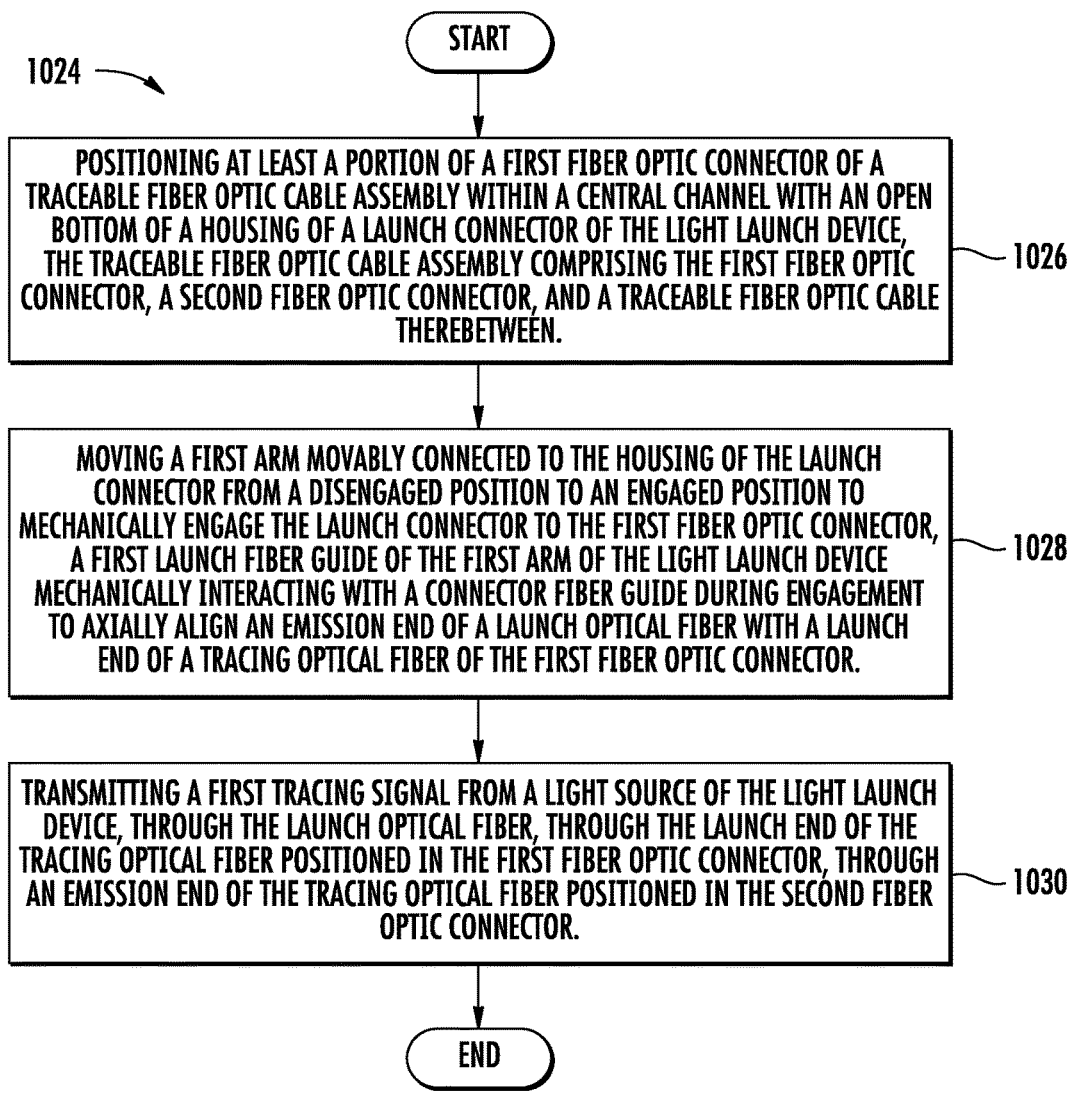

FIGS. 10G and 10H are views of the first fiber optic connector 208A with the optical tracing signal redirected upward and downward by the internal TIR structure 1000 and redirected backward (e.g., proximally) by the external TIR structure 762. The first fiber optic connector 208A shown in these figures has a locking member 704 with an external TIR structure 762. Accordingly, as shown, the internal TIR structure 1000 redirects a primary portion 1014 of the optical tracing signal such that a first half 1016A of the optical tracing signal is directed upward through the top clamshell 724A, through an aperture in a top of the trigger casing 728, and through the locking member 704, and a second half 1016B of the optical tracing signal is directed downward through the bottom clamshell 724B. The locking member 704 redirects a secondary portion 1018 of the primary portion 1014 of the emitted fiber optic signal. In particular, FIG. 10H shows first bands 1020 of the fiber optic signal redirected by the rearward major TIR surface 766, second bands 1022 of the fiber optic signal redirected by the minor TIR surface 768. Note that this is when the locking member 704 is in the locked position. In the unlocked position, the locking member 704 would slide to the right, and the major forward TIR surface 764 would redirect more fiber optic signal, and the rearward TIR surface 766 would redirect less fiber optic signal.

It is noted that optical tracing signal may experience loss as it is injected from the light launch device 204 through the fiber optic cable 206. For example, the optical tracing signal may experience insertion loss (e.g., less than about 9 decibels (db)). Further, the optical tracing signal may experience loss between the input power (e.g., as the optical tracing signal is injected into the first launch end 408A of the first tracing optical fiber 406A positioned in the first fiber optic connector 208A), and the emission power (e.g., as the optical tracing signal is emitted from a first emission end 410A of the first tracing optical fiber 406A positioned in the second fiber optic connector 208B). The loss, input power, and/or output power are dependent upon the wavelength of the optical tracing signal, aperture size, and divergence angle.

It is further noted that calibration of the input power and/or output power are dependent on energy and/or eye safety considerations. In particular, in some embodiments, the input power may be between about 10 microwatts and about 100 milliwatts, or between about 100 microwatts and about 50 milliwatts. In some embodiments, the output power may be between about 10 microwatts and about 50 milliwatts. Further, the input power may be calibrated based on the eye safe limit of the output power, where the eye safe limit is about 50 milliwatts. For example, the input power may be calibrated to about 100 milliwatts to provide an output power of 40 milliwatts. In another embodiment, the input power is calibrated to the eye safe limit (e.g., 50 milliwatts), to ensure that the output power does not exceed this eye safe limit. In other words, if the input power is limited to the eye safe limit, then the output power provided cannot exceed the eye safe limit.

The first and second fiber optic connectors can comprise polyethermide, polybutyleneterephthalate (PBT), polycarbonate (PC), and/or copolyester. In particular, polycarbonate is preferred for the body, the locking feature, and/or any other part that has the data optical signal (e.g., light) travel through it. In some embodiments, the locking member 704 is made of a material that has optical scattering elements on at least part of the surface or within it (e.g., Ultem filled with silica particles).

FIG. 10I is a flowchart illustrating an exemplary process 1024 for using the light launch device 204 of FIGS. 2A-2C, 4-5L, and 8A-8F to trace a fiber optic cable 206. Step 1026 comprises positioning at least a portion of a first fiber optic connector 208A of a traceable fiber optic cable assembly 202 within the central channel 510 with an open bottom of a housing 500 (e.g., body) of a launch connector 216 of the light launch device 204, the traceable fiber optic cable assembly 202 comprising the first fiber optic connector 208A, a second fiber optic connector 208B, and a fiber optic cable 206 (e.g., traceable cable) therebetween. Step 1028 comprises moving a first engagement arm 560A movably connected to the housing 500 (e.g., body) of the launch connector 216 from a disengaged position to an engaged position to mechanically engage the launch connector 216 to the first fiber optic connector 208A, a left launch fiber guide 568A of the left engagement arm 560A of the light launch device 204 mechanically interacting with a left or right connector fiber guide 600A, 600B during engagement to axially align an emission end 432A of a launch fiber 428A with a launch end 408A of a tracing optical fiber 406A of the first fiber optic connector 208A. Step 1030 comprises directing a first tracing signal from the light source 416 of the light launch device 204, through the launch fiber 428A, through the launch end 408A of the tracing optical fiber 406A positioned in the first fiber optic connector 208A, through an emission end 410A of the tracing optical fiber 406A positioned in the second fiber optic connector 208B.

Figure 11A:
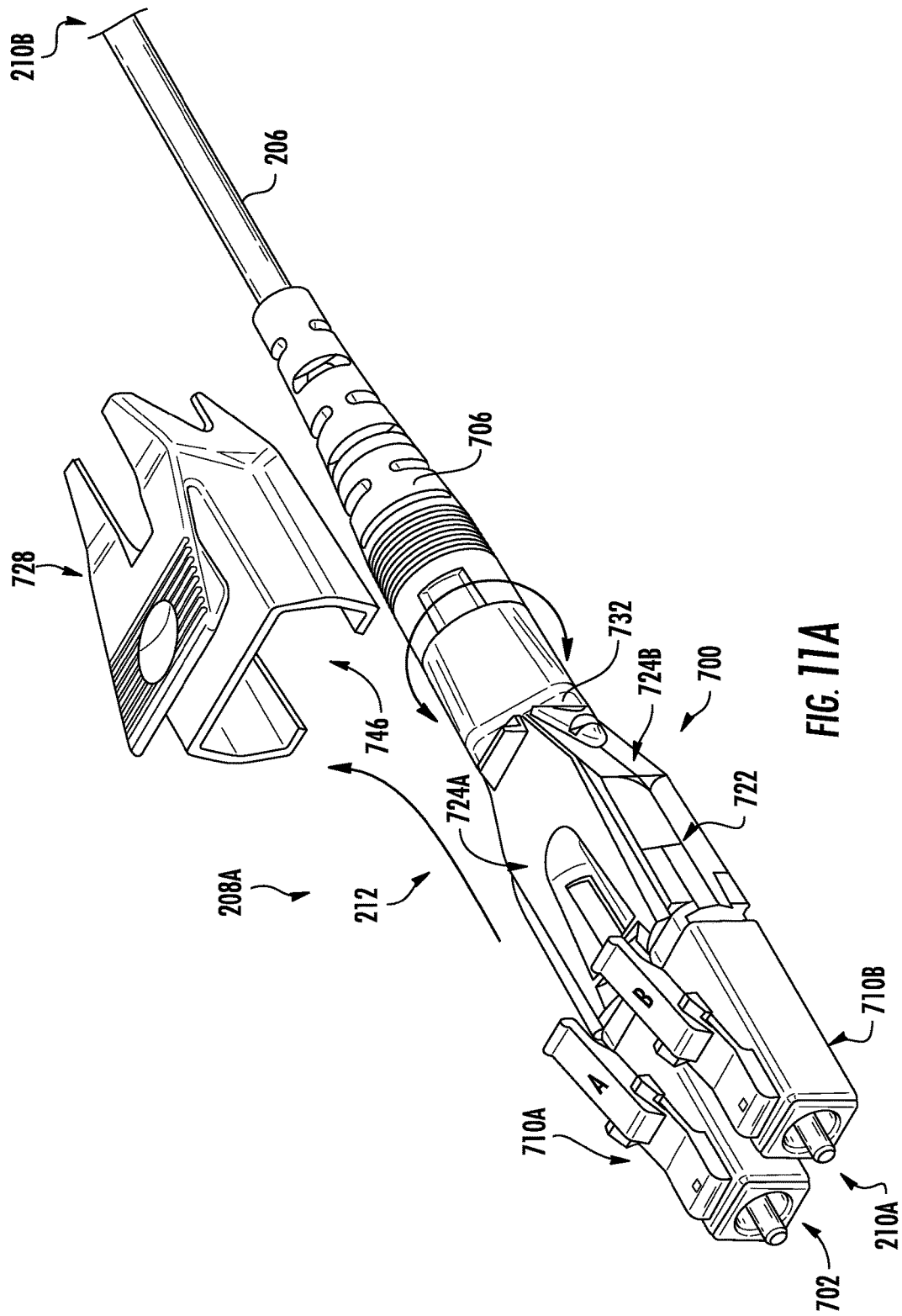
FIG. 11A is a perspective view of the first fiber optic connector of FIGS. 2A-2C, 4, 6A-8F, and 10A-10I beginning the polarity reversal procedure by having the boot rotated so that the trigger mechanism may be removed.
Figure 11B:
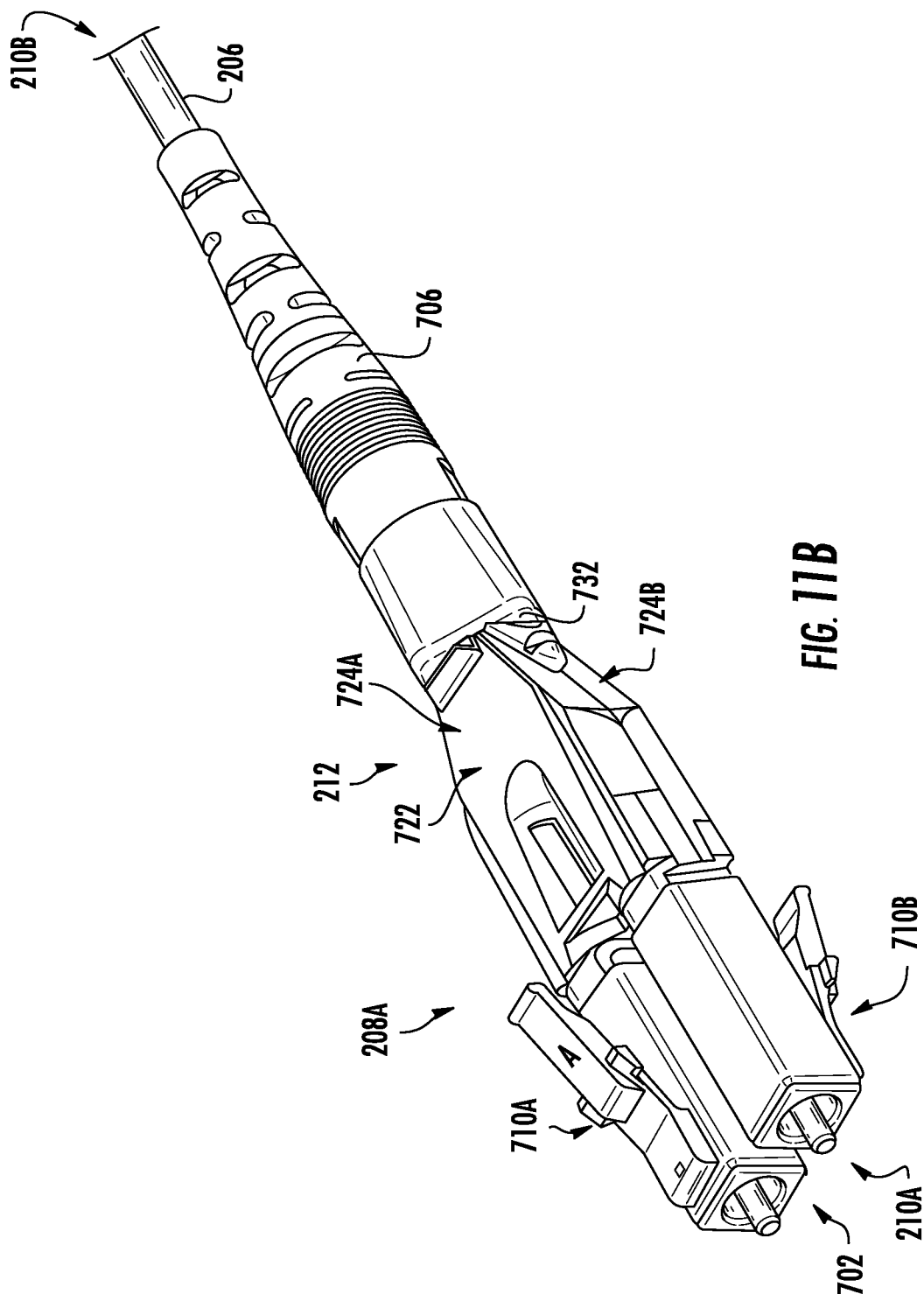
FIG. 11B is a perspective view of the first fiber optic connector of FIG. 11A illustrating the polarity reversal procedure after one of the fiber optic connectors is fully rotated during the polarity reversal procedure.
Figure 11C:
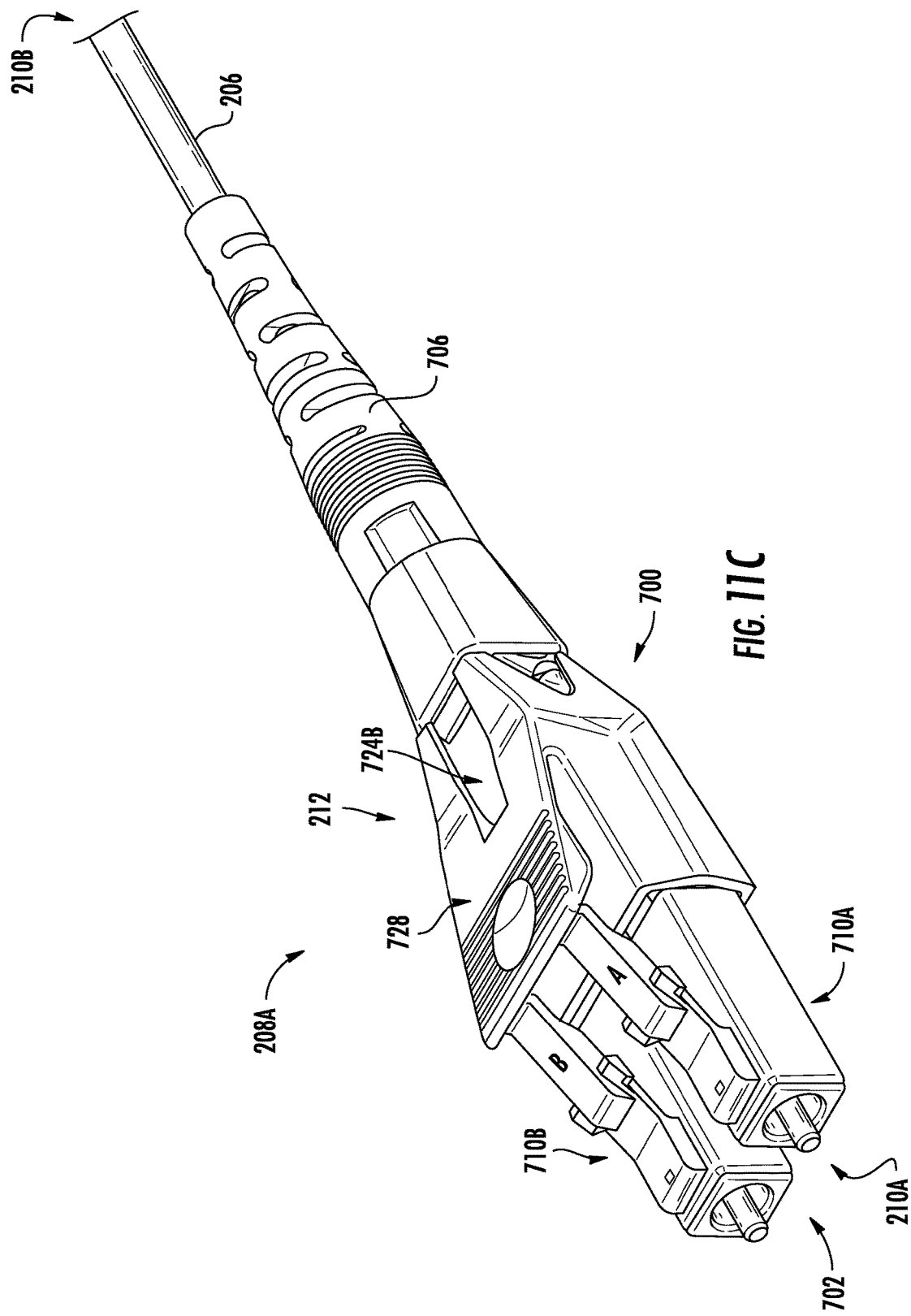
FIG. 11C is a perspective view of the first fiber optic connector of FIG. 11A after the polarity reversal is completed.

FIGS. 11A-11C are perspective views of the first fiber optic connector 208A as the polarity is reversed. The first and second fiber optic connectors 208A, 208B may independently rotate along their respective longitudinal axes for polarity reversal within their respective body 722.

FIG. 11A is a perspective view illustrating the beginning of the polarity reversal procedure. For convenience and clarity first fiber optic connector 208A is labeled with "A" and "B" to indicate a beginning polarity orientation. The polarity of the traceable fiber optic cable assembly 202 may be changed to a second polarity configuration by rotating the boot 706, removing the trigger casing 728, rotating the fiber optic connectors 208A, 208B in opposite directions and replacing the trigger casing 728 on the other side of the connector housing, and then rotating the boot 706 to a home position. In particular, boot 706 is rotated about 45 degrees from its home position so that it is generally aligned with side apertures 749 of the trigger casing 728. Trigger casing 728 is then translated axially, over boot 706 and fiber optic cable 206 until finally lifted off of the assembly via lateral gap 746.

FIG. 11B is a perspective view of the first fiber optic connector 208A of FIG. 11A illustrating the polarity reversal procedure after one of the fiber optic connector is fully rotated. The left connector subassembly 710A is rotated for about 180 degrees until fiber optic connector 208A is in the position shown. As shown, left and right connector subassemblies 710A, 710B are 180 degrees opposite each other. Then the right connector subassembly 710A is rotated 180 degrees. Next, trigger casing 728 is reinstalled similar to that described above with respect to FIG. 11A, but in the reverse order and on the other side of the body 722.

FIG. 11C is a perspective view of the first fiber optic connector 208A of FIG. 11A after the polarity reversal is completed. Accordingly, the polarity has been reversed. In other words, the 'A' and 'B' positions of the fiber optic connectors are reversed. The polarity reversal procedure is completely reversible and in no way affects the performance of the fiber optic connector used in the duplex assembly. While optical fibers may undergo a maximum of about 180 degrees of rotation, assembly methods can reduce the maximum rotation experienced, thereby mitigating any torsional affects. For instance, the fiber optic connector may be installed such that when in a relaxed state, the connectors are oriented at 9 o'clock and 3 o'clock (i.e., positioned in the outward direction instead of up or down), whereas for illustration the connectors are shown both at 12 o'clock in this disclosure. Consequently, the optical fibers only experience a net rotation of only +90° or −90° in any polarity orientation.

Accordingly, as disclosed herein, the light launch device and fiber optic connectors have been designed to keep the cost of the high volume fiber optic cable assembly as low cost as possible by using the fewest connector parts and by minimizing the number of added fabrication steps, while moving functionality and cost to the low volume launch tool wherever possible. The fiber optic connectors have the ability to reverse polarity, as well as a sliding lock. Further, the cable tracing system achieves high optical efficiency coupling into and out of the tracing fiber that efficiently illuminate the connector so observers can easily see it.

Optical fibers may be referred to interchangeably as optical waveguides herein. Therefore this disclosure does not intend to differentiate between the terms "optical fiber" and "optical waveguide" per se. The optical fibers may conduct nonvisible light or visible light, such as green light at approximately 532 nm. Red light, blue light, or a combination thereof could also be used to assist with tracing the fiber optic cable 206. Green light may be used due to the relative high degree of sensitivity of the human eye to green light.

In some embodiments, the optical fibers each include a core and a cladding. The core may be made from glass, particularly silica-based glass, having a first index of refraction. Alternatively, the core may be formed from a polymer. The size of the core is not particularly limited, but in some embodiments diameters may be between about 100 microns and about 250 microns. The core may be, for example, 125 microns. Cores that are significantly smaller may be subject to damage from handling, and cores that are significantly larger may be subject to damage when bending.

The cladding can be made from glass or a polymer, such as fluoro-acrylate. The material for the cladding may be selected to have an index of refraction that differs from the index of refraction of the core. In some embodiments, the index of refraction of the cladding is lower than that of the core. The indices of refraction may produce a step-index optical fiber. In other embodiments, the optical fibers may be trapezium or triangular index fibers. The cladding closely surrounds the core to help maintain light within the tracing optical fibers. The cladding may have a thickness between about 4% and about 40% of the diameter of the core. For example, the cladding may be between about 5 and about 50 microns thick from the surface of the core to an exterior surface of the cladding when the core has a diameter of 125 microns. The optical fibers may be single mode fibers or multi-mode fibers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A cable tracing system, comprising:
   a fiber optic connector comprising:
      a housing defining an interior and comprising a connector fiber guide, the connector fiber guide comprising a planar surface, a launch opening defined in the planar surface, and at least one alignment surface proximate the planar surface;
      at least one data transmission element, at least a portion of the at least one data transmission element positioned within the interior of the housing for direction of an optical data signal;
      a first launch end of a first tracing optical fiber positioned within the launch opening of the housing and accessible from an exterior of the housing for receiving a first optical tracing signal from a launch optical fiber to direct the first optical tracing signal to a first emission end of the first tracing optical fiber; and
      a second emission end of a second tracing optical fiber positioned within the housing;
   the at least one alignment surface configured to axially align the launch optical fiber with the first launch end of the first tracing optical fiber;
   wherein the launch connector further comprises the launch optical fiber and a launch fiber guide comprising at least one alignment surface; and
   wherein the at least one alignment surface of the launch fiber guide is complementary to the at least one alignment surface of the connector fiber guide for axially aligning the launch optical fiber with the first launch end of the first tracing optical fiber.

2. The cable tracing system of claim 1, further comprising a launch connector removably attachable to the fiber optic connector, the launch connector configured to direct the first optical tracing signal to the first launch end of the first tracing optical fiber when mechanically engaged with the fiber optic connector.

3. The cable tracing system of claim 2, wherein the launch connector comprises a body having a central channel with an open bottom, at least a portion of the fiber optic connector positionable within the central channel and removable therefrom.

4. The cable tracing system of claim 2, wherein the launch connector is configured to be attachable to and removable from the fiber optic connector when the fiber optic connector is mechanically engaged with a fiber optic component.

5. The cable tracing system of claim 1, wherein the fiber optic connector comprises no electrically conducting devices.

6. The cable tracing system of claim 1, wherein at least a portion of the fiber optic connector comprises a translucent material configured to receive at least a portion of a second optical tracing signal emitted from the second emission end of the second tracing optical fiber.

7. The cable tracing system of claim 1, wherein the second emission end of the second tracing optical fiber is configured such that a second optical tracing signal emitted therefrom illuminates at least a portion of the fiber optic connector.

8. The cable tracing system of claim 2, wherein the at least one alignment surface comprises:
   a first surface having a first gradient varying along a first axis perpendicular to a central axis of the first launch end; and
   a second surface having a second gradient varying along the first axis and opposite from the first gradient;
   the first surface and the second surface configured to align the launch connector about the first and second gradients to align the launch optical fiber of the launch connector with the first tracing optical fiber along the first axis.

9. The cable tracing system of claim 8, wherein the at least one alignment surface further comprises:
   a third surface having a third gradient varying along a second axis perpendicular to the first axis and perpendicular to the central axis; and
   a fourth surface having a fourth gradient varying along the second axis and opposite from the third gradient;
   the third surface and the fourth surface configured to align the launch connector about the third and fourth gradients to align the launch optical fiber of the launch connector with the first tracing optical fiber along the second axis.

10. The cable tracing system of claim 9, wherein at least a portion of at least one of the first surface, second surface, third surface, or fourth surface forms a curved surface.

11. The cable tracing system of claim 9, wherein at least a portion of at least one of the first surface, second surface, third surface, or fourth surface forms a planar surface.

12. The cable tracing system of claim 1, wherein at least a portion of a peripheral edge of the planar surface is not enclosed by the at least one alignment surface to provide cleaving access to the first launch end of the first tracing optical fiber.

13. The cable tracing system of claim 1, wherein the second emission end is configured to emit a second optical tracing signal received from a second launch end of the second tracing optical fiber into the interior of the housing.

14. The cable tracing system of claim 13, wherein the first optical tracing signal and the second optical tracing signal are not transmitted simultaneously.

15. A cable tracing system, comprising:
a traceable fiber optic cable assembly, comprising:
a traceable fiber optic cable, comprising:
at least one data transmission element for communication of an optical data signal;
a first tracing optical fiber comprising a first launch end and a first emission end; and
a second tracing optical fiber comprising a second launch end and a second emission end;
a first fiber optic connector at a first end of the traceable fiber optic cable, the first fiber optic connector comprising a first housing defining a first interior and comprising a first connector fiber guide, the first connector fiber guide comprising a first planar surface, a first launch opening defined in the first planar surface, and at least one first alignment surface proximate the first planar surface; and
a second fiber optic connector at a second end of the traceable fiber optic cable, the second fiber optic connector comprising a second housing defining a second interior and comprising a second connector fiber guide, the second connector fiber guide comprising a second planar surface, a second launch opening defined in the second planar surface, and at least one second alignment surface proximate the first planar surface;
the first launch end of the first tracing optical fiber positioned within the first launch opening of the first housing of the first fiber optic connector and the first emission end of the first tracing optical fiber is positioned within the second housing of the second fiber optic connector;
the second launch end of the second tracing optical fiber positioned within the second launch opening of the second housing of the second fiber optic connector and the second emission end of the second tracing optical fiber is positioned within the first housing of the first fiber optic connector;
the first launch end accessible from an exterior of the second housing for receiving a first optical tracing signal from a launch optical fiber for direction of the first optical tracing signal to the first emission end of the first tracing optical fiber;
the second launch end accessible from an exterior of the first housing for receiving a second optical tracing signal from the launch optical fiber for direction of the second optical tracing signal to the second emission end of the second tracing optical fiber;
at least a portion of a peripheral edge of the first planar surface not enclosed by the at least one first alignment surface to provide cleaving access to the first launch end of the first tracing optical fiber;
at least a portion of a peripheral edge of the second planar surface not enclosed by the at least one second alignment surface to provide cleaving access to the second launch end of the second tracing optical fiber;
the at least one first alignment surface configured to axially align the launch optical fiber with the first launch end of the first tracing optical fiber; and
the at least one second alignment surface configured to axially align the launch optical fiber with the second launch end of the second tracing optical fiber.

16. The cable tracing system of claim 15, further comprising:
a launch connector removably attachable to the first fiber optic connector;
the launch connector configured to:
direct the first optical tracing signal to the first launch end of the first tracing optical fiber when mechanically engaged with the first fiber optic connector; and
direct the second optical tracing signal to the second launch end of the second tracing optical fiber when mechanically engaged with the second fiber optic connector.

17. The cable tracing system of claim 16, wherein:
the launch connector further comprises the launch optical fiber and a launch fiber guide comprising at least one alignment surface;
the at least one alignment surface of the launch fiber guide is complementary to the at least one first alignment surface of the first connector fiber guide for axially aligning the first launch optical fiber with the first launch end of the first tracing optical fiber; and
the at least one alignment surface of the launch fiber guide is complementary to the at least one second alignment surface of the second connector fiber guide for axially aligning the second launch optical fiber with the second launch end of the second tracing optical fiber.

18. The cable tracing system of claim 16, wherein:
the launch connector comprises a body having a central channel with an open bottom;
at least a portion of the first fiber optic connector is positionable within the central channel and removable therefrom; and
at least a portion of the second fiber optic connector is positionable within the central channel and removable therefrom.

19. The cable tracing system of claim 16, wherein:
the launch connector is configured to be attachable to and removable from the first fiber optic connector when the first fiber optic connector is mechanically engaged with a first fiber optic component, and
the launch connector is configured to be attachable to and removable from the second fiber optic connector when the second fiber optic connector is mechanically engaged with a second fiber optic component.

20. The cable tracing system of claim 15, wherein the traceable fiber optic cable assembly comprises no electrically conducting devices.

21. The cable tracing system of claim 15, wherein:
at least a portion of the first fiber optic connector comprises a first translucent material to allow at least a portion of the second optical tracing signal to exit the first interior of the first housing; and
at least a portion of the second fiber optic connector comprises a second translucent material to allow at least a portion of the first optical tracing signal to exit the second interior of the second housing.

22. The cable tracing system of claim 15, wherein:
the first emission end of the first tracing optical fiber is configured such that emission of the first optical tracing signal therefrom illuminates at least a portion of the second fiber optic connector; and
the second emission end of the second tracing optical fiber is configured such that emission of the second optical tracing signal therefrom illuminates at least, a portion of the first fiber optic connector.

23. The cable tracing system of claim 15, wherein:
the at least one first alignment surface comprises:
a first surface having a first gradient varying along a first axis perpendicular to a central axis of the first launch end; and
a second surface having a second gradient varying along the first axis and opposite from the first gradient;
the first surface and the second surface configured to align the launch connector about the first and second gradients to align the launch optical fiber of a launch connector with the first tracing optical fiber along the first axis; and
the at least one second alignment surface comprises:
a first surface having a first gradient varying along a first axis perpendicular to a central axis of the first launch end; and
a second surface having a second gradient varying along the first axis and opposite from the first gradient;
the first surface and the second surface configured to align the launch connector about the first and second gradients to align the launch optical fiber of the launch connector with the second tracing optical fiber along the first axis.

24. The cable tracing system of claim 23, wherein:
the at least one first alignment surface further comprises:
a third surface having a third gradient varying along a second axis perpendicular to the first axis and perpendicular to the central axis; and
a fourth surface having a fourth gradient varying along the second axis and opposite from the third gradient;
the third surface and the fourth surface configured to align the launch connector about the third and fourth gradients to align the launch optical fiber of the launch connector with the first tracing optical fiber along the second axis;
the at least one second alignment surface further comprises:
a third surface having a third gradient varying along a second axis perpendicular to the first axis and perpendicular to the central axis; and
a fourth surface having a fourth gradient varying along the second axis and opposite from the third gradient;
the third surface and the fourth surface configured to align the launch connector about the third and fourth gradients to align the launch optical fiber of the launch connector with the second tracing optical fiber along the second axis.

25. The cable tracing system of claim 24, wherein:
at least a portion of at least one of the first surface, second surface, third surface, or fourth surface of the at least one first alignment surface forms a curved surface; and
at least a portion of at least one of the first surface, second surface, third surface, or fourth surface of the at least one second alignment surface forms a curved surface.

26. The cable tracing system of claim 24, wherein:
at least a portion of at least one of the first surface, second surface, third surface, or fourth surface of the at least one first alignment surface forms a planar surface; and
at least a portion of at least one of the first surface, second surface, third surface, or fourth surface of the at least one second alignment surface forms a planar surface.

27. A cable tracing system, comprising:
a fiber optic connector comprising:
a housing defining an interior and comprising a connector fiber guide, the connector fiber guide comprising an opening and at least one alignment surface proximate the opening;
at least one data transmission element, wherein at least a portion of the at least one data transmission element is positioned within the interior of the housing for direction of an optical data signal; and
a first end of a tracing optical fiber positioned within the opening of the housing and accessible from an exterior of the housing, the first end configured to receive a first optical tracing signal from a launch optical fiber to direct the first optical tracing signal to a second end of the tracing optical fiber; and
the at least one alignment surface configured to axially align the launch optical fiber with the first end of the tracing optical fiber;
wherein the launch connector further comprises the launch optical fiber and a launch fiber guide comprising at least one alignment surface; and
wherein the at least one alignment surface of the launch fiber guide is complementary to the at least one alignment surface of the connector fiber guide for axially aligning the launch optical fiber with the first end of the tracing optical fiber.

28. The cable tracing system of claim 27, further comprising a launch connector removably attachable to the fiber optic connector, the launch connector configured to direct the first optical tracing signal to the first end of the tracing optical fiber when the launch connector is mechanically engaged with the fiber optic connector.

29. The cable tracing system of claim 28, wherein the launch connector comprises a body having a central channel with an open bottom, at least a portion of the fiber optic connector positionable within the central channel and removable therefrom.

30. The cable tracing system of claim 28, wherein the launch connector is configured to be attachable to and removable from the fiber optic connector when the fiber optic connector is mechanically engaged with a fiber optic component.

31. The cable tracing system of claim 27, wherein the fiber optic connector comprises no electrically conducting devices.

32. The cable tracing system of claim 27, wherein at least a portion of the fiber optic connector comprises a translucent material configured to receive at least a portion of a second optical tracing signal from the interior of the housing.

33. The cable tracing system of claim 32, wherein the first end of the tracing optical fiber is configured such that emission of the second optical tracing signal therefrom illuminates at least a portion of the fiber optic connector.

34. The cable tracing system of claim 28, wherein the at least one alignment surface comprises:
a first surface having a first gradient varying along a first, axis perpendicular to a central axis of the first end; and
a second surface having a second gradient varying along the first axis and opposite from the first gradient;

the first surface and the second surface configured to align the launch connector about the first and second gradients to align the launch optical fiber of the launch connector with the tracing optical fiber along the first axis.

35. The cable tracing system of claim 34, wherein the at least one alignment surface further comprises:
a third surface having a third gradient varying along a second axis perpendicular to the first axis and perpendicular to the central axis; and
a fourth surface having a fourth gradient varying along the second axis and opposite from the third gradient;
the third surface and the fourth surface configured to align the launch connector about the third and fourth gradients to align the launch optical fiber of the launch connector with the tracing optical fiber along the second axis.

36. The cable tracing system of claim 35, wherein at least a portion of at least one of the first surface, second surface, third surface, or fourth surface forms a curved surface.

37. The cable tracing system of claim 35, wherein at least a portion of at least one of the first surface, second surface, third surface, or fourth surface forms a planar surface.

38. The cable tracing system of claim 27, wherein the connector fiber guide further comprises a planar surface, the opening is defined in the planar surface, and at least a portion of a peripheral edge of the planar surface is not enclosed by the at least one alignment surface to provide cleaving access to the first end of the first tracing optical fiber.

* * * * *